(12) United States Patent
Ito

(10) Patent No.: US 11,378,789 B2
(45) Date of Patent: Jul. 5, 2022

(54) VARIABLE POWER OPTICAL SYSTEM, OPTICAL APPARATUS, AND METHOD FOR PRODUCING VARIABLE POWER OPTICAL SYSTEM

(71) Applicant: Nikon Corporation, Tokyo (JP)

(72) Inventor: Tomoki Ito, Kawasaki (JP)

(73) Assignee: Nikon Corporation, Tokyo (JP)

( * ) Notice: Subject to any disclaimer, the term of this patent is extended or adjusted under 35 U.S.C. 154(b) by 84 days.

(21) Appl. No.: 16/764,855

(22) PCT Filed: Nov. 17, 2017

(86) PCT No.: PCT/JP2017/041445
§ 371 (c)(1),
(2) Date: May 16, 2020

(87) PCT Pub. No.: WO2019/097669
PCT Pub. Date: May 23, 2019

(65) Prior Publication Data
US 2020/0341249 A1      Oct. 29, 2020

(51) Int. Cl.
*G02B 15/14*       (2006.01)
*G02B 7/09*        (2021.01)
(Continued)

(52) U.S. Cl.
CPC ....... *G02B 15/144105* (2019.08); *G02B 7/09* (2013.01); *G02B 9/34* (2013.01); *G02B 13/06* (2013.01); *G02B 15/16* (2013.01)

(58) Field of Classification Search
CPC .... G02B 15/144105; G02B 7/09; G02B 9/34; G02B 13/06; G02B 15/16; G02B 27/646;
(Continued)

(56) References Cited

U.S. PATENT DOCUMENTS

| 5,638,216 A | 6/1997 | Horiuchi et al. |
| 2007/0109661 A1 | 5/2007 | Bito et al. |

(Continued)

FOREIGN PATENT DOCUMENTS

| JP | H05-060971 A | 3/1993 |
| JP | H06-289291 A | 10/1994 |

(Continued)

OTHER PUBLICATIONS

International Search Report from International Patent Application No. PCT/JP2017/041445, dated Feb. 20, 2018.
(Continued)

*Primary Examiner* — Joseph P Martinez
(74) *Attorney, Agent, or Firm* — SGPatents PLLC

(57) ABSTRACT

A variable magnification optical system comprising, in order from an object side, a first lens group having positive refractive power, a second lens group having negative refractive power, a third lens group having positive refractive power, and a rear lens group; upon varying magnification, the first lens group being fixed with respect to the image plane and each distance between the neighboring lens groups being varied; the rear lens group comprising a focusing lens group which is moved upon carrying out focusing; and the predetermined conditional expressions being satisfied, whereby it is possible to suppress superbly variations in aberrations upon varying the magnification.

20 Claims, 38 Drawing Sheets

(51) Int. Cl.
*G02B 9/34* (2006.01)
*G02B 13/06* (2006.01)
*G02B 15/16* (2006.01)

(58) Field of Classification Search
CPC ........ G02B 15/145113; G02B 15/1461; G02B 15/145121; G02B 15/144113; G02B 15/1451; G02B 15/145105; G02B 15/145129
See application file for complete search history.

(56) References Cited

U.S. PATENT DOCUMENTS

| | | |
|---|---|---|
| 2007/0236806 A1 | 10/2007 | Ori |
| 2011/0128416 A1 | 6/2011 | Satori et al. |
| 2012/0320251 A1 | 12/2012 | Saito |
| 2013/0120640 A1* | 5/2013 | Taki ....................... H04N 5/225 348/345 |
| 2013/0242184 A1 | 9/2013 | Matsumura |
| 2013/0321689 A1 | 12/2013 | Toyoda |
| 2017/0184829 A1 | 6/2017 | Ito |

FOREIGN PATENT DOCUMENTS

| | | |
|---|---|---|
| JP | 2007-164157 A | 6/2007 |
| JP | 2007-279351 A | 10/2007 |
| JP | 2011-118037 A | 6/2011 |
| JP | 2013-003240 A | 1/2013 |
| JP | 2013-109013 A | 6/2013 |
| JP | 2013-218290 A | 10/2013 |
| JP | 2013-254020 A | 12/2013 |
| JP | 2014-202806 A | 10/2014 |
| JP | 2017-116678 A | 6/2017 |
| WO | WO 2016/017726 A1 | 2/2016 |

OTHER PUBLICATIONS

Office Action dated Jul. 23, 2021, in Chinese Patent Application No. 201780096815.6.

* cited by examiner

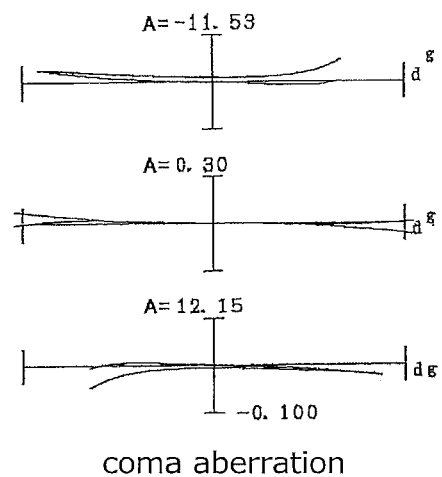
Fig.4A  coma aberration
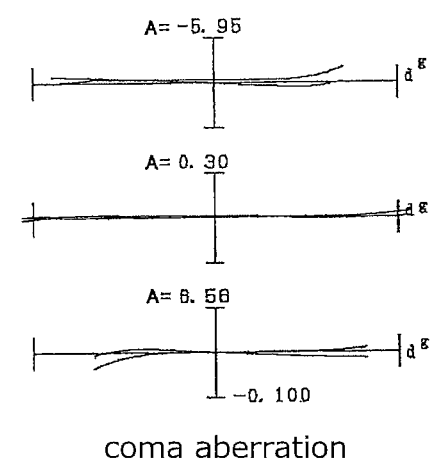
Fig.4B  coma aberration
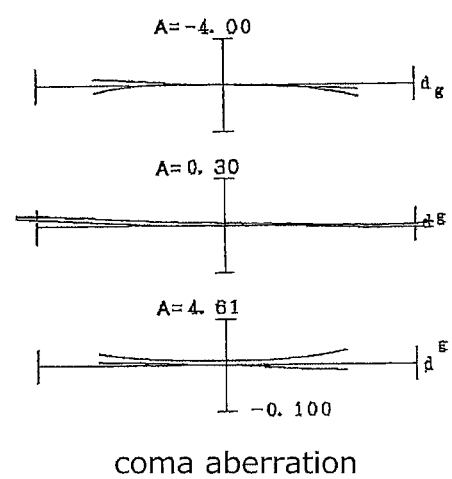
Fig.4C  coma aberration coma aberration coma aberration coma aberration coma aberration coma aberration coma aberration coma aberration coma aberration coma aberration coma aberration coma aberration coma aberration coma aberration coma aberration coma aberration coma aberration coma aberration coma aberration coma aberration coma aberration coma aberration coma aberration coma aberration coma aberration

VARIABLE POWER OPTICAL SYSTEM, OPTICAL APPARATUS, AND METHOD FOR PRODUCING VARIABLE POWER OPTICAL SYSTEM

TECHNICAL FIELD

The present invention relates to a variable magnification optical system, an optical apparatus and a method for manufacturing the variable magnification optical system.

BACKGROUND ART

There has been proposed a variable magnification optical system that is suitable to be used for a photo-taking camera, an electric still camera and a video camera. For example, refer to Japanese Patent application Laid-Open Gazette No. 2013-3240. However, in the conventional variable magnification optical system there has been a problem that variations in corrections of various aberrations are large.

PRIOR ART REFERENCE

Patent Document

Patent Document 1: Japanese Patent application Laid-Open Gazette No. 2013-3240.

SUMMARY OF THE INVENTION

The present invention is related to a variable magnification optical system comprising, in order from an object side, a first lens group having positive refractive power, a second lens group having negative refractive power, a third lens group having positive refractive power, and a rear lens group;

upon varying a magnification, the first lens group being fixed with respect to the image plane, and each distance between the neighboring lens groups being varied;

said rear lens group comprising a focusing lens group which is moved upon carrying out focusing; and the following conditional expressions being satisfied:

$$1.00 < f1/(-f2) < 5.00$$

$$0.15 < (-f2)/|fZ| < 2.00$$

where f1 denotes a focal length of said first lens group, f2 denotes a focal length of said second lens group, and fZ denotes a focal length of a lens group located in a most image side in said rear lens group.

Further, the present invention is related to a method for manufacturing a variable magnification optical system comprising, in order from an object side, a first lens group having positive refractive power, a second lens group having negative refractive power, a third lens group having positive refractive power, and a rear lens group; comprising the steps of:

constructing such that, upon varying a magnification, the first lens group is fixed with respect to the image plane, and each distance between the neighboring lens groups is varied;

constructing such that said rear lens group comprises a focusing lens group which is moved upon carrying out focusing; and constructing such that the following conditional expressions are satisfied:

$$1.00 < f1/(-f2) < 5.00$$

$$0.15 < (-f2)/|fZ| < 2.00$$

where f1 denotes a focal length of said first lens group, f2 denotes a focal length of said second lens group, and fZ denotes a focal length of a lens group located in a most image side in said rear lens group.

BRIEF DESCRIPTION OF THE DRAWINGS

FIG. 4A, FIG. 4B and FIG. 4C are graphs showing meridional transverse aberrations, upon conducting image blur correction at the time when an infinite distance object is focused by the variable magnification optical system according to the First Example, FIG. 4A showing the wide angle end state, FIG. 4B showing the intermediate focal length state, and FIG. 4C showing the telephoto end state.

EMBODIMENT FOR CARRYING OUT THE INVENTION

Figure 1:
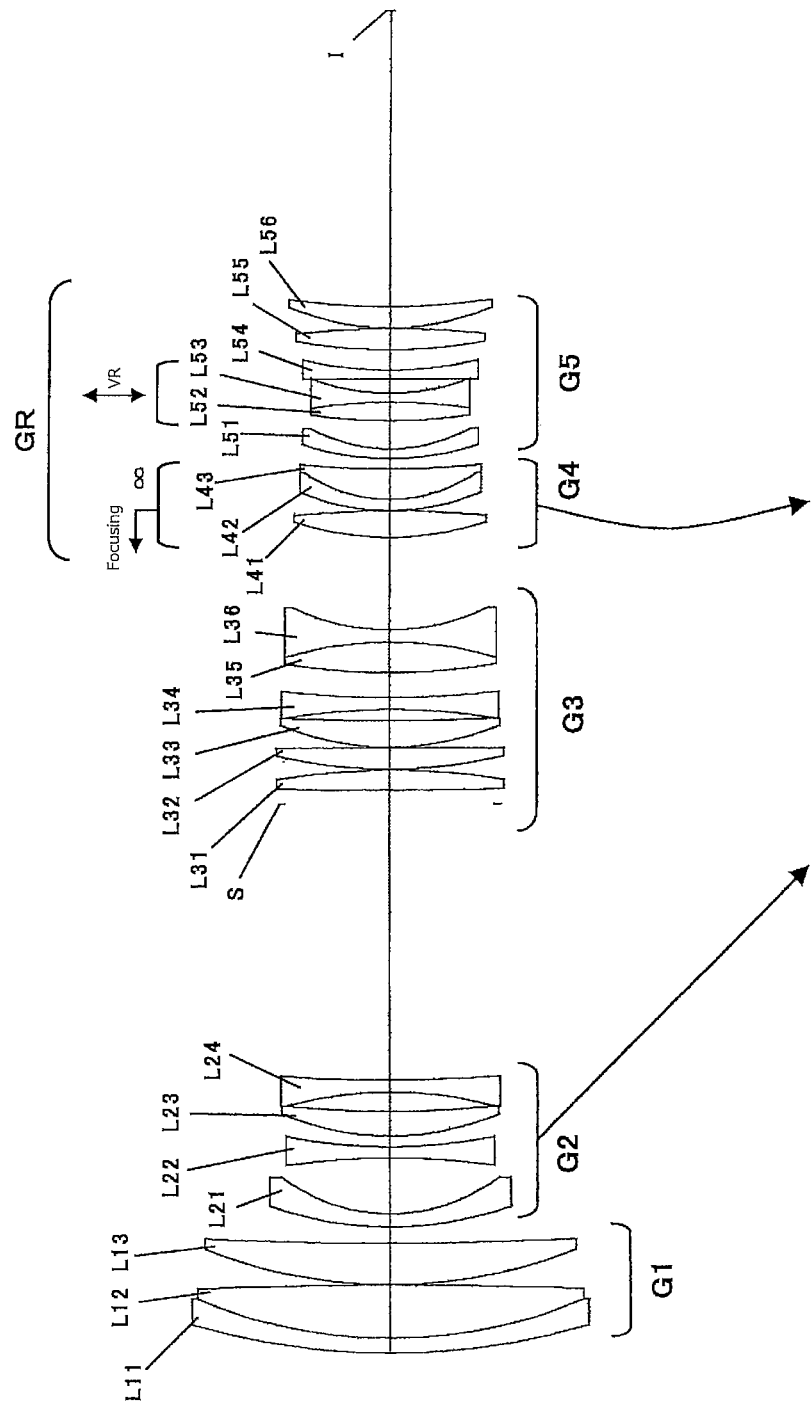
FIG. 1 is a cross sectional view in a wide angle end state of a variable magnification optical system according to a First Example.

Next, a variable magnification optical system according to the present embodiment, an optical apparatus and a method for producing the variable magnification optical system, will be explained. At first, the variable magnification optical system according to the present embodiment, will be explained.

The variable magnification optical system according to the present embodiment, comprises, in order from an object side, a first lens group having positive refractive power, a second lens group having negative refractive power, a third lens group having positive refractive power, and a rear lens group;

upon varying a magnification, the first lens group being fixed with respect to the image plane, and each distance between the neighboring lens groups being varied;

said rear lens group comprising a focusing lens group which is moved upon carrying out focusing on at least a part from an infinite distance object to a close distance object; and the following conditional expressions (1) and (2) being satisfied:

$$1.00 < f1/(-f2) < 5.00 \quad (1)$$

$$0.15 < (-f2)/|fZ| < 2.00 \quad (2)$$

where f1 denotes a focal length of said first lens group, f2 denotes a focal length of said second lens group, and fZ denotes a focal length of a lens group located in a most image side in said rear lens group.

Here, the rear lens group in the present embodiment comprises at least one lens group. Meanwhile, in the present embodiment, a lens group means a portion which comprises at least one lens separated by an air space. Further, in the present embodiment, a lens component means a single lens or a cemented lens composed of two or more lenses cemented together.

In the variable magnification optical system according to the present embodiment, upon varying a magnification, the first lens group is fixed with respect to the image plane and each distance between the neighboring lens groups is varied, thereby it is possible to attain superb corrections of aberrations upon varying the magnification. Further, a focusing lens group is disposed in the rear lens group, so the focusing lens group can be made small in size and light in weight. As a result, high speed focusing can be made and variable magnification optical system and lens barrel can be made compact.

The conditional expression (1) defines a ratio of a focal length of the first lens group relative to a focal length of the second lens group. With satisfying the conditional expression (1), it is possible to correct superbly coma aberration and spherical aberration.

When the value of f1/(−f2) is equal to or exceeds the upper limit of the conditional expression (1), refractive power of the second lens group becomes large, and it becomes difficult to correct coma aberration in the wide angle end state and spherical aberration in the tele photo end state. Meanwhile, in order to secure the advantageous effect of the present embodiment surely, it is preferable to set the upper limit value of the conditional expression (1) to 4.50, and in order to secure the advantageous effect of the present embodiment more surely, it is further preferable to set the upper limit value of the conditional expression (1) to 4.00 and further more preferable to 3.80. 3.50 and 3.20.

On the other hand, when the value of f1/(−f2) is equal to or falls below the lower limit of the conditional expression (1), refractive power of the first lens group becomes large, and it becomes difficult to correct superbly spherical aberration in the tele photo end state. Meanwhile, in order to secure the advantageous effect of the present embodiment surely, it is preferable to set the lower limit value of the conditional expression (1) to 1.50. Further, in order to secure the advantageous effect of the present embodiment more surely, it is preferable to set the lower limit value of the conditional expression (1) to 2.00 and further more preferable to 2.50, 2.70 and 2.80.

The conditional expression (2) defines a ratio of the focal length of the second lens group relative to a focal length of a lens group located in a most image side in said rear lens group, and is a conditional expression for defining a suitable value. By satisfying the conditional expression (2), it is possible to correct superbly astigmatism, spherical aberration and coma aberration.

When the value of (−f2)/|fZ| is equal to or exceeds the upper limit of the conditional expression (2) of the variable magnification optical system according to the present embodiment, refractive power of the lens group located in the most image side in said rear lens group becomes large, and it becomes difficult to correct astigmatism. Meanwhile, in order to secure the advantageous effect of the present embodiment surely, it is preferable to set the upper limit value of the conditional expression (2) to 1.50. Further, in order to secure the advantageous effect of the present embodiment more surely, it is further preferable to set the upper limit value of the conditional expression (2) to 1.20, and further more preferable to 1.00, 0.95 and 0.90.

On the other hand, when the value of (−f2)/|fZ| is equal to or falls below the lower limit value of the conditional expression (2) of the variable magnification optical system according to the present embodiment, refractive power of the second lens group becomes large, and it becomes difficult to correct coma aberration in the wide angle end state and spherical aberration in the tele photo end state. Meanwhile, in order to secure the advantageous effect of the present embodiment surely, it is preferable to set the lower limit value of the conditional expression (2) to 0.18. Further, in order to secure the advantageous effect of the present embodiment more surely, it is further preferable to set the lower limit value of the conditional expression (2) to 0.20, and further more preferable to 0.22, 0.25 and 0.27.

In the variable magnification optical system according to the present embodiment, it is preferable that the following conditional expression (3) is satisfied:

$$1.50 < f1/|ff| < 5.00 \quad (3)$$

where f1 denotes the focal length of the first lens group, and ff denotes a focal length of the focusing lens group.

The conditional expression (3) defines a ratio of a focal length of the first lens group relative to a focal length of the focusing lens group, and is a conditional expression for defining a suitable value. With satisfying the conditional expression (3), the variable magnification optical system according to the present embodiment can correct superbly spherical aberration upon focusing and curvature of field.

When the value of f1/|ff| is equal to or exceeds the upper limit value of the conditional expression (3) of the variable magnification optical system according to the present embodiment, refractive power of the focusing lens group becomes large, and it becomes difficult to correct spherical aberration upon focusing and curvature of field.

Meanwhile, in order to secure the advantageous effect of the present embodiment surely, it is preferable to set the upper limit value of the conditional expression (3) to 4.50. Further, in order to secure the advantageous effect of the present embodiment more surely, it is further preferable to set the upper limit value of the conditional expression (3) to 4.20, and further more preferable to 4.00, to 3.80 and to 3.70.

On the other hand, when the value of f1/|ff| in the conditional expression (3) of the variable magnification optical system according to the present embodiment, is equal to or falls below the lower limit value, refractive power of the first lens group becomes large, and it becomes difficult to correct spherical aberration in the tele photo end state. Meanwhile, in order to secure the advantageous effect of the present embodiment surely, it is preferable to set the lower limit value of the conditional expression (3) to 1.80. Further, in order to secure the advantageous effect of the present embodiment more surely, it is preferable to set the lower limit value of the conditional expression (3) to 2.00, and further to 2.10, to 2.20 and further more to 2.30.

In the variable magnification optical system according to the present embodiment, it is preferable that at least a part of lens groups in the rear lens group is fixed with respect to the image plane, upon carrying out focusing. With taking such a configuration, it is possible to make a drive mechanism simplify and to make lens barrel be compact.

Further, in the variable magnification optical system according to the present embodiment, it is desirable that the following conditional expression (4) is satisfied:

$$0.050 < \Sigma G1/TL < 0.150 \qquad (4)$$

where ΣG1 denotes a total thickness of the first lens group, and TL denotes a total optical length of the variable magnification optical system.

The conditional expression (4) defines a ratio of the total thickness, that is, a thickness along the optical axis, of the first lens group relative to the total optical length of the variable magnification optical system, and is a conditional expression for defining a proper value. With satisfying the conditional expression (4), the lens barrel can be made small in size and light in weight.

Meanwhile, the total thickness of the first lens group, or the thickness of the first lens group along the optical axis, refers to a distance along the optical axis from a most object side lens surface to a most image side lens surface in the first lens group. The total optical length of the variable magnification optical system refers to a distance along the optical axis from a most object side lens surface upon focusing on an infinite distance object, to the image plane.

When the value of ΣG1/TL is equal to or exceeds the upper limit value of the conditional expression (4) of the variable magnification optical system according to the present embodiment, the thickness along the optical axis of the first lens group becomes large, and it becomes difficult to make the lens barrel small in size and light in weight. Meanwhile, in order to secure the advantageous effect of the present embodiment surely, it is preferable to set the upper limit value of the conditional expression (4) to 0.130. Further, in order to secure the advantageous effect of the present embodiment more surely, it is preferable to set the upper limit value of the conditional expression (4) to 0.110, and further more preferable to 0.100, 0.095 and 0.090.

On the other hand, when the value of ΣG1/TL in the conditional expression (4) of the variable magnification optical system according to the present embodiment, is equal to or falls below the lower limit value, refractive power of the first lens group becomes weak, and if it is intended to make the lens barrel small-sized, refractive power of the rear lens group becomes large, thus it becoming difficult to correct astigmatism.

Meanwhile, in order to secure the advantageous effect of the present embodiment more surely, it is preferable to set the lower limit value of the conditional expression (4) to 0.053, and further more preferable to 0.055, 0.060, 0.062 and 0.065.

In the variable magnification optical system according to the present embodiment, it is desirable that the following conditional expression (5) is satisfied:

$$0.50 < f3/(-f2) < 4.50 \qquad (5)$$

where f3 denotes a focal length of the third lens group, and f2 denotes the focal length of the second lens group.

The conditional expression (5) defines a ratio of the focal length of the third lens group relative to the focal length of the second lens group and is a conditional expression for defining a proper value. With satisfying the conditional expression (5), the variable magnification optical system according to the present embodiment can superbly correct spherical aberration and coma aberration.

When the value of f3/(−f2) is equal to or exceeds the upper limit value of the conditional expression (5) of the variable magnification optical system according to the present embodiment, refractive power of the second lens group becomes large and it becomes difficult to correct coma aberration in the wide angle end state and spherical aberration in the telephoto end state. Meanwhile, in order to secure the advantageous effect of the present embodiment surely, it is preferable to set the upper limit value of the conditional expression (5) to 4.00. Further, in order to secure the advantageous effect of the present embodiment more surely, it is preferable to set the upper limit value of the conditional expression (5) to 3.50, and further more preferable to 3.00, to 2.80 and to 2.60.

On the other hand, when the value of f3/(−f2) in the conditional expression (5) of the variable magnification optical system according to the present embodiment, is equal to or falls below the lower limit value, refractive power of the third lens group becomes large, and it becomes difficult to correct spherical aberration in the telephoto end state. Meanwhile, in order to secure the advantageous effect of the present embodiment surely, it is preferable to set the lower limit value of the conditional expression (5) to 0.60. Further, in order to secure the advantageous effect of the present embodiment more surely, it is preferable to set the lower limit value of the conditional expression (5) to 0.65, and further more preferable to 0.70, to 0.75 and to 0.78.

In the variable magnification optical system according to the present embodiment, it is desirable that the following conditional expression (6) is satisfied:

$$1.00 < f1/fw < 3.00 \qquad (6)$$

where f1 denotes the focal length of the first lens group, and fw denotes a focal length of the variable magnification optical system in the wide angle end state.

The conditional expression (6) defines a ratio of the focal length of the first lens group relative to the focal length of the variable magnification optical system in the wide angle end state, and is a conditional expression for defining a proper value. With satisfying the conditional expression (6), it is possible to make the lens barrel small in size, and to correct superbly spherical aberration and other various aberrations upon varying magnification.

When the value of f1/fw is equal to or exceeds the upper limit value of the conditional expression (6) of the variable magnification optical system according to the present embodiment, refractive power of the first lens group becomes small and it becomes difficult to make the lens barrel small in size. Meanwhile, in order to secure the advantageous effect of the present embodiment surely, it is preferable to set the upper limit value of the conditional expression (6) to 2.70. Further, in order to secure the advantageous effect of the present embodiment more surely, it is preferable to set the upper limit value of the conditional expression (6) to 2.60, and further more preferable to 2.50, to 2.45 and to 2.40.

On the other hand, when the value of f1/fw in the conditional expression (6) of the variable magnification optical system according to the present embodiment, is equal to or falls below the lower limit value, refractive power of the first lens group becomes large, and it becomes difficult to correct spherical aberration and other various aberrations upon varying magnification. Meanwhile, in order to secure the advantageous effect of the present embodiment surely, it is preferable to set the lower limit value of the conditional expression (6) to 1.40. Further, in order to secure the advantageous effect of the present embodiment more surely, it is preferable to set the lower limit value of the conditional expression (6) to 1.50, and further more preferable to 1.55, to 1.60 and to 1.62.

Further, in the variable magnification optical system according to the present embodiment, it is desirable that said first lens group comprises one negative lens, and the following conditional expression (7) is satisfied:

$$nd1>1.700 \qquad (7)$$

where nd1 denotes refractive index of a negative lens in the first lens group.

The conditional expression (7) is a conditional expression for defining the refractive index of the negative lens in the first lens group. With satisfying the conditional expression (7), it is possible to correct superbly spherical aberration in the telephoto end state.

When the value of nd1 in the conditional expression (7) of the variable magnification optical system according to the present embodiment, is equal to or falls below the lower limit value, it becomes difficult to correct spherical aberration in the telephoto end state. Meanwhile, in order to secure the advantageous effect of the present embodiment surely, it is preferable to set the lower limit value of the conditional expression (7) to 1.800, and furthermore preferable to 1.820, to 1.840, to 1.870 and to 1.900.

In the variable magnification optical system according to the present embodiment, it is desirable that the following conditional expression (8) is satisfied:

$$8.00<\omega w<25.00 \qquad (8)$$

where $\omega w$ denotes a half angle of view of the variable magnification optical system in the wide angle end state.

The conditional expression (8) is a conditional expression for defining a condition defining a half angle of view of the variable magnification varying optical system in the wide angle end state. With satisfying the conditional expression (8), the variable magnification optical system according to the present embodiment can correct superbly various aberrations such as coma aberration, distortion, and curvature of field, while having proper wide angle of view.

When the value of $\omega w$ is equal to or exceeds the upper limit value of the conditional expression (8) of the variable magnification optical system according to the present embodiment, the angle of view becomes too large, so it becomes difficult to correct superbly various aberrations such as coma aberration, distortion, curvature of field and others, while maintaining proper angle of view.

Meanwhile, in order to secure the advantageous effect of the present embodiment surely, it is preferable to set the upper limit value of the conditional expression (8) to 20.00, and further preferable to 18.00, to 17.50, to 17.00 and to 16.90.

On the other hand, when the value of $\omega w$ in the conditional expression (8) of the variable magnification optical system according to the present embodiment, is equal to or falls below the lower limit value, the angle of view becomes small and it becomes difficult to correct superbly various aberrations. Meanwhile, in order to secure the advantageous effect of the present embodiment surely, it is preferable to set the lower limit value of the conditional expression (8) to 9.00, and further preferable to 9.50, to 10.00, to 10.30 and to 10.50.

Further, it is desirable that in the variable magnification optical system according to the present embodiment the rear lens group comprises, disposed in order from the object side, a focusing lens group and a fixed lens group fixed with respect to the image plane upon varying magnification. With taking such a configuration, it is possible to make a drive mechanism simple and to make lens barrel compact.

Further, it is desirable that the variable magnification optical system according to the present embodiment comprises an aperture stop between the second lens group and the rear lens group. With taking such a configuration, the variable magnification optical system according to the present embodiment can correct effectively coma aberration and curvature of field.

Further, it is desirable that in the variable magnification optical system according to the present embodiment at least apart of the rear lens group is movable to have a component perpendicular to the optical axis. With taking such a configuration, it is possible to correct displacement of an imaging position caused by a camera shake, in other words, to conduct vibration reduction. With this configuration, an eccentric coma aberration and curvature of field at the time when the vibration reduction is conducted, can be effectively corrected.

In the variable magnification optical system according to the present embodiment, it is desirable that the focusing lens group consists of one lens group. With taking such a configuration, it is possible to simplify the drive mechanism and to make the lens barrel small in size.

Further, the optical apparatus of the present embodiment is equipped with the variable magnification optical system having the above described configuration, so it is possible to realize an optical apparatus which can correct variations in aberrations upon varying the magnification superbly.

Further, a method for manufacturing a variable magnification optical system according to the present embodiment, is a method for manufacturing a variable magnification optical system which comprises, in order from an object side, a first lens group having positive refractive power, a second lens group having negative refractive power, a third lens group having positive refractive power, and a rear lens group; comprising the steps of:

constructing such that, upon varying a magnification, the first lens group is fixed with respect to the image plane, and each distance between the neighboring lens groups is varied; and such that said rear lens group comprises a focusing lens group which is moved upon carrying out focusing at least a part from an infinite distance object to a close distance object; and the following conditional expressions (1) and (2) being satisfied:

$$1.00 < f1/(-f2) < 5.00 \quad (1)$$

$$0.15 < (-f2)/|fZ| < 2.00 \quad (2)$$

where f1 denotes a focal length of said first lens group, f2 denotes a focal length of said second lens group, and fZ denotes a focal length of a lens group located in a most image side in said rear lens group. By this method, it is possible to manufacture the variable magnification optical system which can correct superbly variations in aberrations upon varying the magnification.

Numerical Examples

Hereinafter, the variable magnification optical systems relating to numerical examples relating to the present invention will be explained with reference to the accompanying drawings.

First Example

FIG. 1 is a sectional view of a variable magnification optical system in a wide angle end state according to a First Example. In FIG. 1 and FIG. 5, FIG. 9, FIG. 13, FIG. 17, FIG. 21, FIG. 25, FIG. 29 and FIG. 33 described later, arrows show movement trajectories of the respective lens groups upon varying magnification from a wide angle end state to a telephoto end state.

The variable magnification optical system according to the present Example is composed of, in order from an object side along the optical axis, a first lens group G1 having positive refractive power, a second lens group G2 having negative refractive power, an aperture stop S, a third lens group G3 having positive refractive power, and a rear lens group GR.

The first lens group G1 consists of, in order from the object side along the optical axis, a cemented positive lens constructed by a negative meniscus lens L11 having a convex surface facing the object side cemented with a double convex positive lens L12, and a positive meniscus lens L13 having a convex surface facing the object side.

The second lens group G2 consists of, in order from the object side along the optical axis, a negative meniscus lens L21 having a convex surface facing the object side, a double concave negative lens L22, a positive meniscus lens L23 having a convex surface facing the object side, and a double concave negative lens L24.

The third lens group G3 consists of, in order from the object side along the optical axis, the aperture stop S, a double convex positive lens L31, a plano-convex lens L32 having a convex surface facing the object side, a positive meniscus lens L33 having a convex surface facing the object side, a double concave negative lens L34, and a cemented negative lens constructed by a double convex positive lens L35 cemented with a double concave negative lens L36.

The rear lens group GR is composed of, in order from the object side along the optical axis, a fourth lens group G4 having positive refractive power, and a fifth lens group G5 having negative refractive power.

The fourth lens group G4 consists of a double convex positive lens L41 and a cemented positive lens constructed by a negative meniscus lens L42 having a convex surface facing the object side cemented with a positive meniscus lens L43 having a convex surface facing the object side.

The fifth lens group G5 consists of a negative meniscus lens L51 having a convex surface facing the object side, a cemented negative lens constructed by a double convex positive lens L52 cemented with a double concave negative lens L53, a plano-concave lens L54 having a concave surface facing the image side, a double convex positive lens L55 and a positive meniscus lens L56 having a convex surface facing the object side.

On the image plane I, an imaging device (not shown) composed of CCD, CMOS or the like, is disposed.

In the variable magnification optical system according to the present Example, composed as described above, upon varying magnification from the wide angle end state to the telephoto end state, the second lens group G2 and the fourth lens group G4 are moved along the optical axis such that a distance between the first lens group G1 and the second lens group G2, a distance between the second lens group G2 and the third lens group G3, a distance between the third lens group G3 and the fourth lens group G4 and a distance between the fourth lens group G4 and the fifth lens group G5, are varied respectively. In detail, the second lens group G2 is moved toward the image side and the fourth lens group G4 is once moved toward the object side and then moved toward the image side. Meanwhile, upon varying the magnification from the wide angle end state to the telephoto end state, the first lens group G1, the third lens group G3 and the fifth lens group G5 are fixed with respect to the image plane I.

In the variable magnification optical system according to the present Example, focusing from an infinite distance object to a finite distance object is carried out by moving the fourth lens group G4 toward the object side along the optical axis as focusing lens group.

In the variable magnification optical system according to the present Example, correction of image plane, that is, vibration reduction at the time when image blur occurs, is conducted by moving the cemented negative lens constructed by the double convex positive lens L52 cemented with the double concave negative lens L53 and the plano-concave lens L54 having the concave surface facing the image side in the fifth lens group G5 as vibration reduction lens group, to have a component in the direction perpendicular to the optical axis.

Table 1 below shows various values of the variable magnification optical system relating to the present Example.

In [Surface Data], "m" denotes an order of an optical surface counted from the object side, "r" denotes a radius of curvature, "d" denotes a surface-to-surface distance, that is, an interval from an n-th surface to an (n+1)-th surface, where n is an integer, "vd" denotes an Abbe number for d-line (wavelength λ=587.6 nm) and "nd" denotes refractive index for d-line (wavelength λ=587.6 nm). Further, "OP" denotes an object surface, "D" denotes a variable surface-to-surface distance, "S" denotes an aperture stop, and "I" denotes an image plane. Meanwhile, radius of curvature r=∞ denotes a plane surface, and refractive index of the air nd=1.00000 is omitted. In addition, an aspherical surface is expressed by attaching "*" to the surface number, and in the column of the radius of curvature "r", a paraxial radius of curvature is shown.

In [Aspherical Data], with respect to an aspherical surface, an aspherical surface coefficient and a conical coefficient are shown in the case where the aspherical surface is exhibited by the following expression:

$$X=(h^2/r)/[1+[1-\kappa(h/r)^2]^{1/2}]+A4h^4+A6h^6$$

where "h" denotes a height in the direction perpendicular to the optical axis, "x" denotes a sag amount that is a distance along the optical axis from the tangent surface at the vertex of the aspherical surface to the aspherical surface at the height "h"; "κ" denotes a conical coefficient; "A4" and "A6" denote respective aspherical coefficients, and "r" denotes a paraxial radius of curvature that is a radius of curvature of a reference sphere. "E-n", where n is an integer, denotes "×10$^{-n}$", for example, "1.234E-05" denotes "1.234×10$^{-5}$". "A2" denotes second order aspherical coefficient is 0 and omitted.

In [Various Data], "F" denotes a focal length of the variable magnification optical system, "FNO" denotes an F-number, "2ω" denotes an angle of view (unit "°"), "Y" denotes a maximum image height, and "TL" denotes a total length of the variable magnification optical system according to the present Example, that is, a distance along the optical axis from the first lens surface to the image plane I. "BF" denotes a back focus, that is, a distance along the optical axis from the most image side lens surface to the image plane I. Meanwhile, "W" denotes a wide angle end state, "M" denotes an intermediate focal length state, "T" denotes a tele photo end state.

In [Variable Distance Data], "D" denotes each of variable face-to-face distance shown in [Surface Data]. Meanwhile, "Infinite Distance" denotes a state where an infinite distance object is focused, "Finite Distance" denotes a finite distance where a finite distance object is focused, "W" denotes a wide angle end state, "M" denotes an intermediate focal length state, "T" denotes a tele photo end state.

In [Lens Group Data], a starting surface ST and a focal length of each lens group are shown.

In [Vibration Reduction Data], "F" denotes a focal length of the variable magnification optical system, "K" denotes a vibration reduction coefficient, "θ" denotes an angle of rotational blur (inclination angle, (unit "°")), Z denotes an amount of shift, that is, an amount of movement of the variable reduction lens group in the direction perpendicular to the optical axis. Meanwhile, "W" denotes a wide angle end state, "M" denotes an intermediate focal length state, "T" denotes a tele photo end state.

In [Values for Conditional Expressions], values corresponding to respective conditional expressions of the variable magnification optical system according to the present Example, are shown.

It is noted, here, that "mm" is generally used for the unit of length such as the focal length f, the radius of curvature r and the unit for other lengths shown in Table 1. However, since similar optical performance can be obtained by an optical system proportionally enlarged or reduced, the unit is not necessarily to be limited to "mm".

Meanwhile, the explanation of reference symbols in Table 1 described above, is the same in Tables for the other Examples described herein later.

TABLE 1

First Example

[Surface Data]

| m | r | d | νd | nd |
|---|---|---|---|---|
| OP | ∞ | | | |
| 1 | 127.304 | 2.800 | 29.37 | 1.950000 |
| 2 | 89.338 | 9.900 | 82.57 | 1.497820 |
| 3 | −998.249 | 0.100 | | |
| 4 | 92.013 | 7.700 | 95.25 | 1.433852 |
| 5 | 696.987 | D1 | | |
| 6 | 67.306 | 2.400 | 50.27 | 1.719990 |
| 7 | 33.224 | 10.250 | | |
| 8 | −131.888 | 2.000 | 63.34 | 1.618000 |
| 9 | 100.859 | 2.000 | | |
| 10 | 53.850 | 4.400 | 23.83 | 1.846660 |
| 11 | 193.868 | 3.550 | | |
| 12 | −73.371 | 2.200 | 65.44 | 1.603000 |
| 13 | 288.683 | D2 | | |
| 14 (S) | ∞ | 2.500 | | |
| 15 | 581.555 | 3.700 | 42.73 | 1.834810 |
| 16 | −130.482 | 0.200 | | |
| 17 | 90.329 | 3.850 | 67.90 | 1.593190 |
| 18 | ∞ | 0.200 | | |
| 19 | 52.765 | 4.900 | 82.57 | 1.497820 |
| 20 | 448.658 | 2.043 | | |
| 21 | −118.745 | 2.200 | 29.12 | 2.001000 |
| 22 | 173.228 | 4.550 | | |
| 23 | 114.635 | 5.750 | 35.73 | 1.902650 |
| 24 | −66.799 | 2.200 | 40.98 | 1.581440 |
| 25 | 41.996 | D3 | | |
| 26 | 57.835 | 4.800 | 82.57 | 1.497820 |
| 27 | −190.076 | 0.100 | | |
| 28 | 44.190 | 2.000 | 29.37 | 1.950000 |
| 29 | 28.478 | 5.550 | 67.90 | 1.593190 |
| 30 | 166.406 | D4 | | |
| 31 | 52.698 | 1.800 | 46.60 | 1.804000 |
| 32 | 31.187 | 5.150 | | |
| 33 | 102.833 | 3.350 | 23.83 | 1.846660 |
| 34 | −102.758 | 1.600 | 50.27 | 1.719990 |
| 35 | 42.059 | 2.583 | | |
| 36 | 0.000 | 1.600 | 32.33 | 1.953750 |
| 37 | 68.581 | 3.750 | | |
| 38 | 101.229 | 3.850 | 67.90 | 1.593190 |
| 39 | −172.177 | 0.150 | | |
| 40 | 47.985 | 3.900 | 50.27 | 1.719990 |
| 41 | 137.994 | BF | | |
| I | ∞ | | | |

[Various Data]
Variable magnification ratio 2.74

| | W | M | T |
|---|---|---|---|
| F | 71.5 | 135.0 | 196.0 |
| FNo | 2.9 | 2.9 | 2.9 |
| 2ω | 22.4 | 41.1 | 57.9 |
| Y | 21.6 | 21.6 | 21.6 |
| TL | 246 | 246 | 246 |
| BF | 54 | 54 | 54 |

[Variable Distance Data]

| | Infinite Distance | | | Finite Distance | | |
|---|---|---|---|---|---|---|
| | W | M | T | W | M | T |
| D1 | 3.014 | 34.034 | 50.952 | 3.014 | 34.034 | 50.952 |
| D2 | 50.598 | 19.577 | 2.660 | 50.598 | 19.577 | 2.660 |
| D3 | 16.922 | 14.105 | 16.921 | 14.966 | 7.506 | 2.928 |
| D4 | 1.903 | 4.720 | 1.903 | 3.858 | 11.318 | 15.897 |

TABLE 1-continued

First Example

[Lens Group Data]

| Group | ST | f |
|---|---|---|
| f1 | 1 | 143.951 |
| f2 | 6 | −45.574 |
| f3 | 14 | 94.464 |
| f4 | 26 | 58.195 |
| f5 | 31 | −109.088 |

[Vibration Reduction Data]

| | f | K | θ | Z |
|---|---|---|---|---|
| W | 71.5 | −1.21 | 0.3 | −0.31 |
| M | 135.0 | −1.21 | 0.3 | −0.58 |
| T | 196.0 | −1.21 | 0.3 | −0.85 |

[Values for Conditional Expressions]

(1) f1/(−f2) = 3.1586
(2) f2/|fZ| = 0.4178
(3) f1/|ff| = 2.4736
(4) ΣG1/TL = 0.0833
(5) f3/(−f2) = 2.0728
(6) f1/fw = 2.0133
(7) nd1 = 1.9500
(8) ωw = 11.200

Figure 2A:
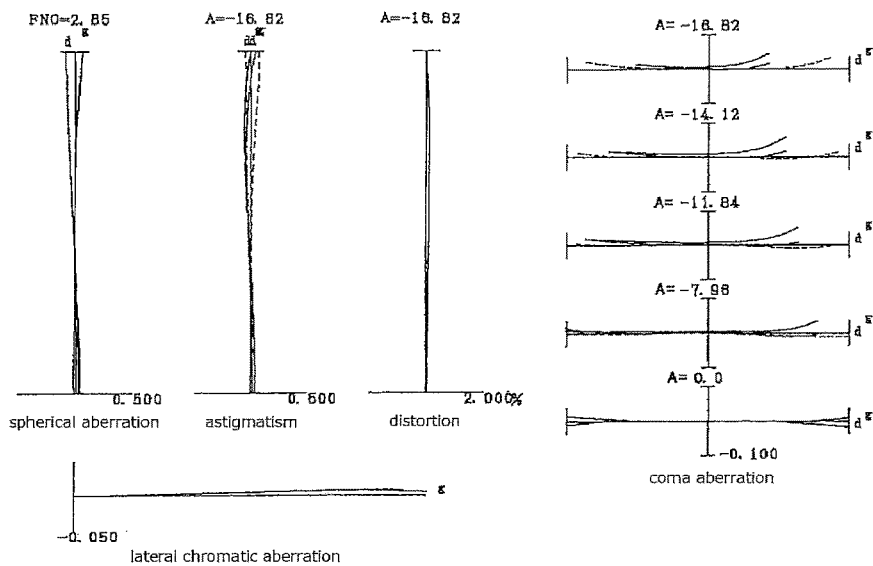
FIG. 2A, FIG. 2B and FIG. 2C are graphs showing various aberrations, upon focusing on an infinite distance object, of the variable magnification optical system according to the First Example, FIG. 2A showing the wide angle end state, FIG. 2B showing the intermediate focal length state, and FIG. 2C showing the telephoto end state.
Figure 2B:
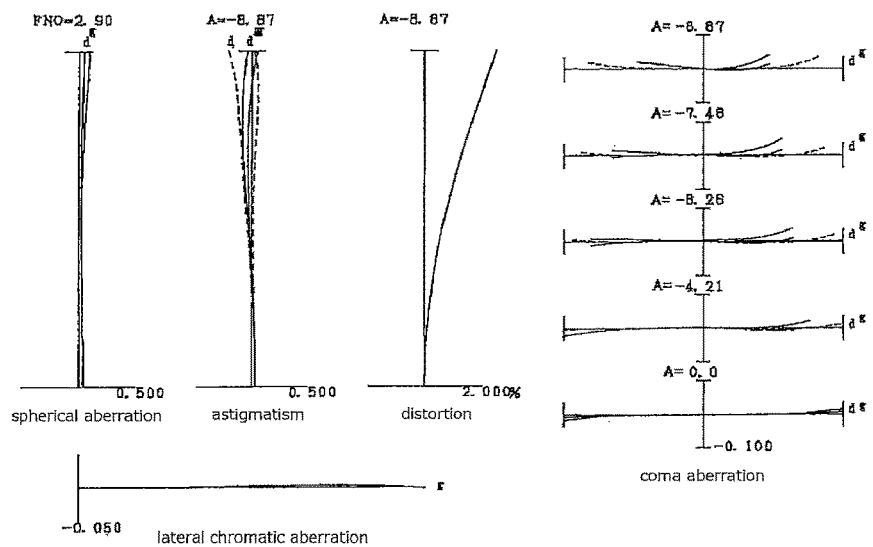
Figure 2C:
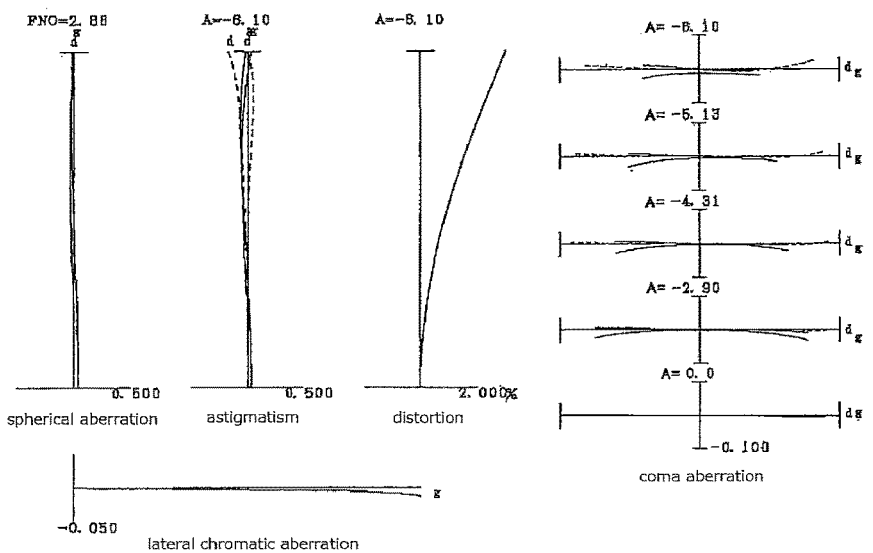

FIGS. 2A, 2B and 2C are graphs showing various aberrations upon focusing on an infinite distance object, respectively, of the variable magnification optical system according to the First Example, FIG. 2A showing the wide angle end state, FIG. 2B showing the intermediate focal length state and FIG. 2C showing the telephoto end state.

Figure 3A:
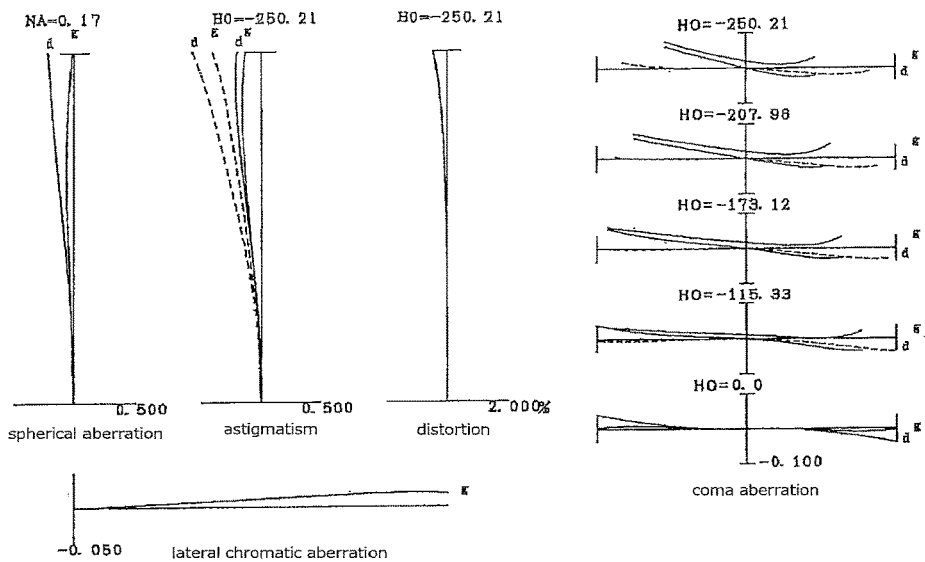
FIG. 3A, FIG. 3B and FIG. 3C are graphs showing various aberrations, upon focusing on a finite distance object, of the variable magnification optical system according to the First Example, FIG. 3A showing the wide angle end state, FIG. 3B showing the intermediate focal length state, and FIG. 3C showing the telephoto end state.
Figure 3B:
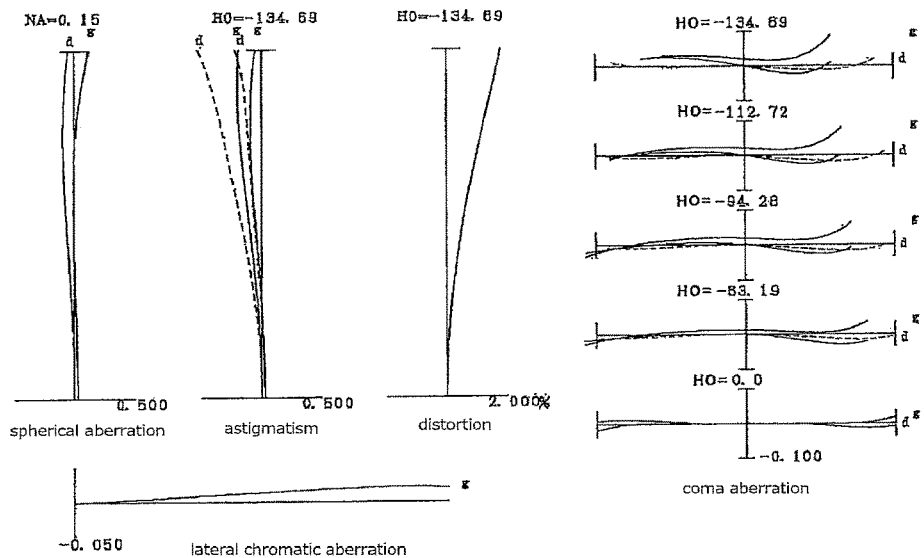
Figure 3C:
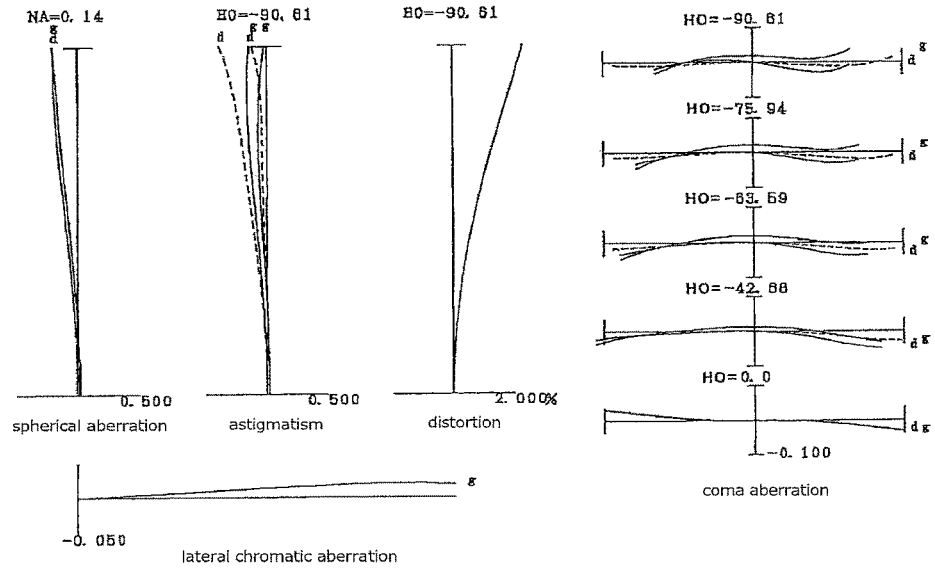

FIGS. 3A, 3B and 3C are graphs showing various aberrations, upon focusing on a finite distance object, of the variable magnification optical system according to the First Example, FIG. 3A showing the wide angle end state, FIG. 3B showing the intermediate focal length state, and FIG. 3C showing the telephoto end state.

FIGS. 4A, 4B and 4C are graphs showing meridional transverse aberrations, upon conducting image blur correction at the time when an infinite distance object is focused by the variable magnification optical system according to the First Example, FIG. 4A showing the wide angle end state, FIG. 4B showing the intermediate focal length state, and FIG. 4C showing the telephoto end state.

In the graphs showing respective aberrations, "FNO" denotes an F-number, "A" denotes an incident angle of light rays, that is, a half angle of view (unit "°"), "NA" denotes a numerical aperture, and "HO" denotes an object height (unit "mm"). In detail, in graphs showing spherical aberration, the value of F-number FNO or the numerical aperture NA corresponding to the maximum aperture is shown. In graphs showing astigmatism and distortion, the maximum value of the object height HO or the half angle of view A is shown. In graphs showing coma aberration, respective object heights HO or the maximum values for half angle of view are shown. In respective graphs of aberrations, "d" denotes aberration for d-line (wavelength λ=587.6 nm), and "g" denotes aberration for g-line (wavelength λ=435.8 nm), and graphs with "d" or "g" being not attached, show aberration for d-line. In graphs showing astigmatism, a solid line indicates a sagittal image plane, and a broken line indicates a meridional image plane. In graphs showing coma aberrations, meridional coma aberrations for d-line and g-line are indicated. In graphs showing coma aberrations, coma aberrations in respective object heights HO or half angle of view A are shown. Meanwhile, in graphs showing various aberrations in the other Examples as described below, the same symbols as in the present Example are employed.

As is apparent from the above-mentioned graphs showing aberrations, the variable magnification optical system relating to the present Example can suppress superbly variations in aberrations upon varying the magnification, and correct superbly various aberrations from the state where an infinite distance object is focused to the state where a finite distance object is focused, and has high optical performance. Further, the variable magnification optical system relating to the present Example has an excellent imaging property even at the time when vibration reduction is conducted.

Second Example

Figure 5:
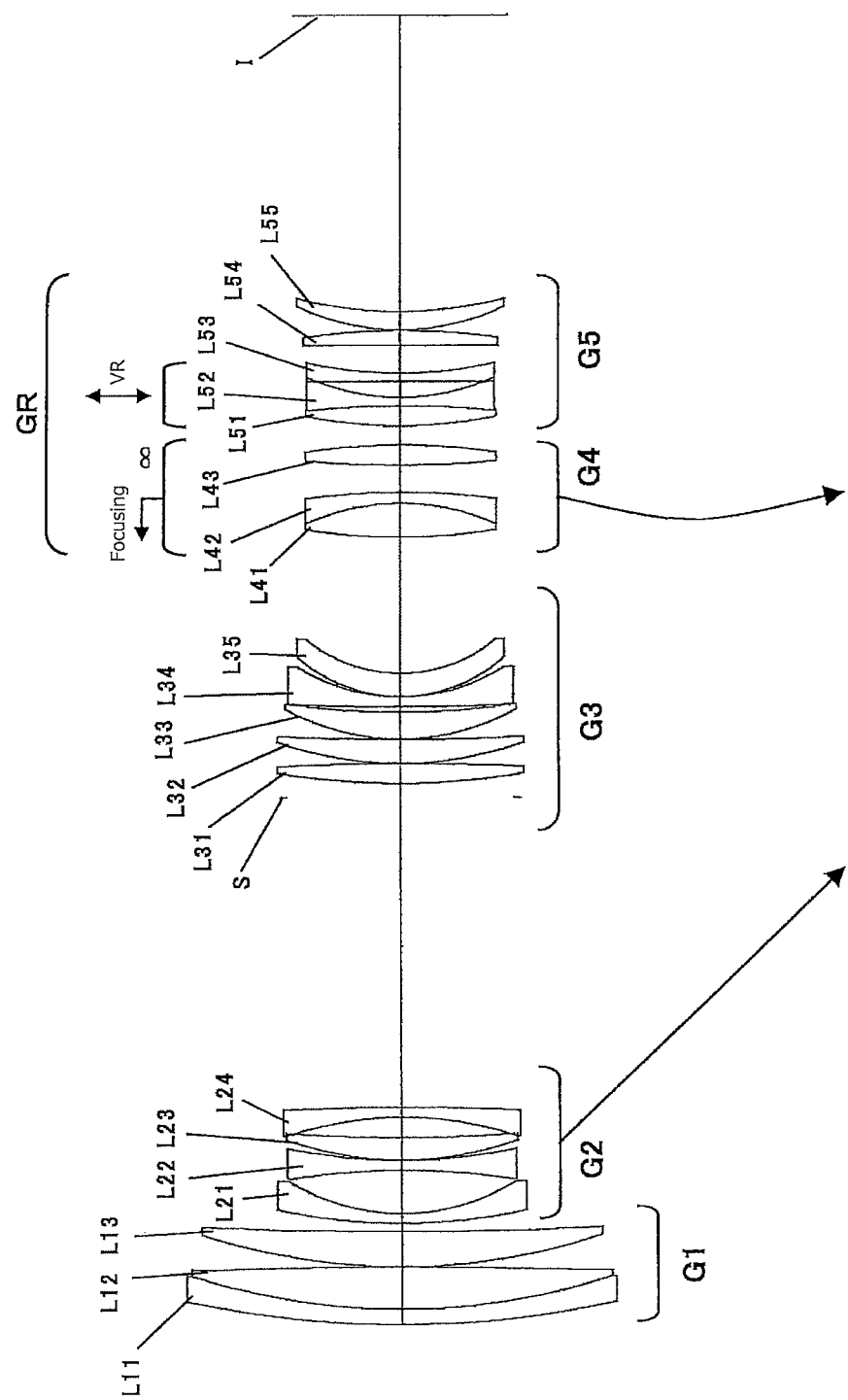
FIG. 5 is a cross sectional view in a wide angle end state of a variable magnification optical system according to a Second Example.

FIG. 5 is a sectional view of a variable magnification optical system in a wide angle end state according to a Second Example.

The variable magnification optical system according to the present Example is composed of, in order from an object side along the optical axis, a first lens group G1 having positive refractive power, a second lens group G2 having negative refractive power, a third lens group G3 having positive refractive power and a rear lens group GR.

The first lens group G1 consists of, in order from the object side along the optical axis, a cemented positive lens constructed by a negative meniscus lens L11 having a convex surface facing the object side cemented with a double convex positive lens L12, and a positive meniscus lens L13 having a convex surface facing the object side.

The second lens group G2 consists of, in order from the object side along the optical axis, a negative meniscus lens L21 having a convex surface facing the object, a double concave negative lens L22, a positive meniscus lens L23 having a convex surface facing the object side, and a negative meniscus lens L24 having a concave surface facing the object side.

The third lens group G3 consists of, in order from the object side along the optical axis, an aperture stop S, a double convex positive lens L31, a positive meniscus lens L32 having a convex surface facing the object side, a positive meniscus lens L33 having a convex surface facing the object side, a negative meniscus lens L34 having a convex surface facing the object side, and a positive meniscus lens L35 having a convex surface facing the object side.

The rear lens group GR is composed of, in order from the object side along the optical axis, a fourth lens group G4 having positive refractive power, and a fifth lens group G5 having negative refractive power.

The fourth lens group G4 consists of, in order from the object side along the optical axis, a cemented positive lens constructed by a double convex positive lens L41 cemented with a negative meniscus lens L42 having a concave surface facing the object side, and a double convex positive lens L43.

The fifth lens group G5 consists of, in order from the object side along the optical axis, a cemented negative lens constructed by a double convex positive lens L51 cemented with a double concave negative lens L52, a double concave negative lens L53, a double convex positive lens L54 and a positive meniscus lens L55 having a convex surface facing the object side.

On the image plane I, an imaging device (not shown) composed of CCD, CMOS or the like, is disposed.

In the variable magnification optical system according to the present Example, composed as described above, upon varying magnification from the wide angle end state to the telephoto end state, the second lens group G2 and the fourth lens group G4 are moved along the optical axis such that a distance between the first lens group G1 and the second lens group G2, a distance between the second lens group G2 and the third lens group G3, a distance between the third lens group G3 and the fourth lens group G4 and a distance between the fourth lens group G4 and the fifth lens group G5, are varied respectively. In detail, the second lens group G2 is moved toward the image side and the fourth lens group G4 is once moved toward the object side and then moved toward the image side. Meanwhile, upon varying the magnification, the first lens group G1, the third lens group G3 and the fifth lens group G5 are fixed with respect to the image plane I.

In the variable magnification optical system according to the present Example, focusing from an infinite distance object to a finite distance object is carried out by moving the fourth lens group G4 toward the object side along the optical axis as focusing lens group.

In the variable magnification optical system according to the present Example, correction of image plane at the time when image blur occurs, that is, vibration reduction is conducted by moving the cemented negative lens constructed by the double convex positive lens L51 cemented with the double concave negative lens L52 and the double concave negative lens L53 in the fifth lens group G5 as vibration reduction lens group to have a component in the direction perpendicular to the optical axis.

Table 2 below shows various values of the variable magnification optical system relating to the present Example.

TABLE 2

Second Example

[Surface Data]

| m | r | d | vd | nd |
|---|---|---|---|---|
| OP | ∞ | | | |
| 1 | 168.091 | 2.800 | 23.80 | 1.846660 |
| 2 | 113.985 | 7.600 | 82.57 | 1.497820 |
| 3 | −1342.958 | 0.100 | | |
| 4 | 105.542 | 6.500 | 82.57 | 1.497820 |
| 5 | 756.079 | D1 | | |
| 6 | 93.277 | 1.800 | 53.96 | 1.713000 |
| 7 | 35.899 | 7.963 | | |
| 8 | −123.058 | 1.800 | 52.20 | 1.517420 |
| 9 | 88.115 | 0.100 | | |
| 10 | 55.675 | 4.150 | 23.80 | 1.846660 |
| 11 | 239.180 | 3.827 | | |
| 12 | −60.290 | 1.800 | 58.82 | 1.518230 |
| 13 | −401.012 | D2 | | |
| 14 (S) | ∞ | 2.500 | | |
| 15 | 125.380 | 3.570 | 42.73 | 1.834810 |
| 16 | −451.692 | 0.100 | | |
| 17 | 60.877 | 4.360 | 67.90 | 1.593190 |
| 18 | 373.299 | 0.100 | | |
| 19 | 40.071 | 4.900 | 82.57 | 1.497820 |
| 20 | 128.851 | 0.987 | | |
| 21 | 370.600 | 1.800 | 31.16 | 1.688930 |
| 22 | 32.352 | 0.100 | | |
| 23 | 26.342 | 4.240 | 23.80 | 1.846660 |
| 24 | 25.137 | D3 | | |
| 25 | 97.606 | 6.180 | 82.57 | 1.497820 |
| 26 | −39.284 | 2.000 | 31.27 | 1.903660 |
| 27 | −123.125 | 4.984 | | |
| 28 | 183.032 | 3.720 | 40.66 | 1.883000 |
| 29 | −106.025 | D4 | | |

TABLE 2-continued

Second Example

| 30 | 77.498 | 3.750 | 23.80 | 1.846660 |
|---|---|---|---|---|
| 31 | −155.434 | 1.500 | 35.72 | 1.902650 |
| 32 | 37.559 | 2.958 | | |
| 33 | −5844.463 | 1.500 | 82.57 | 1.497820 |
| 34 | 69.608 | 5.050 | | |
| 35 | 5387.656 | 2.800 | 58.12 | 1.622990 |
| 36 | −112.327 | 0.100 | | |
| 37 | 40.488 | 3.350 | 82.57 | 1.497820 |
| 38 | 72.067 | BF | | |
| I | ∞ | | | |

[Various Data]
Variable magnification ratio 2.69

| | W | M | T |
|---|---|---|---|
| F | 72.0 | 135.0 | 194.0 |
| FNo | 2.9 | 2.9 | 2.9 |
| 2ω | 21.5 | 39.9 | 57.9 |
| Y | 21.6 | 21.6 | 21.6 |
| TL | 239 | 239 | 239 |
| BF | 54 | 54 | 54 |

[Variable Distance Data]

| | Infinite Distance | | | Finite Distance | | |
|---|---|---|---|---|---|---|
| | W | M | T | W | M | T |
| D1 | 1.500 | 37.617 | 56.701 | 1.500 | 37.617 | 56.701 |
| D2 | 56.701 | 20.584 | 1.500 | 56.701 | 20.584 | 1.500 |
| D3 | 24.968 | 21.322 | 24.968 | 22.209 | 12.365 | 6.511 |
| D4 | 3.434 | 7.080 | 3.434 | 6.192 | 16.037 | 21.890 |

[Lens Group Data]

| Group | ST | f |
|---|---|---|
| f1 | 1 | 157.007 |
| f2 | 6 | −53.476 |
| f3 | 14 | 89.612 |
| f4 | 25 | 67.129 |
| f5 | 30 | −136.615 |

[Vibration Reduction Data]

| | f | K | θ | Z |
|---|---|---|---|---|
| W | 72.0 | −1.20 | 0.3 | −0.31 |
| M | 135.0 | −1.20 | 0.3 | −0.59 |
| T | 194.0 | −1.20 | 0.3 | −0.85 |

[Values for Conditional Expressions]

(1) f1/(−f2) = 2.9360
(2) f2/|fZ| = 0.3914
(3) f1/|ff| = 2.3389
(4) ΣG1/TL = 0.0710
(5) f3/(−f2) = 1.6758
(6) f1/fw = 2.1806
(7) nd1 = 1.8466
(8) ωw = 10.750

Figure 6A:
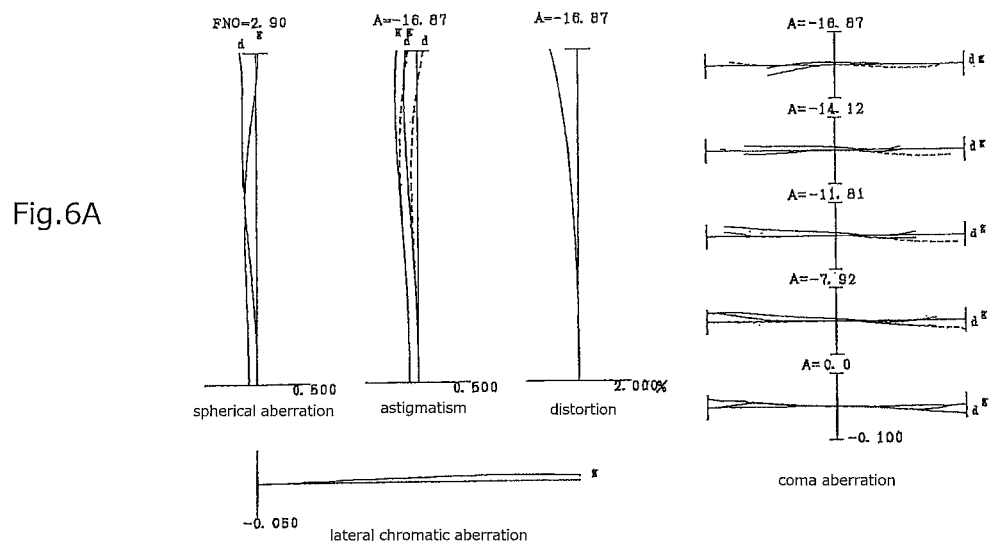
FIG. 6A, FIG. 6B and FIG. 6C are graphs showing various aberrations, upon focusing on an infinite distance object, of the variable magnification optical system according to the Second Example, FIG. 6A showing the wide angle end state, FIG. 6B showing the intermediate focal length state, and FIG. 6C showing the telephoto end state.
Figure 6B:
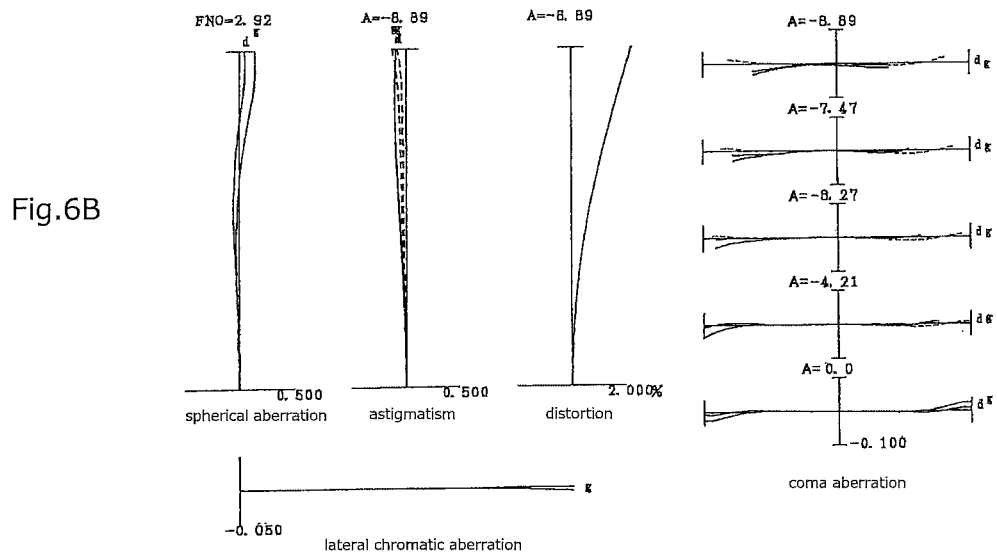
Figure 6C:
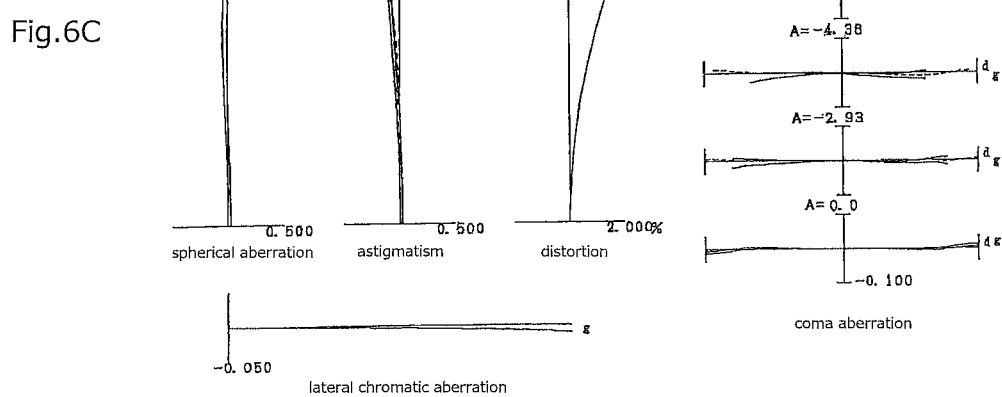

FIGS. 6A, 6B and 6C are graphs showing various aberrations upon focusing on an infinite distance object, respectively, of the variable magnification optical system according to the Second Example, FIG. 6A showing the wide angle end state, FIG. 6B showing the intermediate focal length state and FIG. 6C showing the telephoto end state.

Figure 7A:
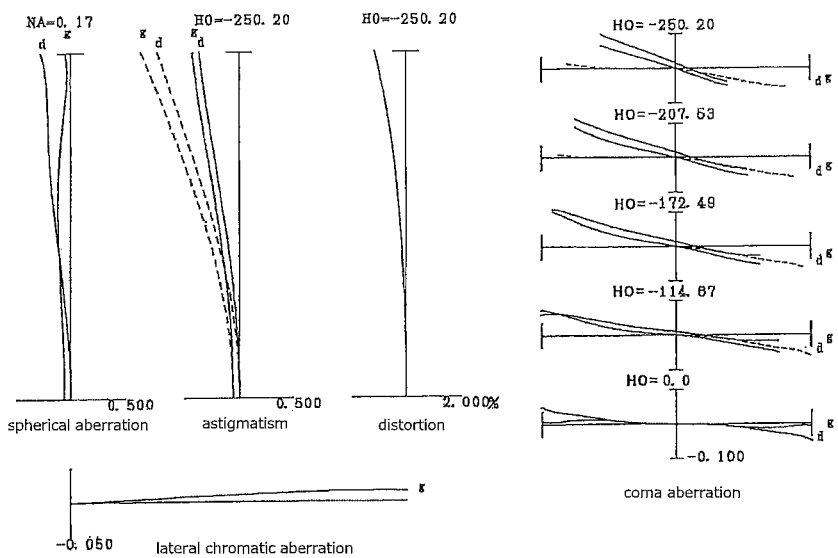
FIG. 7A, FIG. 7B and FIG. 7C are graphs showing various aberrations, upon focusing on a finite distance object, of the variable magnification optical system according to the Second Example, FIG. 7A showing the wide angle end state, FIG. 7B showing the intermediate focal length state, and FIG. 7C showing the telephoto end state.
Figure 7B:
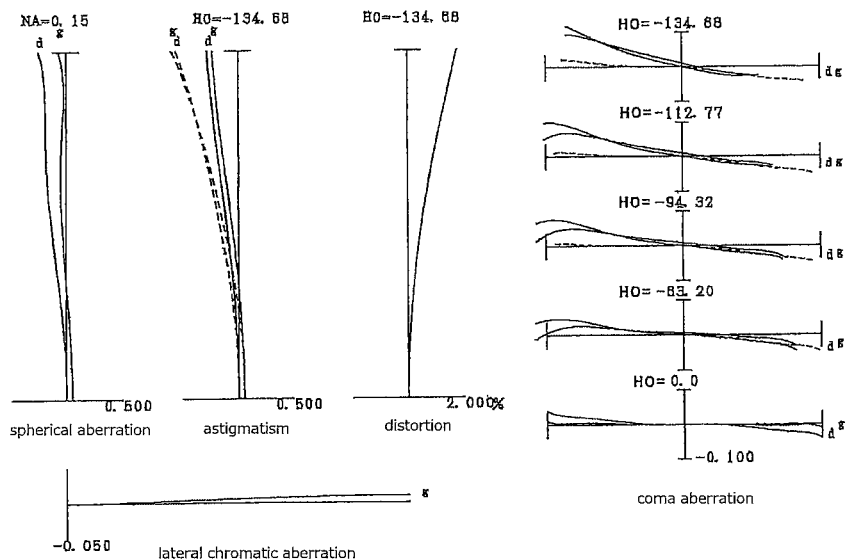
Figure 7C:
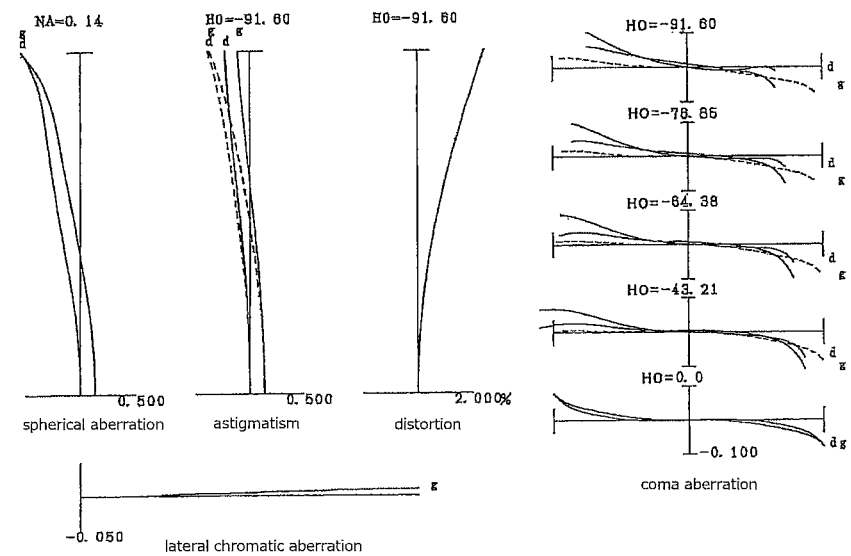

FIGS. 7A, 7B and 7C are graphs showing various aberrations, upon focusing on a finite distance object, of the variable magnification optical system according to the Second Example, FIG. 7A showing the wide angle end state, FIG. 7B showing the intermediate focal length state, and FIG. 7C showing the telephoto end state.

Figure 8A:
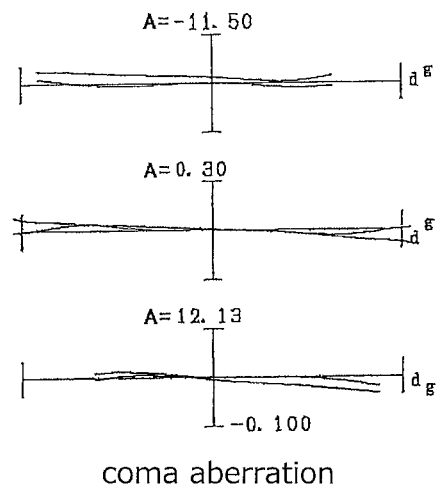
FIG. 8A, FIG. 8B and FIG. 8C are graphs showing meridional transverse aberrations, upon conducting image blur correction at the time when an infinite distance object is focused by the variable magnification optical system according to the Second Example, FIG. 8A showing the wide angle end state, FIG. 8B showing the intermediate focal length state, and FIG. 8C showing the telephoto end state.
Figure 8B:
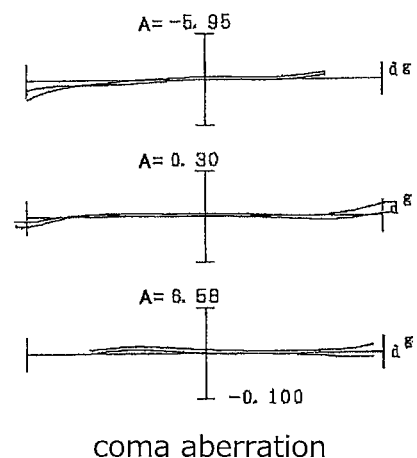
Figure 8C:
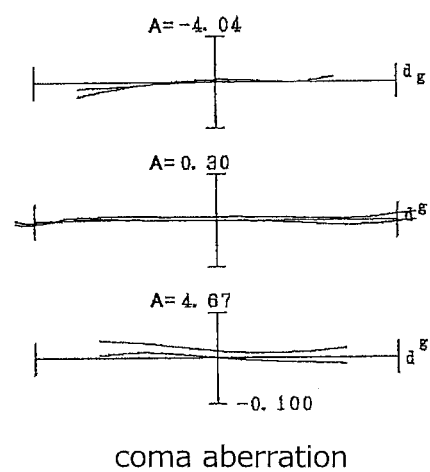

FIGS. 8A, 8B and 8C are graphs showing meridional transverse aberrations, upon conducting image blur correction at the time when an infinite distance object is focused by the variable magnification optical system according to the Second Example, FIG. 8A showing the wide angle end state, FIG. 8B showing the intermediate focal length state, and FIG. 8C showing the telephoto end state.

As is apparent from the above-mentioned graphs showing aberrations, the variable magnification optical system relating to the present Example can suppress superbly variations in aberrations upon varying the magnification, and correct superbly various aberrations from the state where an infinite distance object is focused to the state where a finite distance object is focused, and has high optical performance. Further, the variable magnification optical system relating to the present Example has an excellent imaging property even at the time when vibration reduction is conducted.

Third Examples

Figure 9:
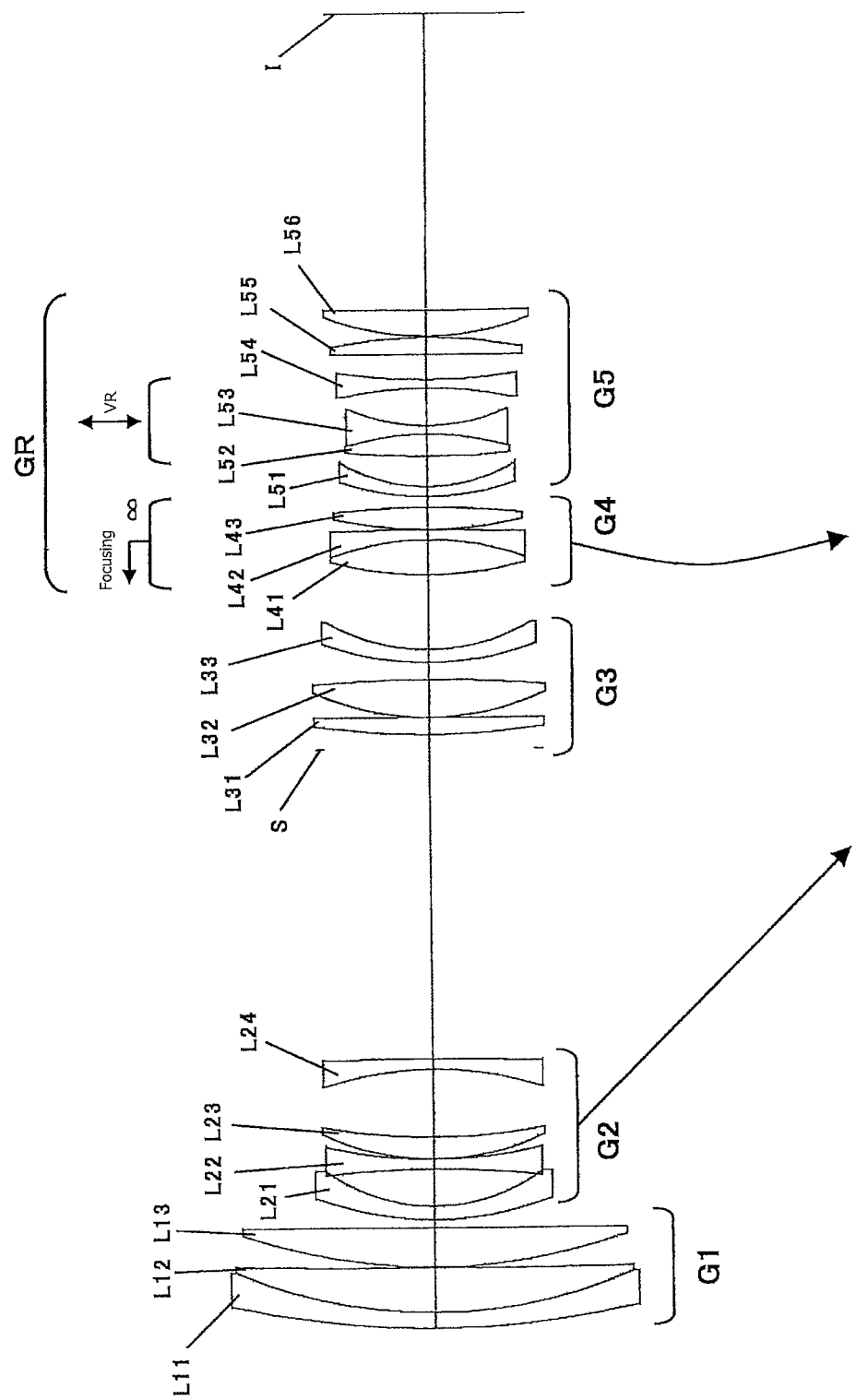
FIG. 9 is a cross sectional view in a wide angle end state of a variable magnification optical system according to a Third Example.

FIG. 9 is a sectional view of a variable magnification optical system in a wide angle end state according to a Third Example.

The variable magnification optical system according to the present Example is composed of, in order from an object side along the optical axis, a first lens group G1 having positive refractive power, a second lens group G2 having negative refractive power, a third lens group G3 having positive refractive power and a rear lens group GR.

The first lens group G1 consists of, in order from the object side along the optical axis, a cemented positive lens constructed by a negative meniscus lens L11 having a convex surface facing the object side cemented with a positive meniscus lens L12 having a convex surface facing an object side, and a double convex positive lens L13.

The second lens group G2 consists of, in order from the object side along the optical axis, a negative meniscus lens L21 having a convex surface facing the object side, a double concave negative lens L22, a positive meniscus lens L23 having a convex surface facing the object side, and a negative meniscus lens L24 having a concave surface facing the object side.

The third lens group G3 consists of, in order from the object side along the optical axis, an aperture stop S, a positive meniscus lens L31 having a convex surface facing the object side, a double convex positive lens L32, and a negative meniscus lens L33 having a convex surface facing the object side. A lens surface in the object side of the positive meniscus lens L31 is aspherical.

The rear lens group GR is composed of, in order from the object side along the optical axis, a fourth lens group G4 having positive refractive power and a fifth lens group G5 having negative refractive power.

The fourth lens group G4 consists of, in order from the object side along the optical axis, a cemented positive lens constructed by a double convex positive lens L41 cemented with a negative meniscus lens L42 having a concave surface facing the object side, and a double convex positive lens L43.

The fifth lens group G5 consists of, in order from the object side along the optical axis, a negative meniscus lens L51 having a convex surface facing an object side, a cemented negative lens constructed by a double convex positive lens L52 cemented with a double concave negative lens L53, a double concave negative lens L54, a positive meniscus lens L55 having a concave surface facing the object side and a positive meniscus lens L56 having a convex surface facing the object side.

On the image plane I, an imaging device (not shown) composed of CCD, CMOS or the like, is disposed.

In the variable magnification optical system according to the present Example, composed as described above, upon varying magnification from the wide angle end state to the telephoto end state, the second lens group G2 and the fourth lens group G4 are moved along the optical axis such that a distance between the first lens group G1 and the second lens group G2, a distance between the second lens group G2 and the third lens group G3, a distance between the third lens group G3 and the fourth lens group G4 and a distance between the fourth lens group G4 and the fifth lens group G5, are varied respectively. In detail, the second lens group G2 is moved toward the image side and the fourth lens group G4 is once moved toward the object side and then moved toward the image side. Meanwhile, upon varying the magnification, the first lens group G1, the third lens group G3 and the fifth lens group G5 are fixed with respect to the image plane I.

In the variable magnification optical system according to the present Example, focusing from an infinite distance object to a finite distance object is carried out by moving the fourth lens group G4 toward the object side along the optical axis as a focusing lens group.

In the variable magnification optical system according to the present Example, correction of image plane at the time when image blur occurs, that is, vibration reduction is conducted by moving the cemented lens constructed by the double convex positive lens L52 cemented with the double concave negative lens L53 and the double concave negative lens L54, in the fifth lens group G5 as vibration reduction lens group, to have a component in the direction perpendicular to the optical axis.

Table 3 below shows various values of the variable magnification optical system relating to the present Example.

TABLE 3

Third Example

[Surface Data]

| m | r | d | νd | nd |
|---|---|---|---|---|
| OP | ∞ | | | |
| 1 | 167.356 | 2.800 | 32.32 | 1.953747 |
| 2 | 93.018 | 7.924 | 82.57 | 1.497820 |
| 3 | 1434.067 | 0.200 | | |
| 4 | 104.275 | 7.345 | 67.90 | 1.593190 |
| 5 | −12156.219 | D1 | | |
| 6 | 60.998 | 2.400 | 40.11 | 1.762000 |
| 7 | 33.455 | 6.781 | | |
| 8 | −170.774 | 1.800 | 82.57 | 1.497820 |
| 9 | 81.934 | 0.100 | | |
| 10 | 47.360 | 4.035 | 23.78 | 1.846663 |
| 11 | 111.622 | 12.340 | | |
| 12 | −65.553 | 1.800 | 67.90 | 1.593190 |
| 13 | −1952.577 | D2 | | |
| 14 (S) | ∞ | 2.500 | | |
| *15 | 123.030 | 3.035 | 49.62 | 1.772500 |
| 16 | 2330.078 | 0.100 | | |
| 17 | 51.250 | 6.876 | 82.57 | 1.497820 |
| 18 | −259.509 | 3.112 | | |
| 19 | 55.078 | 2.400 | 28.38 | 1.728250 |
| 20 | 36.743 | D3 | | |
| 21 | 67.767 | 6.370 | 82.57 | 1.497820 |
| 22 | −51.825 | 1.800 | 33.72 | 1.647690 |
| 23 | −532.680 | 0.100 | | |
| 24 | 79.662 | 3.972 | 63.34 | 1.618000 |

TABLE 3-continued

Third Example

| 25 | −166.555 | D4 | | |
|---|---|---|---|---|
| 26 | 49.657 | 1.800 | 31.27 | 1.903660 |
| 27 | 30.960 | 5.571 | | |
| 28 | 160.283 | 4.000 | 23.78 | 1.846663 |
| 29 | −52.297 | 1.500 | 44.80 | 1.744000 |
| 30 | 35.836 | 6.845 | | |
| 31 | −74.563 | 1.500 | 38.03 | 1.603420 |
| 32 | 108.157 | 4.512 | | |
| 33 | −15102.398 | 3.130 | 46.59 | 1.816000 |
| 34 | −89.747 | 0.200 | | |
| 35 | 50.592 | 4.745 | 67.90 | 1.593190 |
| 36 | 1672.813 | BF | | |
| I | ∞ | | | |

[Aspherical Surface Data]

| Surface | κ | C4 | C6 |
|---|---|---|---|
| 15 | 1 | −1.26980E−06 | −9.34669E−11 |

[Various Data]
Variable magnification ratio 2.69

| | W | M | T |
|---|---|---|---|
| F | 72.0 | 135.0 | 194.0 |
| FNo | 2.9 | 2.9 | 2.9 |
| 2ω | 23.0 | 44.6 | 57.4 |
| Y | 21.6 | 21.6 | 21.6 |
| TL | 239 | 239 | 239 |
| BF | 54 | 54 | 54 |

[Variable Distance Data]

| | Infinite Distance | | | Finite Distance | | |
|---|---|---|---|---|---|---|
| | W | M | T | W | M | T |
| D1 | 1.500 | 37.556 | 56.704 | 1.500 | 37.556 | 56.704 |
| D2 | 56.704 | 20.648 | 1.500 | 56.704 | 20.648 | 1.500 |
| D3 | 13.716 | 11.844 | 13.716 | 12.224 | 7.053 | 3.962 |
| D4 | 2.000 | 3.872 | 2.000 | 3.492 | 8.663 | 11.754 |

[Lens Group Data]

| Group | ST | f |
|---|---|---|
| f1 | 1 | 162.392 |
| f2 | 6 | −53.478 |
| f3 | 14 | 80.590 |
| f4 | 21 | 60.086 |
| f5 | 26 | −93.338 |

[Vibration Reduction Data]

| | f | K | θ | Z |
|---|---|---|---|---|
| W | 72.0 | −1.55 | 0.3 | −0.24 |
| M | 135.0 | −1.55 | 0.3 | −0.46 |
| T | 194.0 | −1.55 | 0.3 | −0.66 |

[Values for Conditional Expressions]

(1) f1/(−f2) = 3.0366
(2) f2/|fZ| = 0.5730
(3) f1/|ff| = 2.7026
(4) ΣG1/TL = 0.0763
(5) f3/(−f2) = 1.5070
(6) f1/fw = 2.2554
(7) nd1 = 1.9537
(8) ωw = 11.500

Figure 10A:
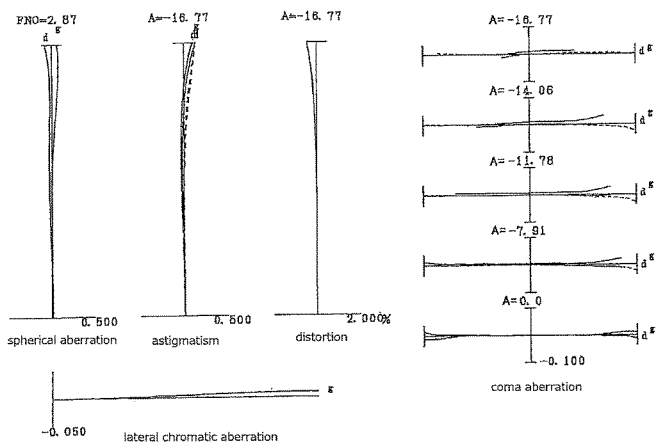
FIG. 10A, FIG. 10B and FIG. 10C are graphs showing various aberrations, upon focusing on an infinite distance object, of the variable magnification optical system according to the Third Example, FIG. 10A showing the wide angle end state, FIG. 10B showing the intermediate focal length state, and FIG. 10C showing the telephoto end state.
Figure 10B:
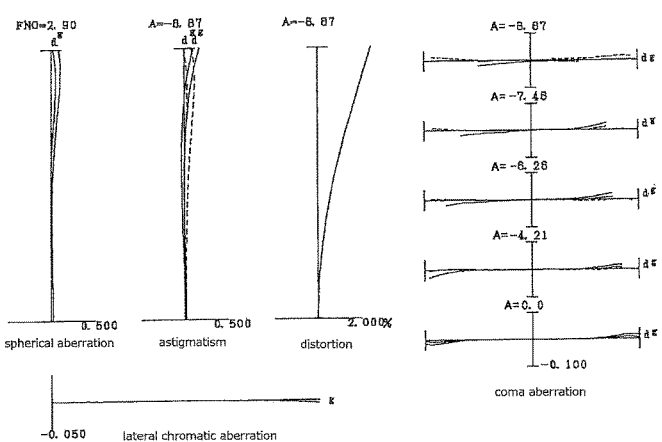
Figure 10C:
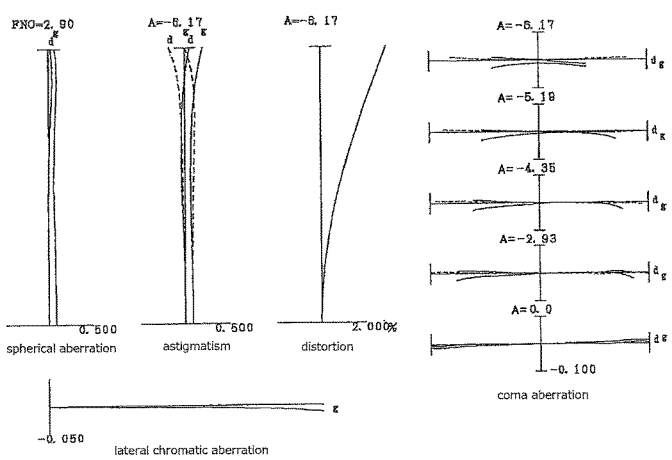

FIGS. 10A, 10B and 10C are graphs showing various aberrations upon focusing on an infinite distance object, respectively, of the variable magnification optical system according to the Third Example, FIG. 10A showing the wide angle end state, FIG. 10B showing the intermediate focal length state and FIG. 10C showing the telephoto end state.

Figure 11A:
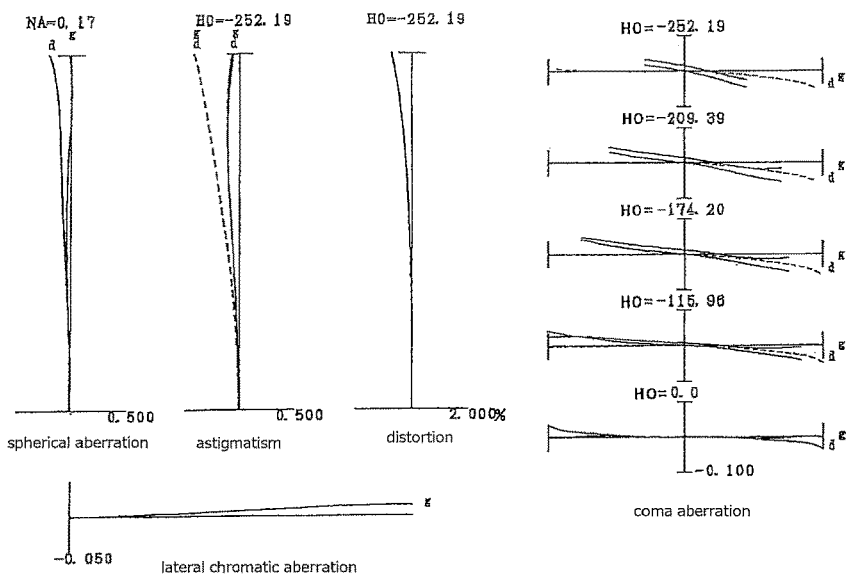
FIG. 11A, FIG. 11B and FIG. 11C are graphs showing various aberrations, upon focusing on a finite distance object, of the variable magnification optical system according to the Third Example, FIG. 11A showing the wide angle end state, FIG. 11B showing the intermediate focal length state, and FIG. 11C showing the telephoto end state.
Figure 11B:
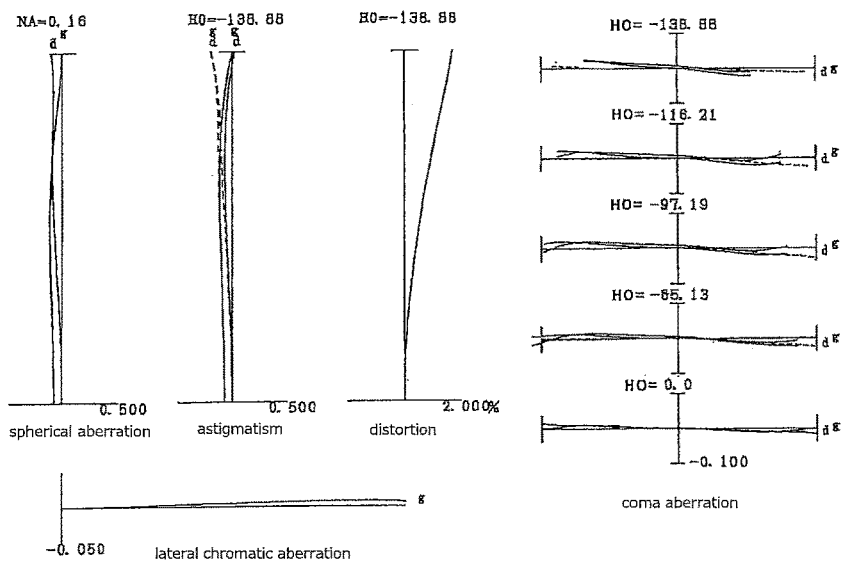
Figure 11C:
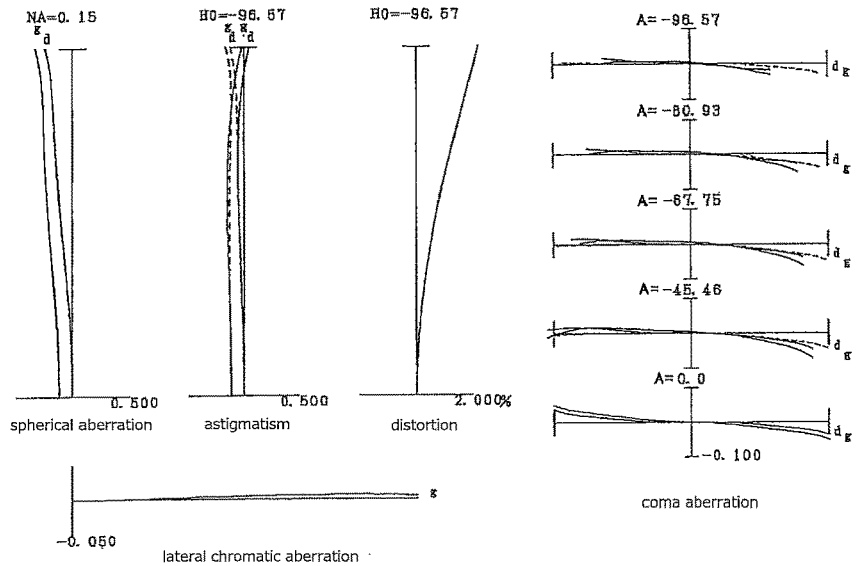

FIGS. 11A, 11B and 11C are graphs showing various aberrations, upon focusing on a finite distance object, of the variable magnification optical system according to the Third Example, FIG. 11A showing the wide angle end state, FIG. 11B showing the intermediate focal length state, and FIG. 11C showing the telephoto end state.

Figure 12A:
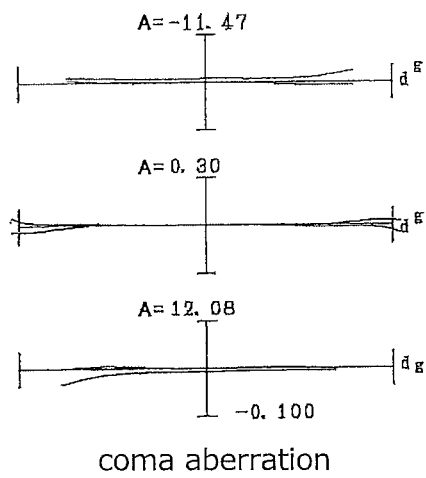
FIG. 12A, FIG. 12B and FIG. 12C are graphs showing meridional transverse aberrations, upon conducting image blur correction at the time when an infinite distance object is focused by the variable magnification optical system according to the Third Example, FIG. 12A showing the wide angle end state, FIG. 12B showing the intermediate focal length state, and FIG. 12C showing the telephoto end state.
Figure 12B:
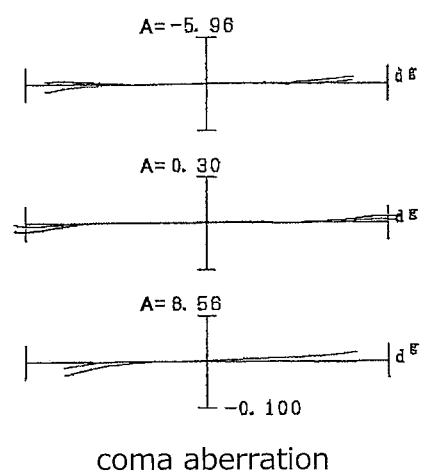
Figure 12C:
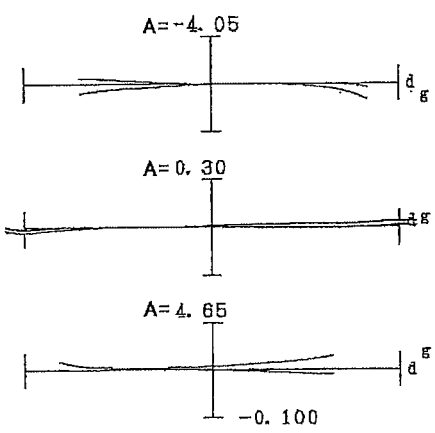

FIGS. 12A, 12B and 12C are graphs showing meridional transverse aberrations, upon conducting image blur correction at the time when an infinite distance object is focused by the variable magnification optical system according to the Third Example, FIG. 12A showing the wide angle end state, FIG. 12B showing the intermediate focal length state, and FIG. 12C showing the telephoto end state.

As is apparent from the above-mentioned graphs showing aberrations, the variable magnification optical system relating to the present Example can suppress superbly variations in aberrations upon varying the magnification, and correct superbly various aberrations from the state where an infinite distance object is focused to the state where a finite distance object is focused, and has high optical performance. Further, the variable magnification optical system relating to the present Example has an excellent imaging property even at the time when vibration reduction is conducted.

Fourth Example

Figure 13:
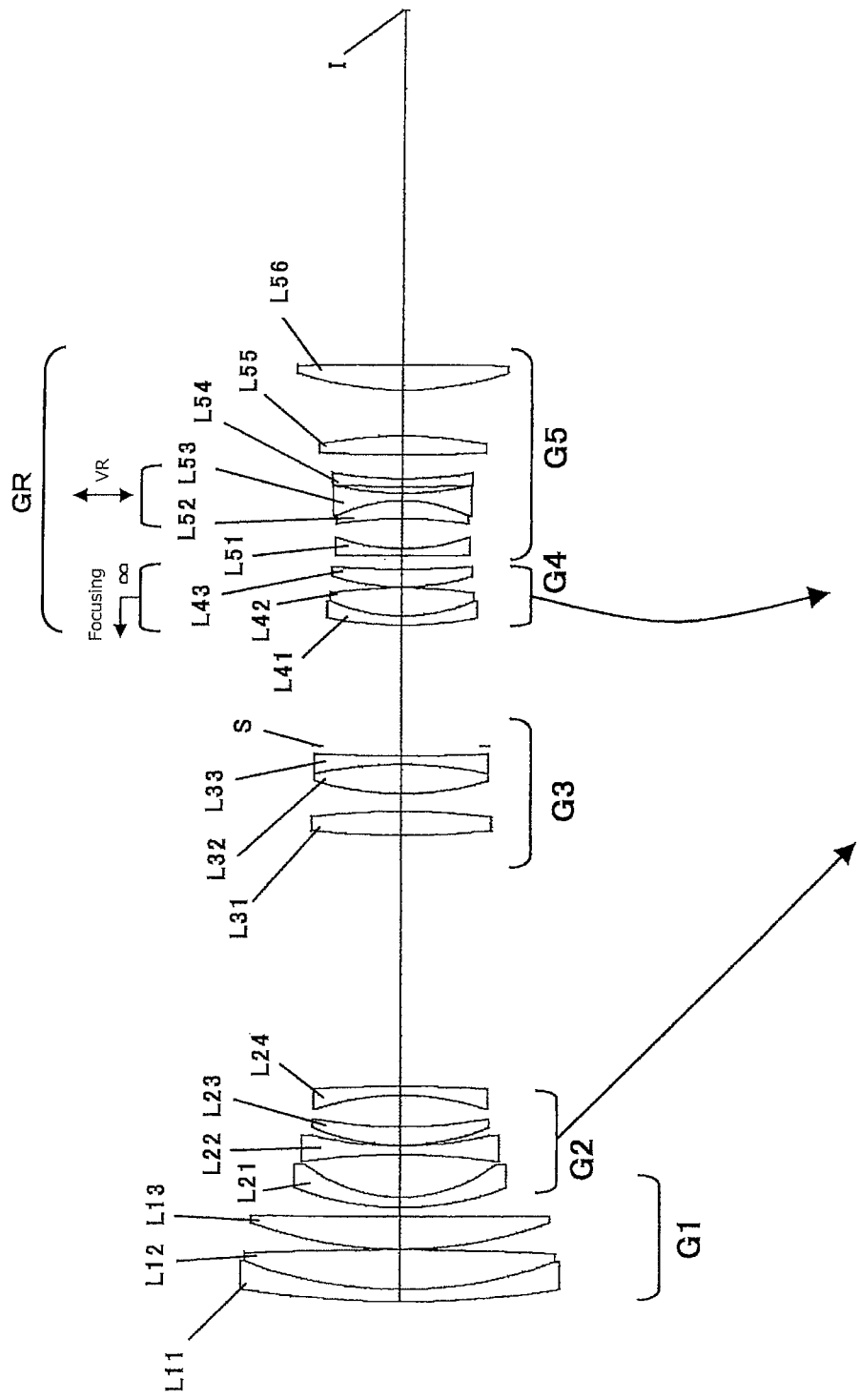
FIG. 13 is a cross sectional view in a wide angle end state of a variable magnification optical system according to a Fourth Example.

FIG. 13 is a sectional view of a variable magnification optical system in a wide angle end state according to a Fourth Example.

The variable magnification optical system according to the present Example is composed of, in order from an object side along the optical axis, a first lens group G1 having positive refractive power, a second lens group G2 having negative refractive power, a third lens group G3 having positive refractive power and a rear lens group GR.

The first lens group G1 consists of, in order from the object side along the optical axis, a cemented positive lens constructed by a negative meniscus lens L11 having a convex surface facing an object side cemented with a double convex positive lens L12, and a positive meniscus lens L13 having a convex surface facing the object side.

The second lens group G2 consists of, in order from the object side along the optical axis, a negative meniscus lens L21 having a convex surface facing the object, a double concave negative lens L22, a positive meniscus lens L23 having a convex surface facing the object side, and a negative meniscus lens L24 having a concave surface facing the object side.

The third lens group G3 consists of, in order from the object side along the optical axis, a double convex positive lens L31, a cemented negative lens constructed by a double convex positive lens L32 cemented with a double concave negative lens L33, and an aperture stop S.

The rear lens group GR is composed of, in order from the object side along the optical axis, a fourth lens group G4 having positive refractive power and a fifth lens group G5 having negative refractive power.

The fourth lens group G4 consists of, in order from the object side along the optical axis, a cemented positive lens constructed by a negative meniscus lens L41 having a convex surface facing the object side cemented with a double convex positive meniscus lens L42, and a positive meniscus lens L43 having a convex surface facing the object side.

The fifth lens group G5 consists of, in order from the object side along the optical axis, a negative meniscus lens L51 having a convex surface facing the object side, a cemented negative lens constructed by a positive meniscus lens L52 having a concave surface facing the object side cemented with a double concave negative lens L53, a negative meniscus lens L54 having a convex surface facing the object side, a double convex positive lens L55 and a double convex positive lens L56.

On the image plane I, an imaging device (not shown) composed of CCD, CMOS or the like, is disposed.

In the variable magnification optical system according to the present Example, composed as described above, upon varying magnification from the wide angle end state to the telephoto end state, the second lens group G2 and the fourth lens group G4 are moved along the optical axis such that a distance between the first lens group G1 and the second lens group G2, a distance between the second lens group G2 and the third lens group G3, a distance between the third lens group G3 and the fourth lens group G4 and a distance between the fourth lens group G4 and the fifth lens group G5, are varied respectively. In detail, the second lens group G2 is moved toward the image side and the fourth lens group G4 is once moved toward the object side and then moved toward the image side. Meanwhile, upon varying the magnification, the first lens group G1, the third lens group G3 and the fifth lens group G5 are fixed with respect to the image plane I.

In the variable magnification optical system according to the present Example, focusing from an infinite distance object to a finite distance object is carried out by moving the fourth lens group G4 toward the object side along the optical axis as focusing lens group.

In the variable magnification optical system according to the present Example, correction of image plane at the time when image blur occurs, that is, vibration reduction is conducted by moving the cemented negative lens constructed by the positive meniscus lens L52 having a concave surface facing the object side cemented with the double concave negative lens L53 and the negative meniscus lens L54 having the convex surface facing the object side in the fifth lens group G5 as vibration reduction lens group to have a component in the direction perpendicular to the optical axis.

Table 4 below shows various values of the variable magnification optical system relating to the present Example.

TABLE 4

Fourth Example

[Surface Data]

| m | r | d | vd | nd |
|---|---|---|---|---|
| OP | ∞ | | | |
| 1 | 178.078 | 2.000 | 35.72 | 1.90265 |
| 2 | 73.996 | 6.617 | 82.57 | 1.49782 |
| 3 | −564.697 | 0.100 | | |
| 4 | 71.981 | 5.600 | 67.90 | 1.59319 |
| 5 | 2343.373 | D1 | | |
| 6 | 47.782 | 1.800 | 47.35 | 1.78800 |
| 7 | 25.884 | 7.135 | | |
| 8 | −108.971 | 1.500 | 82.57 | 1.49782 |
| 9 | 63.887 | 0.100 | | |
| 10 | 37.944 | 3.083 | 23.78 | 1.84666 |
| 11 | 78.524 | 5.319 | | |
| 12 | −44.727 | 1.500 | 82.57 | 1.49782 |
| 13 | −281.406 | D2 | | |
| 14 | 144.229 | 4.021 | 42.73 | 1.83481 |
| 15 | −111.276 | 2.973 | | |
| 16 | 51.013 | 4.926 | 82.57 | 1.49782 |
| 17 | −67.533 | 1.500 | 35.72 | 1.90265 |
| 18 | 460.289 | 1.693 | | |
| 19(S) | ∞ | D3 | | |
| 20 | 65.537 | 1.500 | 27.03 | 1.85000 |
| 21 | 29.987 | 4.817 | 82.57 | 1.49782 |
| 22 | −80.046 | 0.100 | | |
| 23 | 39.393 | 3.001 | 46.60 | 1.80400 |
| 24 | 193.758 | D4 | | |
| 25 | 433.935 | 1.200 | 55.35 | 1.67790 |
| 26 | 31.976 | 5.081 | | |
| 27 | −69.618 | 3.000 | 23.78 | 1.84666 |
| 28 | −24.786 | 1.200 | 50.83 | 1.65844 |
| 29 | 50.830 | 1.188 | | |
| 30 | 1082.567 | 1.200 | 29.12 | 2.00100 |
| 31 | 75.612 | 3.920 | | |
| 32 | 211.114 | 3.326 | 67.90 | 1.59319 |
| 33 | −65.646 | 7.655 | | |
| 34 | 56.787 | 4.218 | 67.90 | 1.59319 |
| 35 | −1113.419 | BF | | |
| I | ∞ | | | |

[Various Data]
Variable magnification ratio 2.69

| | W | M | T |
|---|---|---|---|
| F | 72.0 | 135.0 | 194.0 |
| FNo | 4.1 | 4.1 | 4.1 |
| 2ω | 33.49 | 17.75 | 12.34 |
| Y | 21.6 | 21.6 | 21.6 |
| TL | 217.3 | 217.3 | 217.3 |
| BF | 59.6 | 59.6 | 59.6 |

[Variable Distance Data]

| | Infinite Distance | | | Finite Distance | | |
|---|---|---|---|---|---|---|
| | W | M | T | W | M | T |
| D1 | 1.500 | 28.601 | 42.325 | 1.500 | 28.601 | 42.325 |
| D2 | 42.425 | 15.324 | 1.600 | 42.425 | 15.324 | 1.600 |
| D3 | 20.366 | 18.953 | 20.366 | 19.553 | 16.328 | 15.104 |
| D4 | 2.178 | 3.591 | 2.178 | 2.991 | 6.216 | 7.440 |

[Lens Group Data]

| Group | ST | f |
|---|---|---|
| f1 | 1 | 118.050 |
| f2 | 6 | −39.549 |
| f3 | 14 | 64.440 |
| f4 | 20 | 42.243 |
| f5 | 25 | −61.442 |

[Vibration Reduction Data]

| | f | K | θ | Z |
|---|---|---|---|---|
| W | 72.0 | −1.89 | 0.3 | −0.20 |
| M | 135.0 | −1.89 | 0.3 | −0.37 |
| T | 194.0 | −1.89 | 0.3 | −0.54 |

[Values for Conditional Expressions]

(1) f1/(−f2) = 2.9849
(2) f2/|fZ| = 0.6437
(3) f1/|ff| =2.7945
(4) ΣG1/TL = 0.0659
(5) f3/(−f2) = 1.6294
(6) f1/fw = 1.6396
(7) nd1 = 1.9027
(8) ωw = 16.745

Figure 14A:
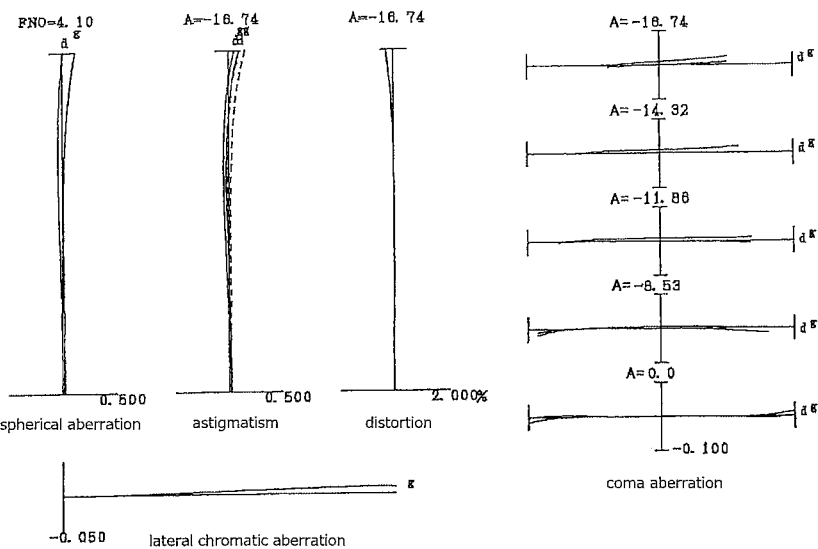
FIG. 14A, FIG. 14B and FIG. 14C are graphs showing various aberrations, upon focusing on an infinite distance object, of the variable magnification optical system according to the Fourth Example, FIG. 14A showing the wide angle end state, FIG. 14B showing the intermediate focal length state, and FIG. 14C showing the telephoto end state.
Figure 14B:
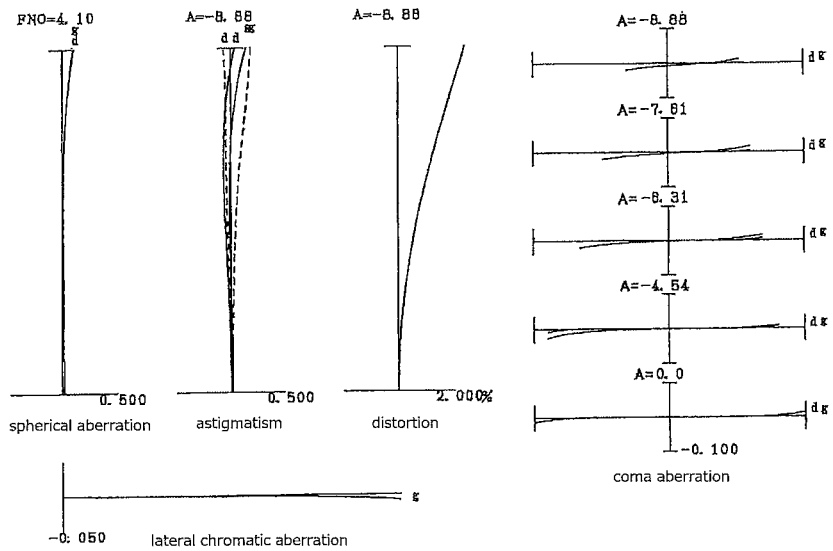
Figure 14C:
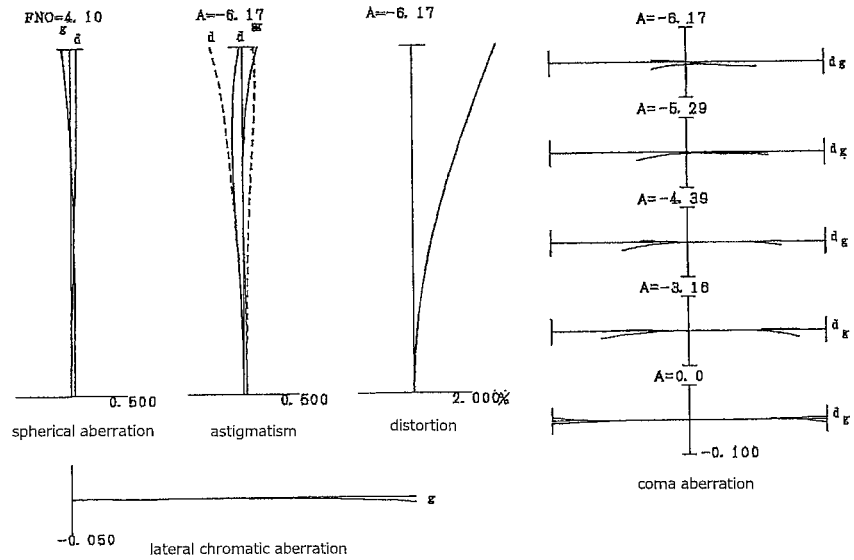

FIGS. 14A, 14B and 14C are graphs showing various aberrations upon focusing on an infinite distance object, respectively, of the variable magnification optical system according to the Fourth Example, FIG. 14A showing the wide angle end state, FIG. 14B showing the intermediate focal length state and FIG. 14C showing the telephoto end state.

Figure 15A:
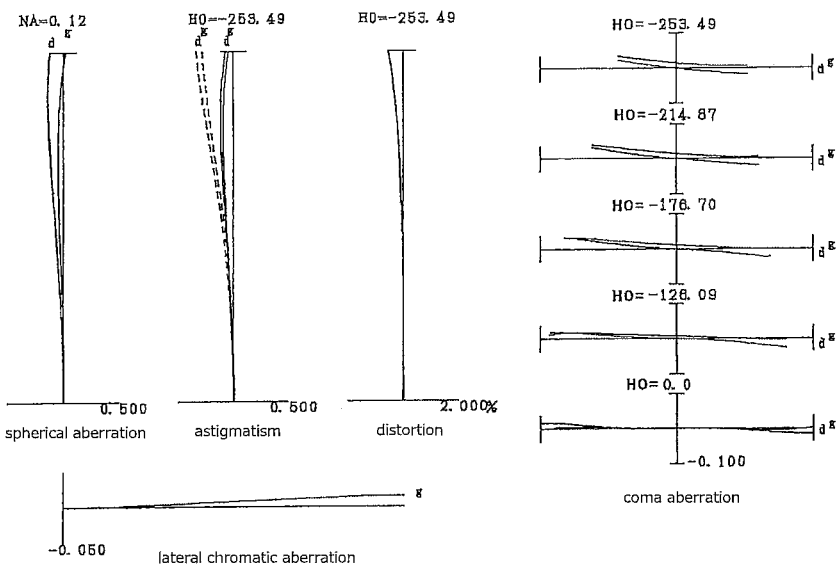
FIG. 15A, FIG. 15B and FIG. 15C are graphs showing various aberrations, upon focusing on a finite distance object, of the variable magnification optical system according to the Fourth Example, FIG. 15A showing the wide angle end state, FIG. 15B showing the intermediate focal length state, and FIG. 15C showing the telephoto end state.
Figure 15B:
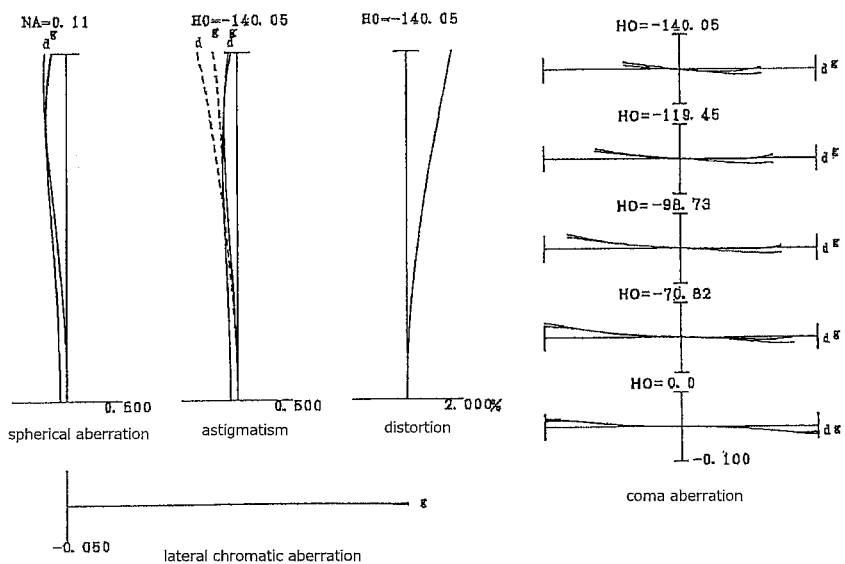
Figure 15C:
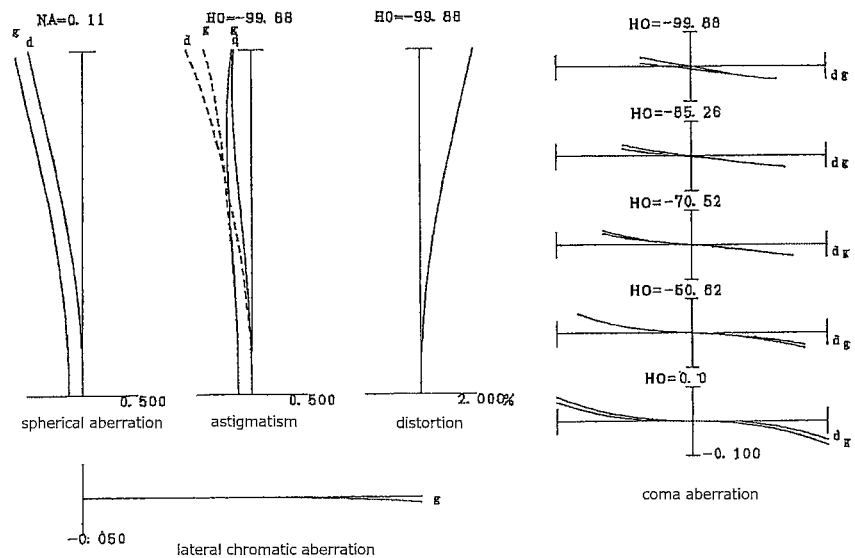

FIGS. 15A, 15B and 15C are graphs showing various aberrations, upon focusing on a finite distance object, of the variable magnification optical system according to the Fourth Example, FIG. 15A showing the wide angle end state, FIG. 15B showing the intermediate focal length state, and FIG. 15C showing the telephoto end state.

Figure 16A:
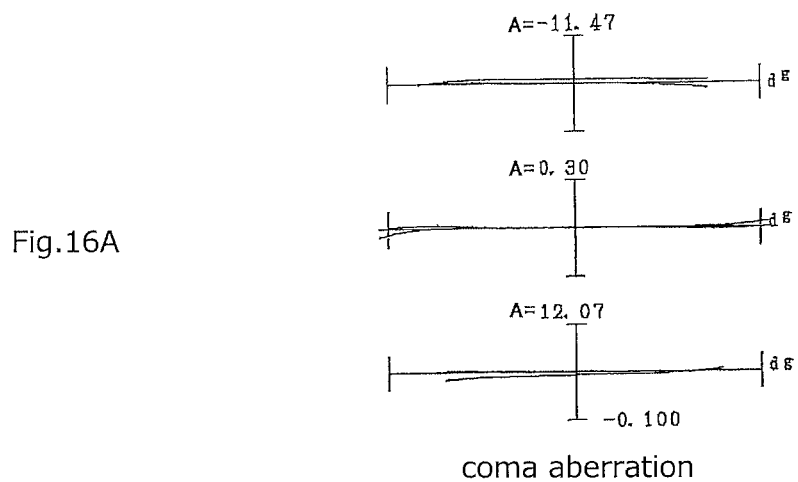
FIG. 16A, FIG. 16B and FIG. 16C are graphs showing meridional transverse aberrations, upon conducting image blur correction at the time when an infinite distance object is focused by the variable magnification optical system according to the Fourth Example, FIG. 16A showing the wide angle end state, FIG. 16B showing the intermediate focal length state, and FIG. 16C showing the telephoto end state.
Figure 16B:
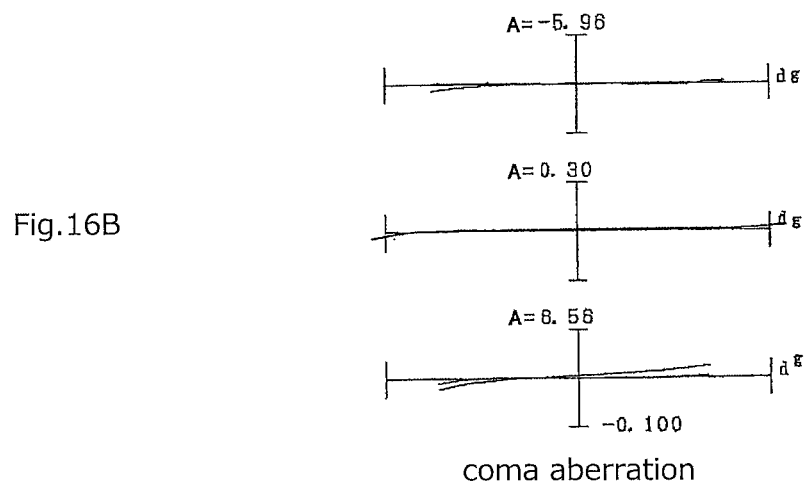
Figure 16C:
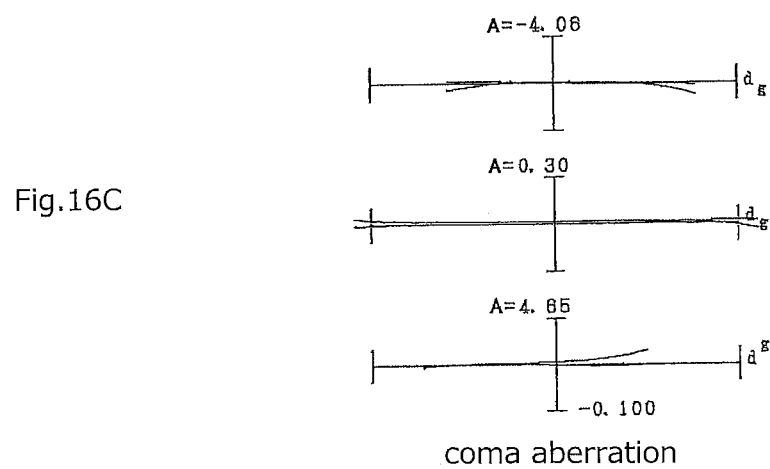

FIGS. 16A, 16B and 16C are graphs showing meridional transverse aberrations, upon conducting image blur correction at the time when an infinite distance object is focused by the variable magnification optical system according to the Fourth Example, FIG. 16A showing the wide angle end state, FIG. 16B showing the intermediate focal length state, and FIG. 16C showing the telephoto end state.

As is apparent from the above-mentioned graphs showing aberrations, the variable magnification optical system relating to the present Example can suppress superbly variations in aberrations upon varying the magnification, and correct superbly various aberrations from the state where an infinite distance object is focused to the state where a finite distance object is focused, and has high optical performance. Further, the variable magnification optical system relating to the present Example has an excellent imaging property even at the time when vibration reduction is conducted.

Fifth Example

Figure 17:
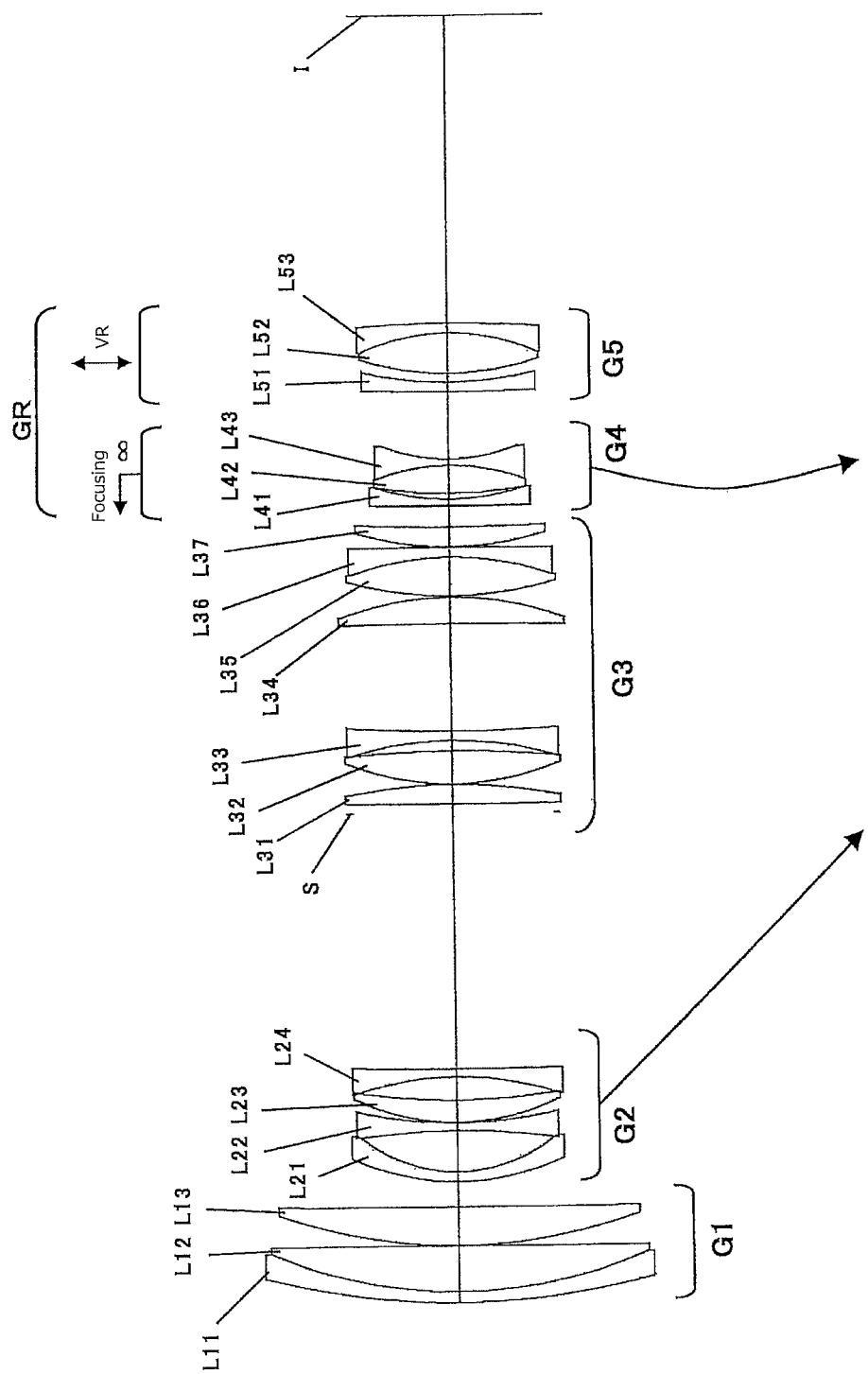
FIG. 17 is a cross sectional view in a wide angle end state of a variable magnification optical system according to a Fifth Example.

FIG. 17 is a sectional view of a variable magnification optical system in a wide angle end state according to a Fifth Example.

The variable magnification optical system according to the present Example is composed of, in order from an object side along the optical axis, a first lens group G1 having positive refractive power, a second lens group G2 having negative refractive power, a third lens group G3 having positive refractive power, and a rear lens group GR.

The first lens group G1 consists of, in order from the object side along the optical axis, a cemented positive lens constructed by a negative meniscus lens L11 having a convex surface facing an object side cemented with a plano-convex lens L12 having a convex surface facing the object side, and a positive meniscus lens L13 having a convex surface facing the object side.

The second lens group G2 consists of, in order from the object side along the optical axis, a negative meniscus lens L21 having a convex surface facing the object side, a double concave negative lens L22, a positive meniscus lens L23 having a convex surface facing the object side and a double concave negative lens L24.

The third lens group G3 consists of, in order from the object side along the optical axis, an aperture stop S, a double convex positive lens L31, a double convex positive lens L32, a double concave negative lens L33, a positive meniscus lens L34 having a concave surface facing the object side, and a cemented positive lens constructed by a double convex positive lens L35 cemented with a negative meniscus lens L36 having a concave surface facing the object side, and a positive meniscus lens L37 having a convex surface facing the object side.

The rear lens group GR is composed of, in order from the object side along the optical axis, a fourth lens group G4 having negative refractive power, and a fifth lens group G5 having positive refractive power.

The fourth lens group G4 consists of, in order from the object side along the optical axis, a negative meniscus lens L41 having a convex surface facing the object side, and a cemented negative lens constructed by a double convex positive lens L42 cemented with a double concave negative lens L43.

The fifth lens group G5 consists of, in order from the object side along the optical axis, a negative meniscus lens L51 having a convex surface facing the object side, and a cemented positive lens constructed by a double convex positive lens L52 cemented with a negative meniscus lens L53 having a concave surface facing the object side.

On the image plane I, an imaging device (not shown) composed of CCD, CMOS or the like, is disposed.

In the variable magnification optical system according to the present Example, composed as described above, upon varying the magnification from the wide angle end state to the telephoto end state, the second lens group G2 and the fourth lens group G4 are moved along the optical axis such that a distance between the first lens group G1 and the second lens group G2, a distance between the second lens group G2 and the third lens group G3, a distance between the third lens group G3 and the fourth lens group G4 and a distance between the fourth lens group G4 and the fifth lens group G5, are varied respectively. In detail, the second lens group G2 is moved toward the image side and the fourth lens group G4 is once moved toward the object side and then moved toward the image side. Meanwhile, upon varying the magnification, the first lens group G1, the third lens group G3 and the fifth lens group G5 are fixed with respect to the image plane I.

In the variable magnification optical system according to the present Example, focusing from an infinite distance object to a finite distance object is carried out by moving the fourth lens group G4 toward the object side along the optical axis as focusing lens group.

In the variable magnification optical system according to the present Example, correction of image plane at the time when image blur occurs, that is, vibration reduction is conducted by moving the negative meniscus lens L51 and the cemented positive lens constructed by the double convex positive lens L52 cemented with the negative meniscus lens L53 having a concave surface facing the object side in the fifth lens group G5 as vibration reduction lens group to have a component in the direction perpendicular to the optical axis. In other words, in the variable magnification optical system according to the present Example, the fifth lens group G5 is vibration reduction lens group.

Table 5 below shows various values of the variable magnification optical system relating to the present Example.

TABLE 5

Fifth Example

[Surface Data]

| m | r | d | vd | nd |
|---|---|---|---|---|
| OP | ∞ | | | |
| 1 | 139.529 | 2.000 | 29.12 | 2.00100 |
| 2 | 87.331 | 8.531 | 82.57 | 1.49782 |
| 3 | ∞ | 0.100 | | |
| 4 | 98.713 | 7.170 | 67.90 | 1.59319 |
| 5 | 4788.062 | D1 | | |
| 6 | 47.272 | 1.800 | 46.59 | 1.81600 |
| 7 | 28.661 | 7.698 | | |
| 8 | −127.650 | 1.500 | 67.90 | 1.59319 |

TABLE 5-continued

Fifth Example

| | | | | |
|---|---|---|---|---|
| 9 | 81.617 | 0.100 | | |
| 10 | 43.647 | 4.153 | 23.78 | 1.84666 |
| 11 | 112.228 | 4.379 | | |
| 12 | −60.267 | 1.500 | 67.90 | 1.59319 |
| 13 | 996.568 | D2 | | |
| 14(S) | ∞ | 1.700 | | |
| 15 | 1313.986 | 3.652 | 42.73 | 1.83481 |
| 16 | −99.184 | 0.100 | | |
| 17 | 52.552 | 6.119 | 82.57 | 1.49782 |
| 18 | −205.871 | 2.000 | | |
| 19 | −66.093 | 1.800 | 32.35 | 1.85026 |
| 20 | 322.065 | 20.079 | | |
| 21 | −1005.585 | 4.958 | 42.73 | 1.83481 |
| 22 | −58.031 | 0.200 | | |
| 23 | 69.847 | 7.276 | 67.90 | 1.59319 |
| 24 | −54.714 | 1.800 | 29.12 | 2.00100 |
| 25 | −1246.690 | 0.100 | | |
| 26 | 60.822 | 3.713 | 67.90 | 1.59319 |
| 27 | 401.969 | D3 | | |
| 28 | 5863.376 | 1.200 | 28.38 | 1.72825 |
| 29 | 45.703 | 1.110 | | |
| 30 | 85.476 | 5.129 | 23.78 | 1.84666 |
| 31 | −39.170 | 1.200 | 54.61 | 1.72916 |
| 32 | 34.852 | D4 | | |
| 33 | 527.827 | 1.800 | 42.73 | 1.83481 |
| 34 | 71.283 | 1.618 | | |
| 35 | 53.168 | 7.555 | 42.73 | 1.83481 |
| 36 | −39.888 | 1.800 | 25.46 | 2.00069 |
| 37 | −208.656 | BF | | |
| I | ∞ | | | |

[Various Data]
Variable magnification ratio 2.69

| | W | M | T |
|---|---|---|---|
| F | 72.0 | 135.0 | 194.0 |
| FNo | 2.9 | 2.9 | 2.9 |
| 2ω | 33.56 | 17.71 | 12.34 |
| Y | 21.6 | 21.6 | 21.6 |
| TL | 239.3 | 239.3 | 239.3 |
| BF | 56.9 | 56.9 | 56.9 |

[Variable Distance Data]

| | Infinite Distance | | | Finite Distance | | |
|---|---|---|---|---|---|---|
| | W | M | T | W | M | T |
| D1 | 4.814 | 35.125 | 50.498 | 4.814 | 35.125 | 50.498 |
| D2 | 47.355 | 17.044 | 1.672 | 47.355 | 17.044 | 1.672 |
| D3 | 3.926 | 5.676 | 3.926 | 5.152 | 9.846 | 12.236 |
| D4 | 12.456 | 10.707 | 12.456 | 12.456 | 10.707 | 12.456 |

[Lens Group Data]

| Group | ST | f |
|---|---|---|
| f1 | 1 | 137.906 |
| f2 | 6 | −44.255 |
| f3 | 14 | 42.294 |
| f4 | 28 | −41.172 |
| f5 | 33 | 155.125 |

[Vibration Reduction Data]

| | f | K | θ | Z |
|---|---|---|---|---|
| W | 72.0 | 1.00 | 0.3 | 0.38 |
| M | 135.0 | 1.00 | 0.3 | 0.71 |
| T | 194.0 | 1.00 | 0.3 | 1.02 |

[Values for Conditional Expressions]

(1) f1/(−f2) = 3.1161
(2) f2/|fZ| = 0.2853
(3) f1/|ff| = 3.3495
(4) ΣG1/TL = 0.0744
(5) f3/(−f2) = 0.9557
(6) f1/fw = 1.9154
(7) nd1 = 2.0010
(8) ωw = 16.780

Figure 18A:
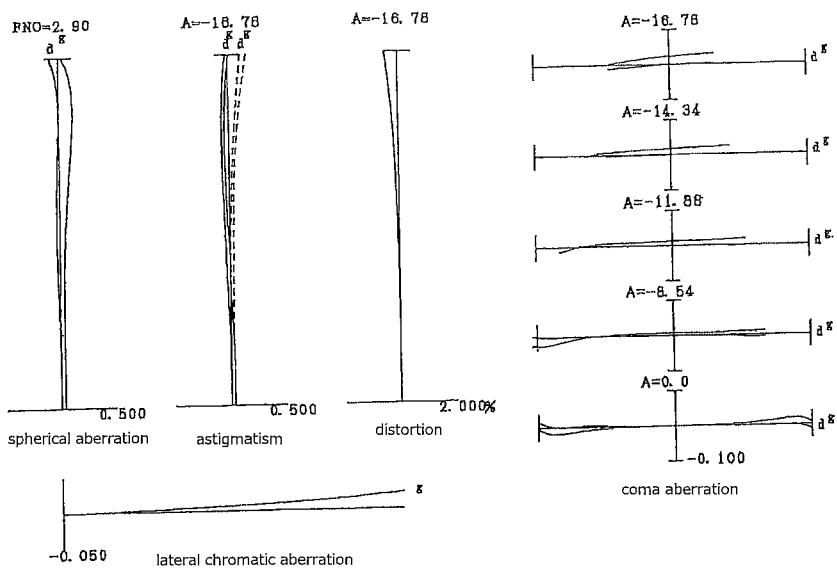
FIG. 18A, FIG. 18B and FIG. 18C are graphs showing various aberrations, upon focusing on an infinite distance object, of the variable magnification optical system according to the Fifth Example, FIG. 18A showing the wide angle end state, FIG. 18B showing the intermediate focal length state, and FIG. 18C showing the telephoto end state.
Figure 18B:
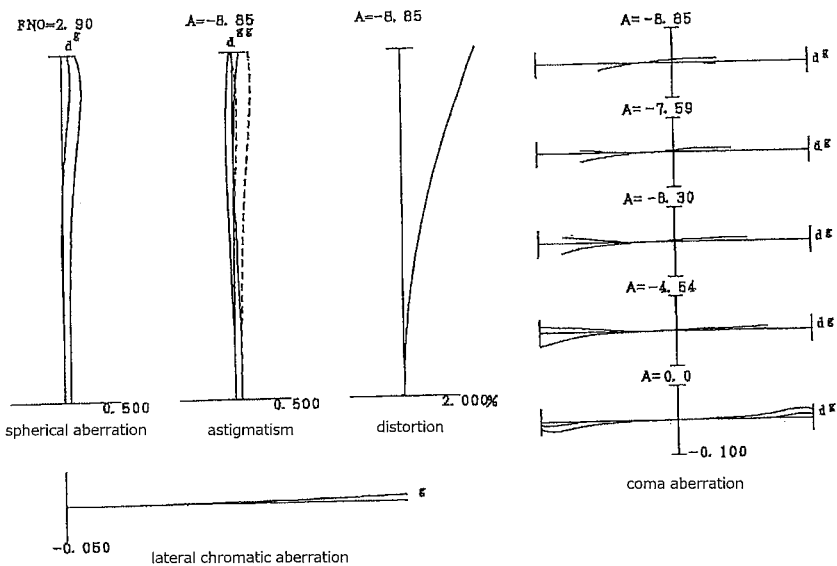
Figure 18C:
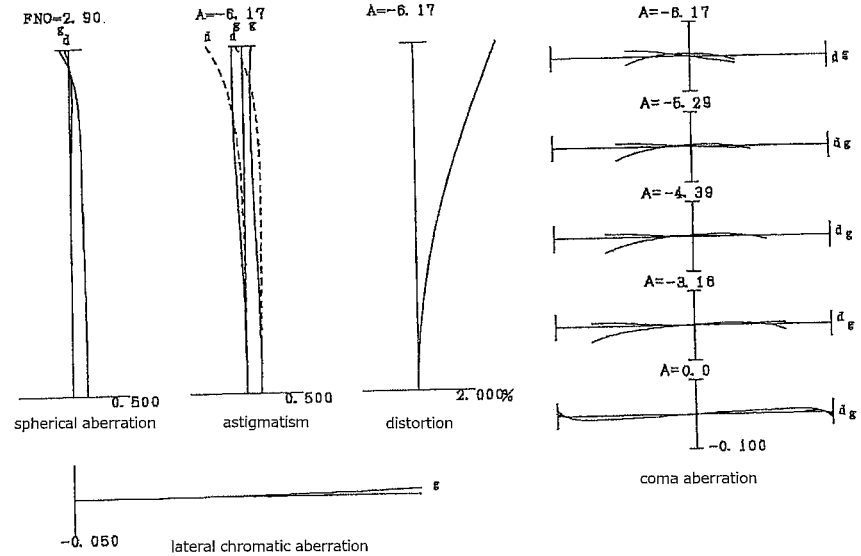

FIGS. 18A, 18B and 18C are graphs showing various aberrations upon focusing on an infinite distance object, respectively, of the variable magnification optical system according to the Fifth Example, FIG. 18A showing the wide angle end state, FIG. 18B showing the intermediate focal length state and FIG. 18C showing the telephoto end state.

Figure 19A:
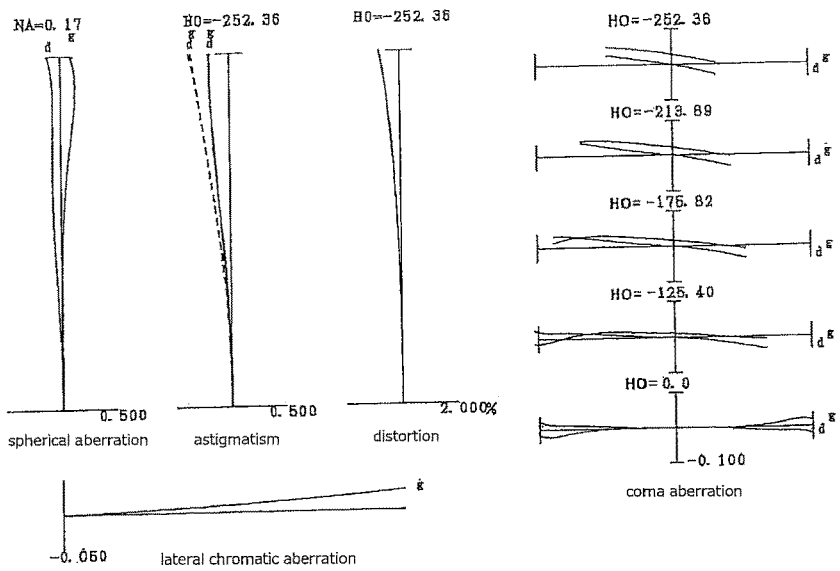
FIG. 19A, FIG. 19B and FIG. 19C are graphs showing various aberrations, upon focusing on a finite distance object, of the variable magnification optical system according to the Fifth Example, FIG. 19A showing the wide angle end state, FIG. 19B showing the intermediate focal length state, and FIG. 19C showing the telephoto end state.
Figure 19B:
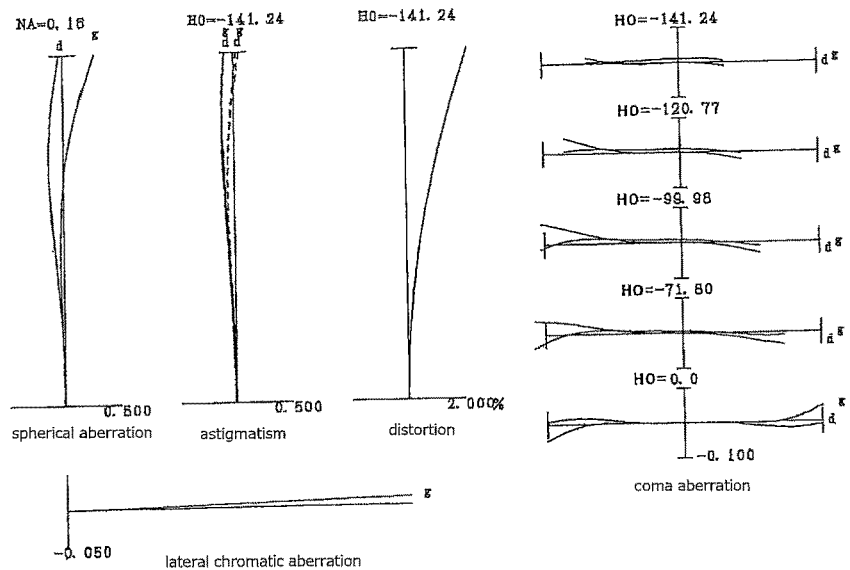
Figure 19C:
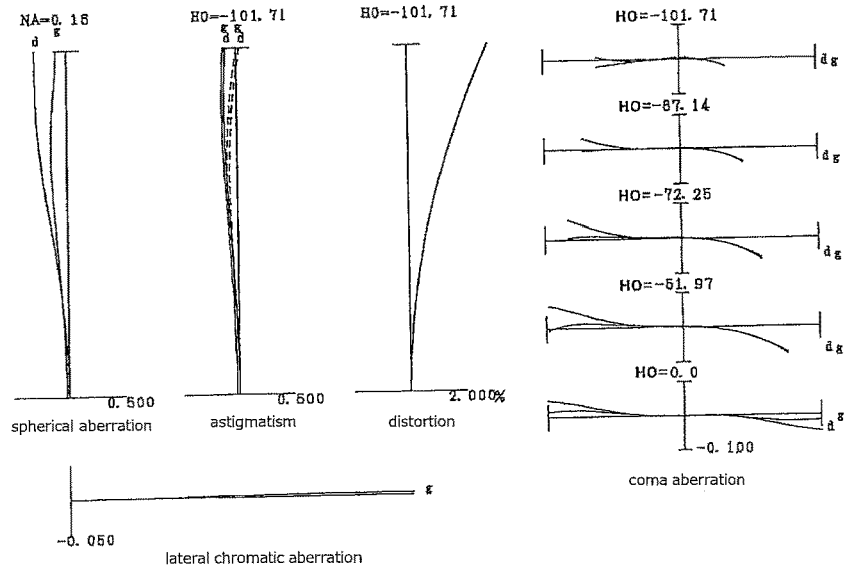

FIGS. 19A, 19B and 19C are graphs showing various aberrations, upon focusing on a finite distance object, of the variable magnification optical system according to the Fifth Example, FIG. 19A showing the wide angle end state, FIG. 19B showing the intermediate focal length state, and FIG. 19C showing the telephoto end state.

Figure 20A:
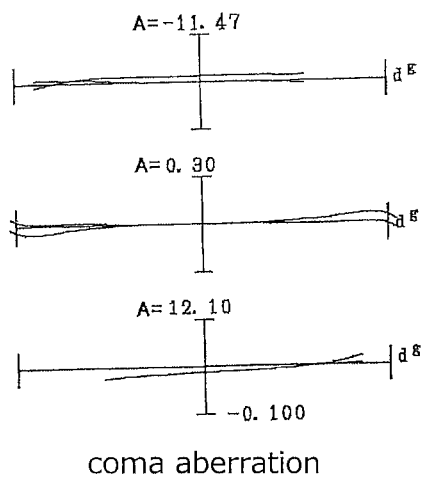
FIG. 20A, FIG. 20B and FIG. 20C are graphs showing meridional transverse aberrations, upon conducting image blur correction at the time when an infinite distance object is focused by the variable magnification optical system according to the Fifth Example, FIG. 20A showing the wide angle end state, FIG. 20B showing the intermediate focal length state, and FIG. 20C showing the telephoto end state.
Figure 20B:
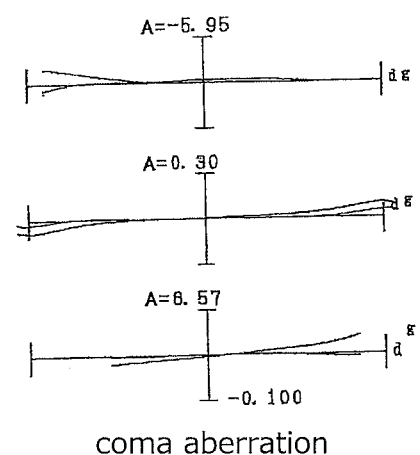
Figure 20C:
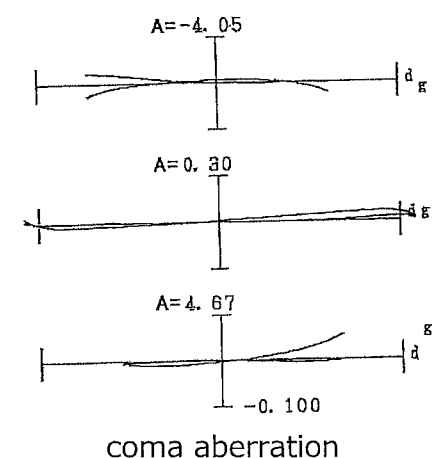

FIGS. 20A, 20B and 20C are graphs showing meridional transverse aberrations, upon conducting image blur correction at the time when an infinite distance object is focused by the variable magnification optical system according to the Fifth Example, FIG. 20A showing the wide angle end state, FIG. 20B showing the intermediate focal length state, and FIG. 20C showing the telephoto end state.

As is apparent from the above-mentioned graphs showing aberrations, the variable magnification optical system relating to the present Example can suppress superbly variations in aberrations upon varying the magnification, and correct superbly various aberrations from the state where an infinite distance object is focused to the state where a finite distance object is focused, and has high optical performance. Further, the variable magnification optical system relating to the present Example has an excellent imaging property even at the time when vibration reduction is conducted.

Sixth Example

Figure 21:
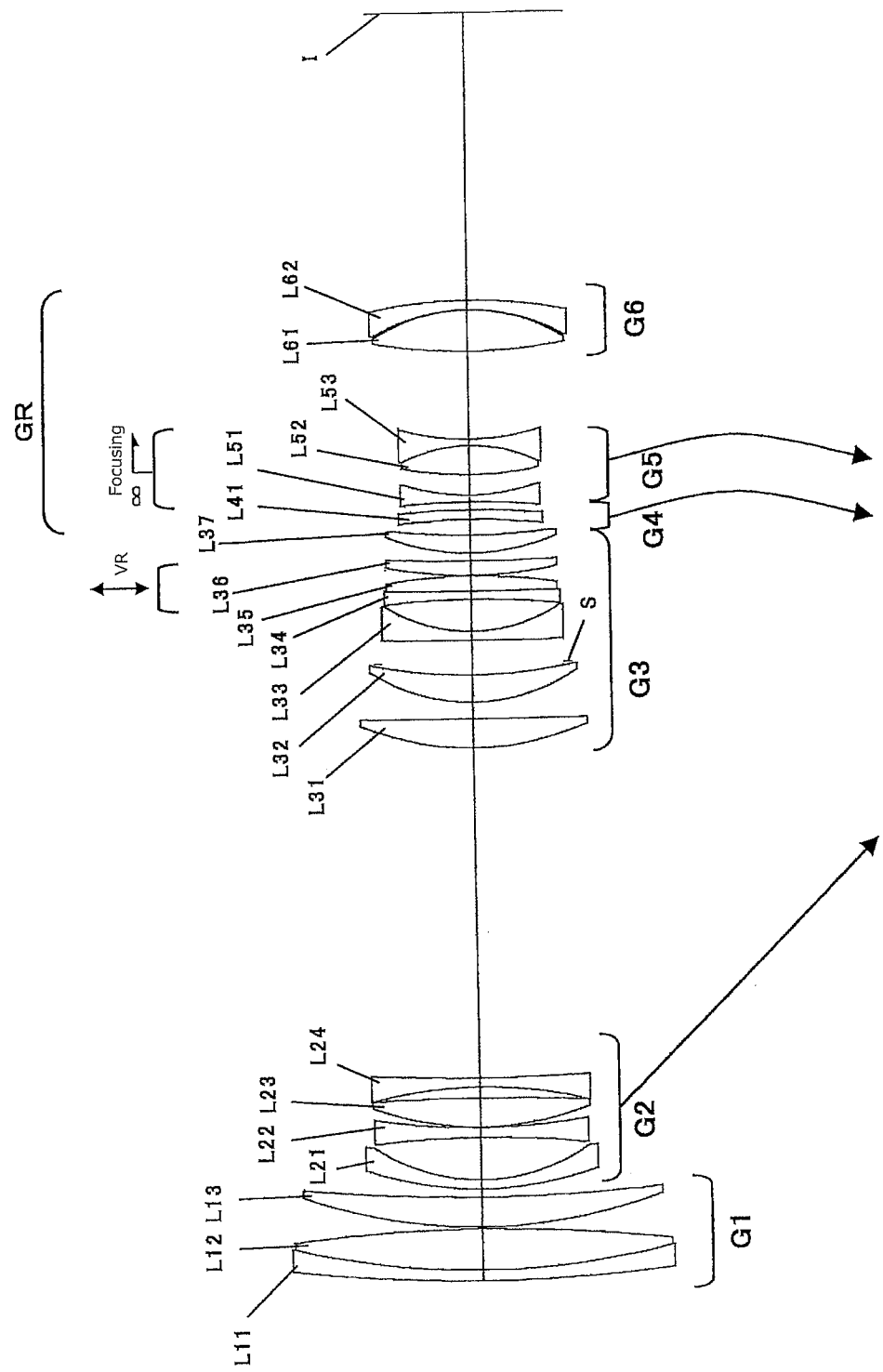
FIG. 21 is a cross sectional view in a wide angle end state of a variable magnification optical system according to a Sixth Example.

FIG. 21 is a sectional view of a variable magnification optical system in a wide angle end state according to a Sixth Example.

The variable magnification optical system according to the present Example is composed of, in order from an object side along the optical axis, a first lens group G1 having positive refractive power, a second lens group G2 having negative refractive power, a third lens group G3 having positive refractive power and a rear lens group GR.

The first lens group G1 consists of, in order from the object side along the optical axis, a cemented positive lens constructed by a negative meniscus lens L11 having a convex surface facing the object side cemented with a double convex positive lens L12, and a positive meniscus lens L13 having a convex surface facing the object side.

The second lens group G2 consists of, in order from the object side along the optical axis, a negative meniscus lens L21 having a convex surface facing the object side, a double concave negative lens L22, a double convex positive lens L23 and a double concave negative lens L24.

The third lens group G3 consists of, in order from the object side along the optical axis, a positive meniscus lens L31 having a convex surface facing the object side, a positive meniscus lens L32 having a convex surface facing the object side, an aperture stop S, a negative meniscus lens L33 having a convex surface facing the object side, a cemented positive lens constructed by a double concave negative lens L34 cemented with a double convex positive lens L35, a positive meniscus lens L36 having a convex surface facing the object side, and a positive meniscus lens L37 having a convex surface facing the object side.

The rear lens group GR is composed of, in order from the object side along the optical axis, a fourth lens group G4 having negative refractive power, a fifth lens group G5 having negative refractive power and a sixth lens group G6 having positive refractive power.

The fourth lens group G4 consists of a negative meniscus lens L41 having a concave surface facing the object side.

The fifth lens group G5 consists of, in order from the object side along the optical axis, a double concave negative lens L51, and a cemented positive lens constructed by a double convex positive lens L52 cemented with a double concave negative lens L53.

The sixth lens group G6 consists of, in order from the object side along the optical axis, a double convex positive lens L61 and a negative meniscus lens L62 having a concave surface facing the object side.

On the image plane I, an imaging device (not shown) composed of CCD, CMOS or the like, is disposed.

In the variable magnification optical system according to the present Example, composed as described above, upon varying magnification from the wide angle end state to the telephoto end state, the second lens group G2, the fourth lens group G4 and the fifth lens group G5 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5 and a distance between the fifth lens group G5 and the sixth lens group G6 are varied respectively. In detail, the second lens group G2 is moved toward the image side, the fourth lens group G4 is once moved toward the image side and then moved toward the object side, and the fifth lens group G5 is once moved toward the image side and then toward the object side. Meanwhile, upon varying the magnification, the first lens group G1, the third lens group G3 and the sixth lens group G6 are fixed with respect to the image plane I.

In the variable magnification optical system according to the present Example, focusing from an infinite distance object to a finite distance object is carried out by moving the fifth lens group G5 toward the image side along the optical axis as focusing lens group.

In the variable magnification optical system according to the present Example, correction of image plane at the time when image blur occurs, that is, vibration reduction is conducted by moving the cemented positive lens constructed by the double concave negative lens L34 cemented with the double convex positive lens L35 and the positive meniscus lens L36 in the third lens group G3 as vibration reduction lens group, to have a component in the direction perpendicular to the optical axis.

Table 6 below shows various values of the variable magnification optical system relating to the present Example.

TABLE 6

Sixth Example

[Surface Data]

| m | r | d | vd | nd |
|---|---|---|---|---|
| OP | ∞ | | | |
| 1 | 305.688 | 2.000 | 29.12 | 2.00100 |
| 2 | 150.562 | 7.637 | 82.57 | 1.49782 |
| 3 | −305.688 | 0.388 | | |
| 4 | 98.919 | 5.711 | 67.90 | 1.59319 |
| 5 | 337.701 | D1 | | |

TABLE 6-continued

Sixth Example

| 6 | 63.626 | 1.800 | 42.73 | 1.83481 |
|---|---|---|---|---|
| 7 | 35.642 | 8.122 | | |
| 8 | −178.975 | 1.800 | 42.73 | 1.83481 |
| 9 | 122.680 | 0.100 | | |
| 10 | 56.817 | 5.606 | 23.78 | 1.84666 |
| 11 | −368.672 | 2.050 | | |
| 12 | −83.616 | 1.800 | 42.73 | 1.83481 |
| 13 | 439.879 | D2 | | |
| 14 | 54.063 | 5.535 | 42.73 | 1.83481 |
| 15 | 1523.725 | 3.217 | | |
| 16 | 35.572 | 5.147 | 82.57 | 1.49782 |
| 17 | 94.772 | 2.445 | | |
| 18(S) | ∞ | 4.024 | | |
| 19 | 542.012 | 1.800 | 23.78 | 1.84666 |
| 20 | 30.977 | 6.028 | | |
| 21 | −163.351 | 1.500 | 23.78 | 1.84666 |
| 22 | 551.731 | 2.964 | 42.73 | 1.83481 |
| 23 | −101.378 | 0.100 | | |
| 24 | 78.695 | 2.796 | 42.73 | 1.83481 |
| 25 | 384.076 | 1.500 | | |
| 26 | 42.639 | 3.374 | 42.73 | 1.83481 |
| 27 | 125.042 | D3 | | |
| 28 | −112.803 | 1.800 | 23.78 | 1.84666 |
| 29 | −133.884 | D4 | | |
| 30 | −123.796 | 1.200 | 32.35 | 1.85026 |
| 31 | 39.851 | 3.871 | | |
| 32 | 67.564 | 5.410 | 23.78 | 1.84666 |
| 33 | −29.747 | 1.200 | 35.72 | 1.62588 |
| 34 | 47.523 | D5 | | |
| 35 | 101.685 | 7.810 | 63.34 | 1.61800 |
| 36 | −33.877 | 0.100 | | |
| 37 | −36.492 | 1.800 | 32.35 | 1.85026 |
| 38 | −90.596 | BF | | |
| I | ∞ | | | |

[Various Data]
Variable magnification ratio 2.69

| | W | M | T |
|---|---|---|---|
| F | 72.0 | 135.0 | 194.0 |
| FNo | 2.9 | 2.9 | 2.9 |
| 2ω | 33.61 | 17.70 | 12.34 |
| Y | 21.6 | 21.6 | 21.6 |
| TL | 239.3 | 239.3 | 239.3 |
| BF | 54.0 | 54.0 | 54.0 |

[Variable Distance Data]

| | Infinite Distance | | | Finite Distance | | |
|---|---|---|---|---|---|---|
| | W | M | T | W | M | T |
| D1 | 1.521 | 41.085 | 62.676 | 1.521 | 41.085 | 62.676 |
| D2 | 62.155 | 22.591 | 1.000 | 62.155 | 22.591 | 1.000 |
| D3 | 3.012 | 5.214 | 3.012 | 3.012 | 5.214 | 3.012 |
| D4 | 1.500 | 1.500 | 1.500 | 3.467 | 8.367 | 15.942 |
| D5 | 16.469 | 14.267 | 16.469 | 14.501 | 7.399 | 2.026 |

[Lens Group Data]

| Group | ST | f |
|---|---|---|
| f1 | 1 | 171.246 |
| f2 | 6 | −59.244 |
| f3 | 14 | 47.749 |
| f4 | 28 | −880.626 |
| f5 | 30 | −47.529 |
| f6 | 35 | 97.090 |

[Vibration Reduction Data]

| | f | K | θ | Z |
|---|---|---|---|---|
| W | 72.0 | 1.00 | 0.3 | 0.38 |
| M | 135.0 | 1.04 | 0.3 | 0.68 |
| T | 194.0 | 1.00 | 0.3 | 1.02 |

TABLE 6-continued

Sixth Example

[Values for Conditional Expressions]

(1) f1/(−f2) = 2.8905
(2) f2/|fZ| = 0.6102
(3) f1/|ff| = 3.6030
(4) ΣG1/TL = 0.0658
(5) f3/(−f2) = 0.8060
(6) f1/fw = 2.3784
(7) nd1 = 2.0010
(8) ωw = 16.805

Figure 22A:
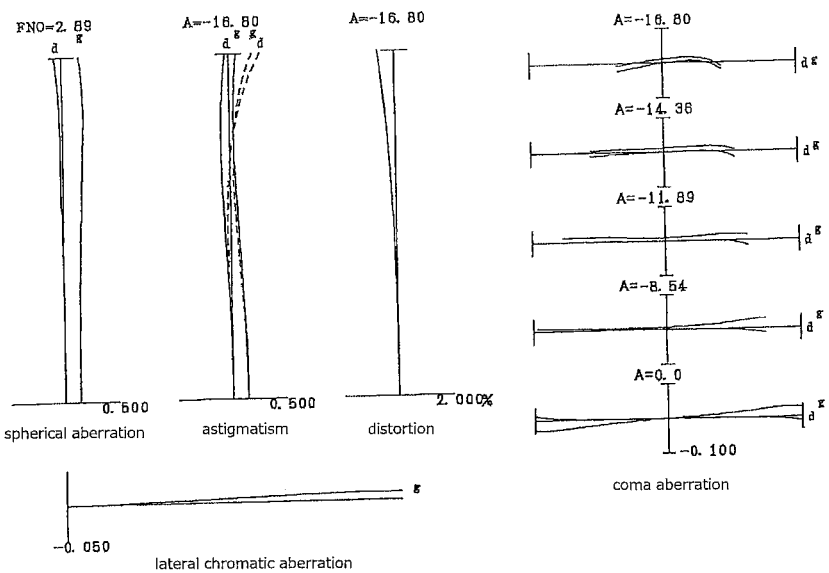
FIG. 22A, FIG. 22B and FIG. 22C are graphs showing various aberrations, upon focusing on an infinite distance object, of the variable magnification optical system according to the Sixth Example, FIG. 22A showing the wide angle end state, FIG. 22B showing the intermediate focal length state, and FIG. 22C showing the telephoto end state.
Figure 22B:
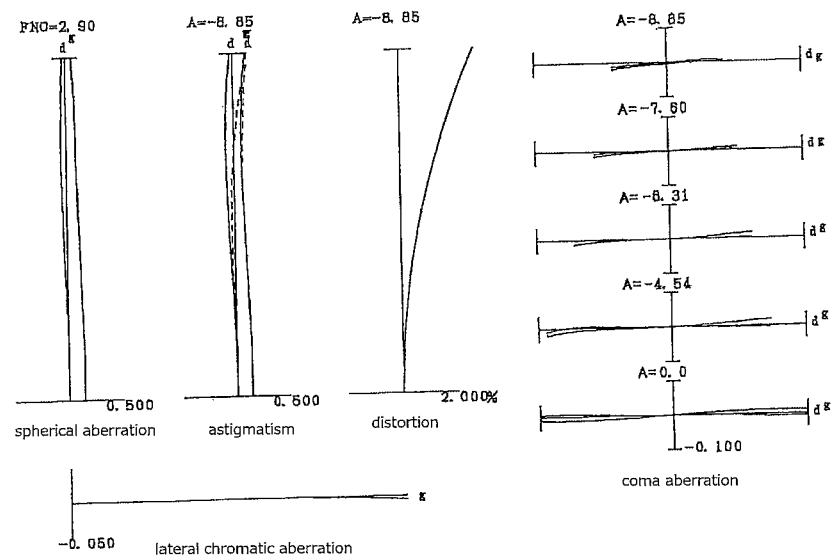
Figure 22C:
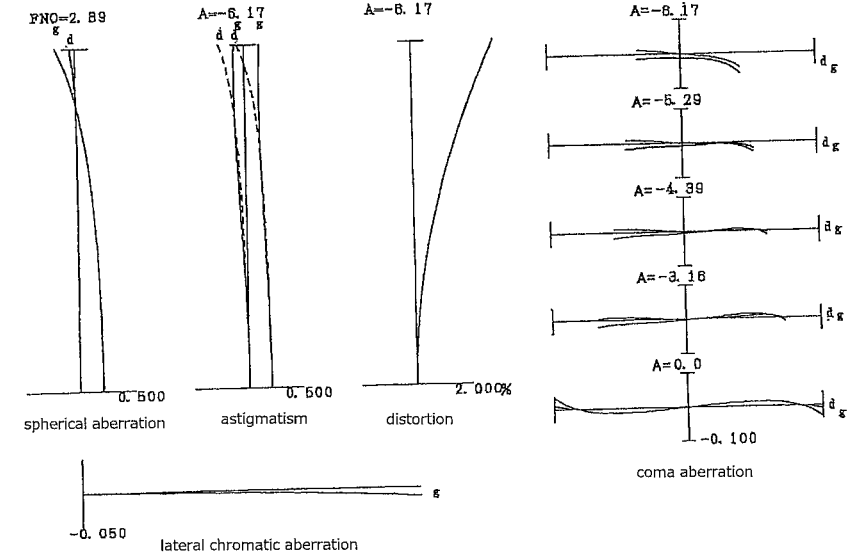

FIGS. 22A, 22B and 22C are graphs showing various aberrations upon focusing on an infinite distance object, respectively, of the variable magnification optical system according to the Sixth Example, FIG. 22A showing the wide angle end state, FIG. 22B showing the intermediate focal length state and FIG. 22C showing the telephoto end state.

Figure 23A:
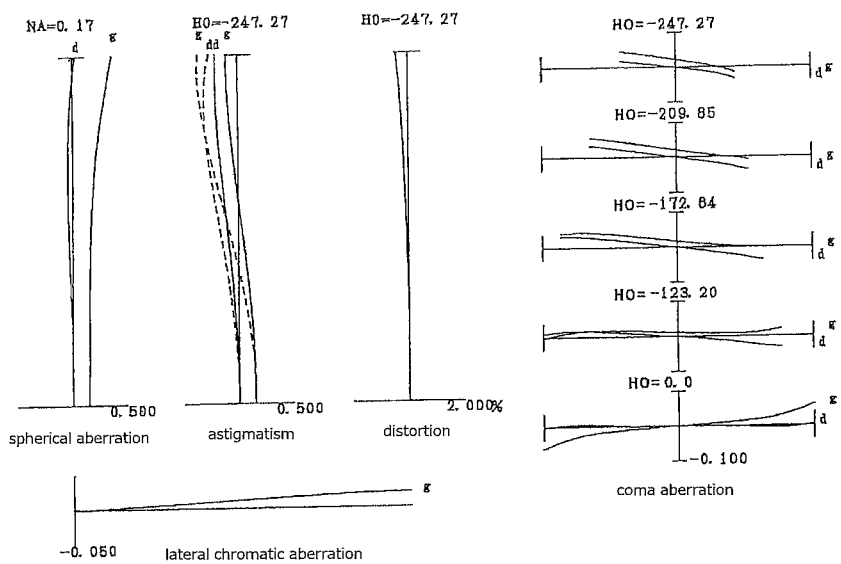
FIG. 23A, 23B and FIG. 23C are graphs showing various aberrations, upon focusing on a finite distance object, of the variable magnification optical system according to the Sixth Example, FIG. 23A showing the wide angle end state, FIG. 23B showing the intermediate focal length state, and FIG. 23C showing the telephoto end state.
Figure 23B:
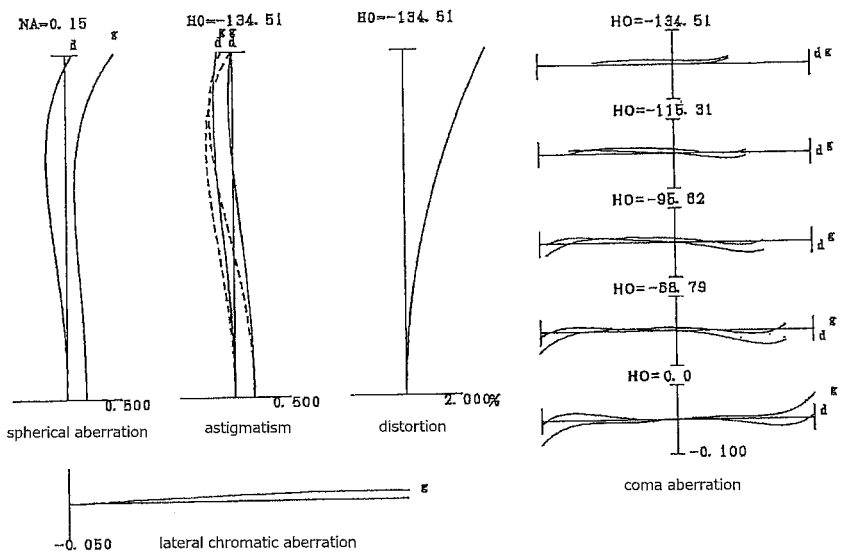
Figure 23C:
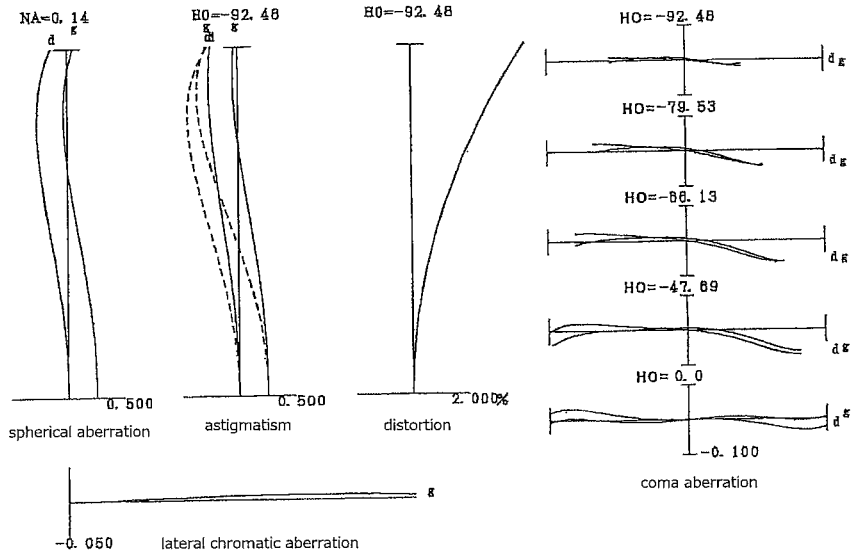

FIGS. 23A, 23B and 23C are graphs showing various aberrations, upon focusing on a finite distance object, of the variable magnification optical system according to the Sixth Example, FIG. 23A showing the wide angle end state, FIG. 23B showing the intermediate focal length state, and FIG. 23C showing the telephoto end state.

Figure 24A:
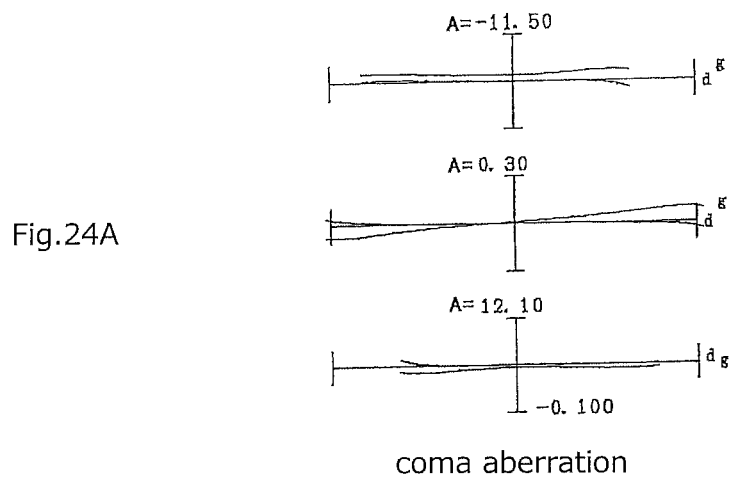
FIG. 24A, FIG. 24B and FIG. 24C are graphs showing meridional transverse aberrations, upon conducting image blur correction at the time when an infinite distance object is focused by the variable magnification optical system according to the Sixth Example, FIG. 24A showing the wide angle end state, FIG. 24B showing the intermediate focal length state, and FIG. 24C showing the telephoto end state.
Figure 24B:
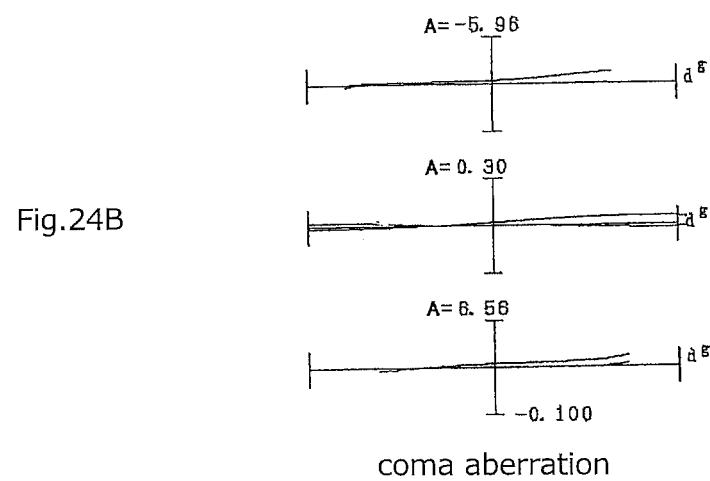
Figure 24C:
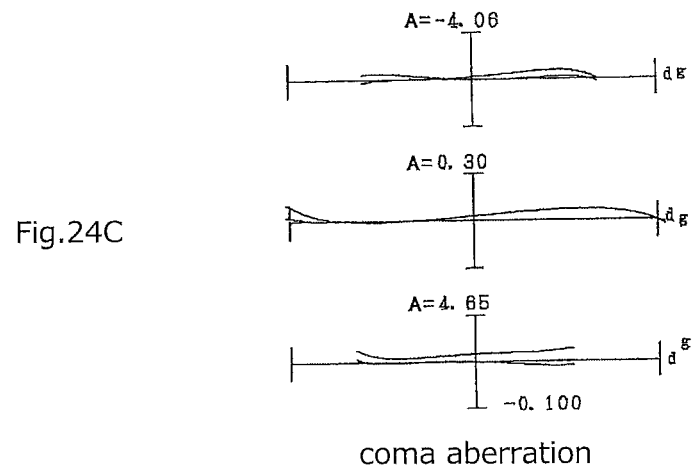

FIGS. 24A, 24B and 24C are graphs showing meridional transverse aberrations, upon conducting image blur correction at the time when an infinite distance object is focused by the variable magnification optical system according to the Sixth Example, FIG. 24A showing the wide angle end state, FIG. 24B showing the intermediate focal length state, and FIG. 24C showing the telephoto end state.

As is apparent from the above-mentioned graphs showing aberrations, the variable magnification optical system relating to the present Example can suppress superbly variations in aberrations upon varying the magnification, and correct superbly various aberrations from the state where an infinite distance object is focused to the state where an finite distance object is focused, and has high optical performance. Further, the variable magnification optical system relating to the present Example has an excellent imaging property even at the time when vibration reduction is conducted.

Seventh Example

Figure 25:
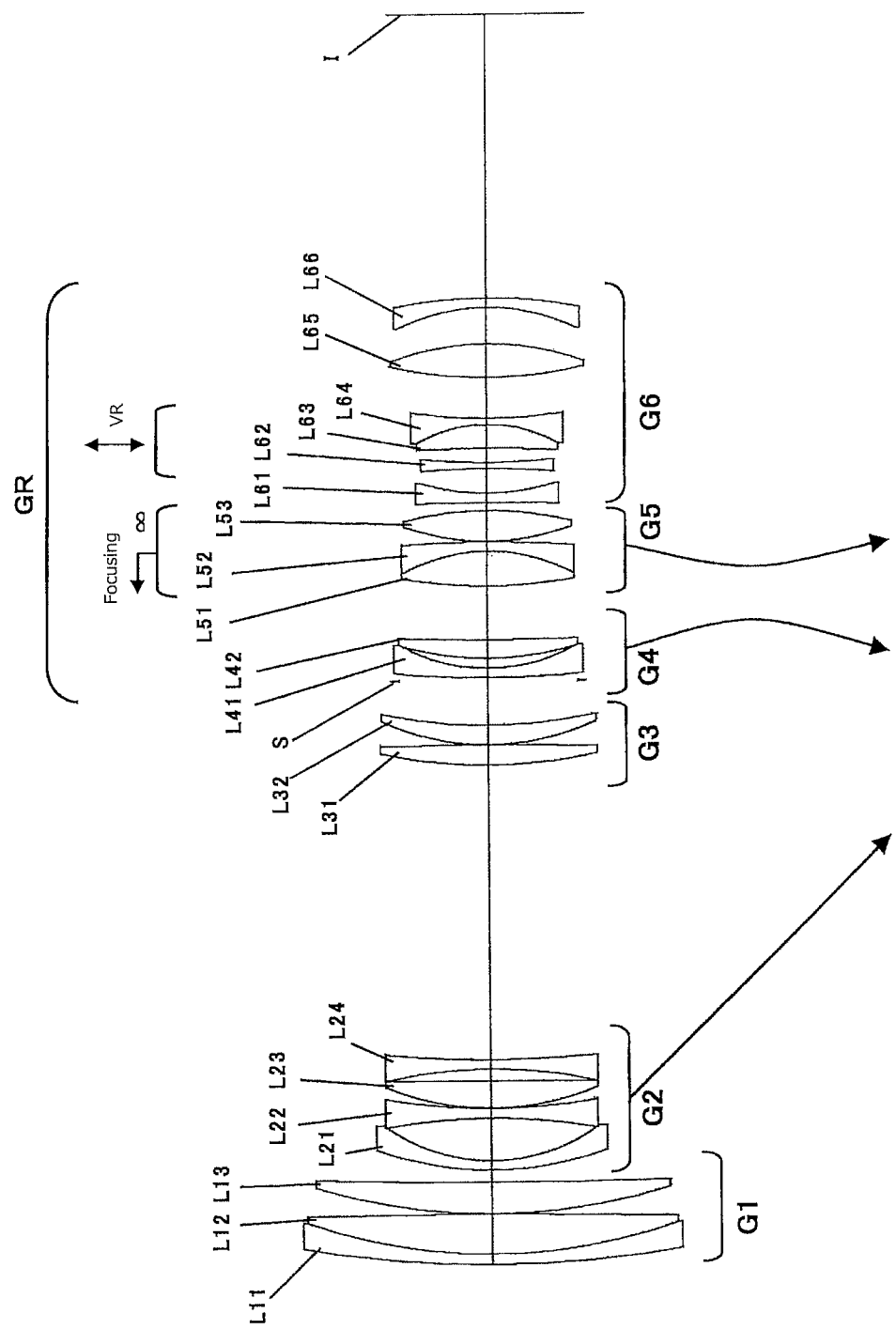
FIG. 25 is a cross sectional view in a wide angle end state of a variable magnification optical system according to a Seventh Example.

FIG. 25 is a sectional view of a variable magnification optical system in a wide angle end state according to a Seventh Example.

The variable magnification optical system according to the present Example is composed of, in order from an object side along the optical axis, a first lens group G1 having positive refractive power, a second lens group G2 having negative refractive power, a third lens group G3 having positive refractive power, and a rear lens group GR.

The first lens group G1 consists of, in order from the object side along the optical axis, a cemented positive lens constructed by a negative meniscus lens L11 having a convex surface facing an object side cemented with a double convex positive lens L12, and a positive meniscus lens L13 having a convex surface facing the object side.

The second lens group G2 consists of, in order from the object side along the optical axis, a negative meniscus lens L21 having a convex surface facing the object side, a double concave negative lens L22, a double convex positive lens L23 and a double concave negative lens L24.

The third lens group G3 consists of, in order from the object side along the optical axis, a double convex positive lens L31, and a positive meniscus lens L32 having a convex surface facing the object side.

The rear lens group GR is composed of, in order from the object side along the optical axis, a fourth lens group G4 having negative refractive power, a fifth lens group G5 having positive refractive power, and a sixth lens group G6 having negative refractive power.

The fourth lens group G4 consists of, in order from the object side along the optical axis, an aperture stop S, a negative meniscus lens L41 having a convex surface facing the object side and a positive meniscus lens L42 having a convex surface facing the object side.

The fifth lens group G5 consists of, in order from the object side along the optical axis, a cemented positive lens constructed by a double convex positive lens L51 cemented with a negative meniscus lens L52 having a concave surface facing the object side, and a double convex positive lens L53.

The sixth lens group G6 consists of, in order from the object side along the optical axis, a double concave negative lens L61, a double concave negative lens L62, a cemented negative lens constructed by a positive meniscus lens L63 having a concave surface facing the object side cemented with a double concave negative lens L64, a double convex positive lens L65 and a negative meniscus lens L66 having a concave surface facing the object side.

On the image plane I, an imaging device (not shown) composed of CCD, CMOS or the like, is disposed.

In the variable magnification optical system according to the present Example, composed as described above, upon varying the magnification from the wide angle end state to the telephoto end state, the second lens group G2, the fourth lens group G4 and the fifth lens group G 5 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5, and a distance between the fifth lens group G5 and the sixth lens group G6, are varied respectively. In detail, the second lens group G2 is moved toward the image side, the fourth lens group G4 is once moved toward the image side and then moved toward the object side, and the fifth lens group G5 is once moved toward the object side and then moved toward the image side. Meanwhile, upon varying the magnification, the first lens group G1, the third lens group G3, and the sixth lens group G6 are fixed with respect to the image plane I.

In the variable magnification optical system according to the present Example, focusing from an infinite distance object to a finite distance object is carried out by moving the fifth lens group G5 toward the object side along the optical axis as focusing lens group.

In the variable magnification optical system according to the present Example, correction of image plane at the time when image blur occurs, that is, vibration reduction is conducted by moving the double concave negative lens L62 and the cemented negative lens constructed by the positive meniscus lens L63 cemented with the double concave negative lens L64 in the sixth lens group G6 as vibration reduction lens group, to have a component in the direction perpendicular to the optical axis.

Table 7 below shows various values of the variable magnification optical system relating to the present Example.

TABLE 7

Seventh Example

[Surface Data]

| m | r | d | vd | nd |
|---|---|---|---|---|
| OP | ∞ | | | |
| 1 | 209.217 | 2.000 | 29.57 | 1.71736 |
| 2 | 104.417 | 7.637 | 82.57 | 1.49782 |
| 3 | −2092.173 | 0.100 | | |
| 4 | 112.007 | 6.134 | 67.90 | 1.59319 |
| 5 | 1164.045 | D1 | | |
| 6 | 63.157 | 1.800 | 32.35 | 1.85026 |
| 7 | 34.560 | 8.096 | | |
| 8 | −115.209 | 1.800 | 67.90 | 1.59319 |
| 9 | 110.406 | 0.100 | | |
| 10 | 52.334 | 5.333 | 23.78 | 1.84666 |
| 11 | −8886.035 | 2.187 | | |
| 12 | −88.860 | 1.800 | 47.35 | 1.78800 |
| 13 | 207.358 | D2 | | |
| 14 | 95.395 | 3.759 | 25.46 | 2.00069 |
| 15 | −2800.830 | 0.100 | | |
| 16 | 47.756 | 3.817 | 51.51 | 1.73400 |
| 17 | 95.816 | 8.590 | | |
| 18(S) | ∞ | D3 | | |
| 19 | 180.046 | 1.800 | 25.26 | 1.90200 |
| 20 | 33.850 | 1.911 | | |
| 21 | 58.380 | 3.548 | 46.59 | 1.81600 |
| 22 | 394.711 | D4 | | |
| 23 | 93.269 | 6.620 | 41.02 | 1.70154 |
| 24 | −33.861 | 1.800 | 29.12 | 2.00100 |
| 25 | −218.531 | 0.100 | | |
| 26 | 46.267 | 5.899 | 82.57 | 1.49782 |
| 27 | −64.616 | D5 | | |
| 28 | −485.482 | 1.800 | 23.80 | 1.84666 |
| 29 | 42.126 | 4.733 | | |
| 30 | −162.582 | 1.200 | 28.69 | 1.79504 |
| 31 | 133.214 | 2.639 | | |
| 32 | −291.694 | 4.590 | 23.80 | 1.84666 |
| 33 | −26.915 | 1.200 | 31.16 | 1.68893 |
| 34 | 95.843 | 7.845 | | |
| 35 | 84.273 | 6.483 | 29.12 | 2.00100 |
| 36 | −52.568 | 6.934 | | |
| 37 | −38.800 | 1.800 | 29.12 | 2.00100 |
| 38 | −91.801 | BF | | |
| I | ∞ | | | |

[Various Data]
Variable magnification ratio 2.69

| | W | M | T |
|---|---|---|---|
| F | 72.0 | 135.0 | 194.0 |
| FNo | 2.9 | 2.9 | 2.9 |
| 2ω | 33.70 | 17.77 | 12.34 |
| Y | 21.6 | 21.6 | 21.6 |
| TL | 239.3 | 239.3 | 239.3 |
| BF | 54.0 | 54.0 | 54.0 |

[Variable Distance Data]

| | Infinite Distance | | | Finite Distance | | |
|---|---|---|---|---|---|---|
| | W | M | T | W | M | T |
| D1 | 2.362 | 38.535 | 57.846 | 2.362 | 38.535 | 57.846 |
| D2 | 56.484 | 20.311 | 1.000 | 56.484 | 20.311 | 1.000 |
| D3 | 0.571 | 0.751 | 0.400 | 0.571 | 0.751 | 0.400 |
| D4 | 10.219 | 8.427 | 10.390 | 10.219 | 8.427 | 10.390 |
| D5 | 1.500 | 3.112 | 1.500 | 1.500 | 3.112 | 1.500 |

[Lens Group Data]

| Group | ST | f |
|---|---|---|
| f1 | 1 | 158.295 |
| f2 | 6 | −53.723 |
| f3 | 14 | 53.119 |
| f4 | 19 | −108.748 |
| f5 | 23 | 47.841 |
| f6 | 28 | −88.291 |

[Vibration Reduction Data]

| | f | K | θ | Z |
|---|---|---|---|---|
| W | 72.0 | −1.00 | 0.3 | −0.38 |
| M | 135.0 | −1.00 | 0.3 | −0.71 |
| T | 194.0 | −1.00 | 0.3 | −1.02 |

[Values for Conditional Expressions]

(1) f1/(−f2) = 2.9465
(2) f2/|fZ| = 0.6085
(3) f1/|ff| = 3.3088
(4) ΣG1/TL = 0.0663
(5) f3/(−f2) = 0.9888
(6) f1/fw = 2.1985
(7) nd1 = 1.7174
(8) ωw = 16.850

Figure 26A:
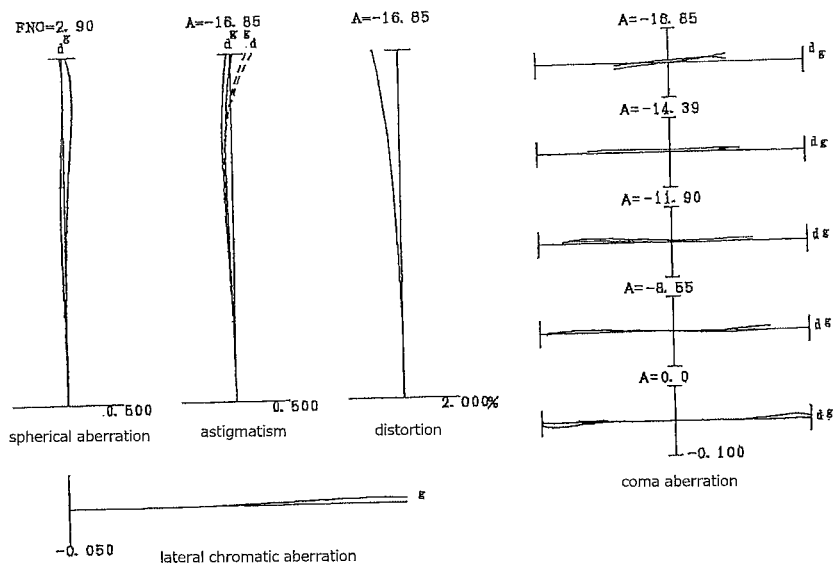
FIG. 26A, FIG. 26B and FIG. 26C are graphs showing various aberrations, upon focusing on an infinite distance object, of the variable magnification optical system according to the Seventh Example, FIG. 26A showing the wide angle end state, FIG. 26B showing the intermediate focal length state, and FIG. 26C showing the telephoto end state.
Figure 26B:
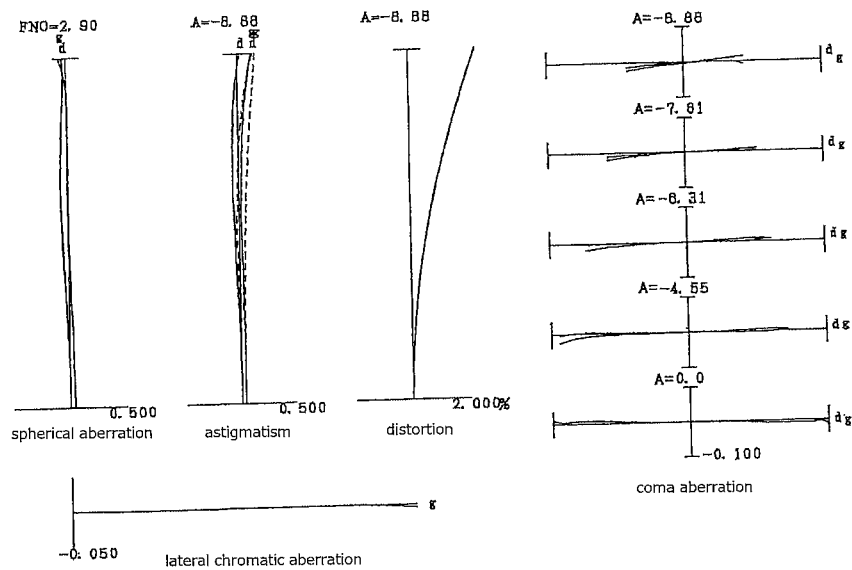
Figure 26C:
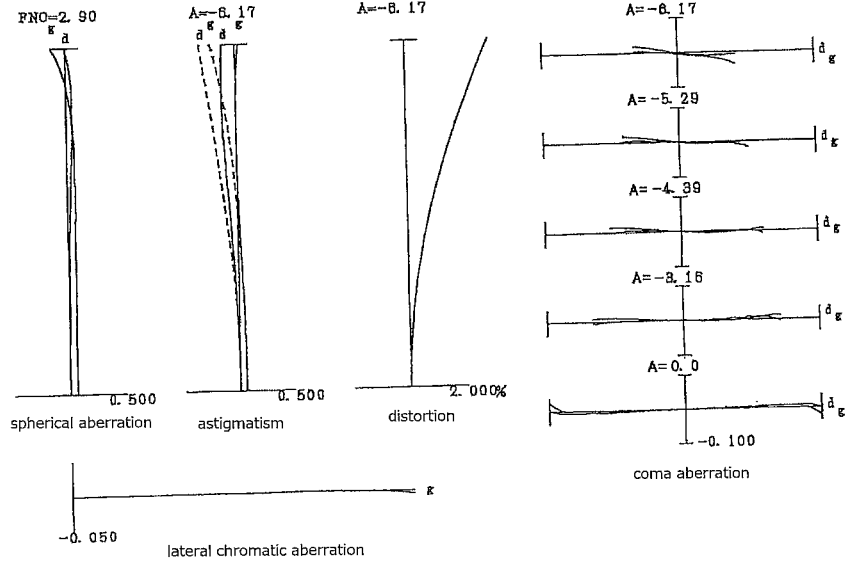

FIGS. 26A, 26B and 26C are graphs showing various aberrations upon focusing on an infinite distance object, respectively, of the variable magnification optical system according to the Seventh Example, FIG. 26A showing the wide angle end state, FIG. 26B showing the intermediate focal length state and FIG. 26C showing the telephoto end state.

Figure 27A:
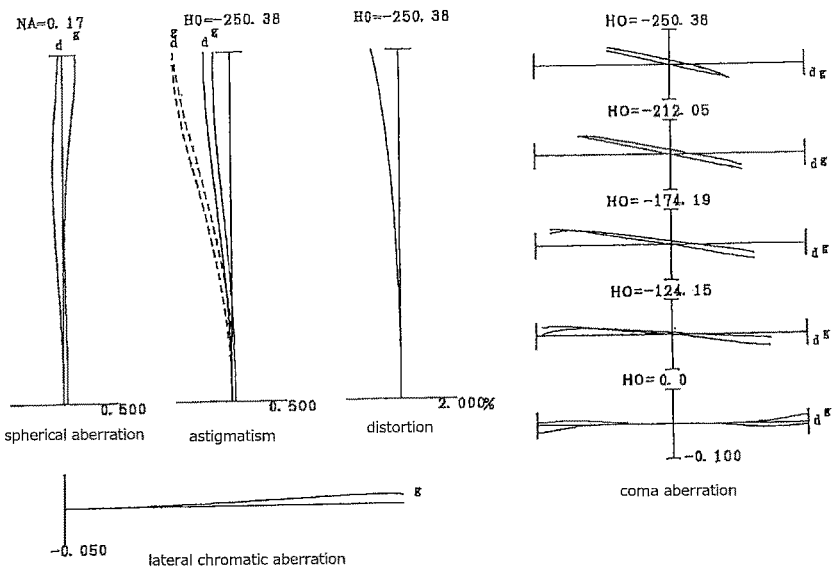
FIG. 27A, FIG. 27B and FIG. 27C are graphs showing various aberrations, upon focusing on a finite distance object, of the variable magnification optical system according to the Seventh Example, FIG. 27A showing the wide angle end state, FIG. 27B showing the intermediate focal length state, and FIG. 27C showing the telephoto end state.
Figure 27B:
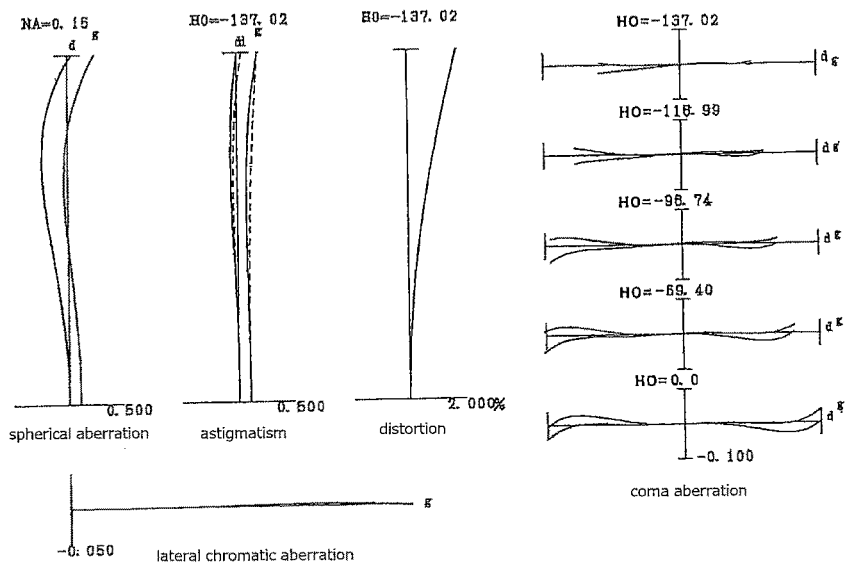
Figure 27C:
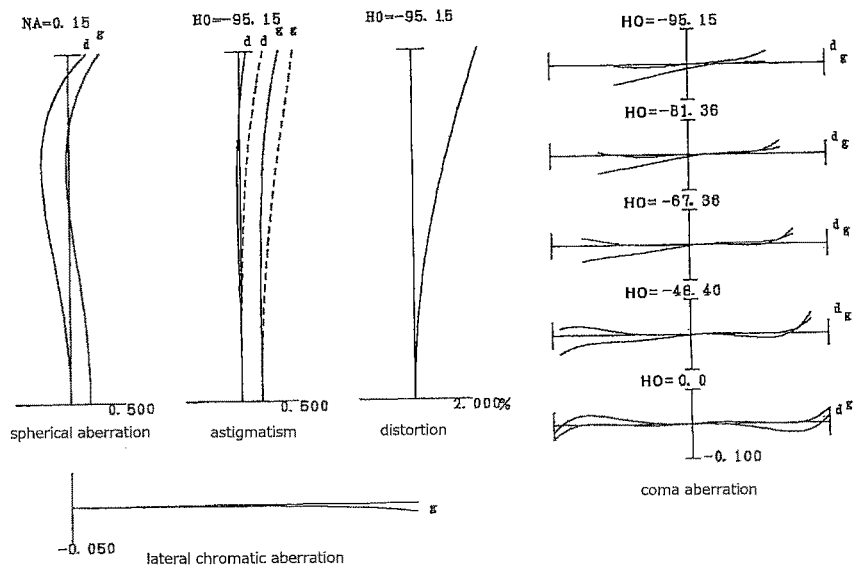

FIGS. 27A, 27B and 27C are graphs showing various aberrations, upon focusing on a finite distance object, of the variable magnification optical system according to the Seventh Example, FIG. 27A showing the wide angle end state, FIG. 27B showing the intermediate focal length state, and FIG. 27C showing the telephoto end state.

Figure 28A:
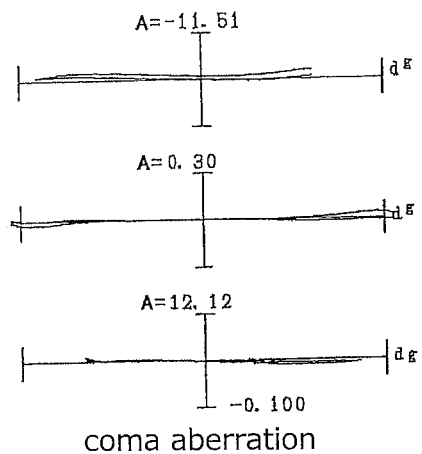
FIG. 28A, FIG. 28B and FIG. 28C are graphs showing meridional transverse aberrations, upon conducting image blur correction at the time when an infinite distance object is focused by the variable magnification optical system according to the Seventh Example, FIG. 28A showing the wide angle end state, FIG. 28B showing the intermediate focal length state, and FIG. 28C showing the telephoto end state.
Figure 28B:
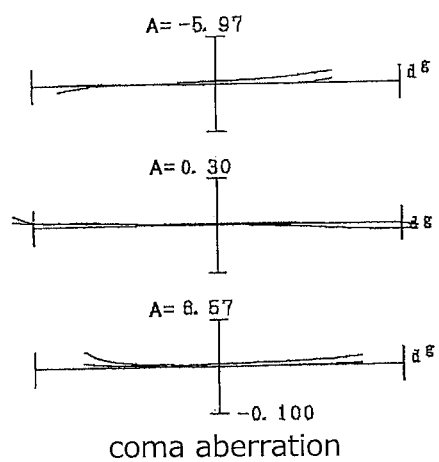
Figure 28C:
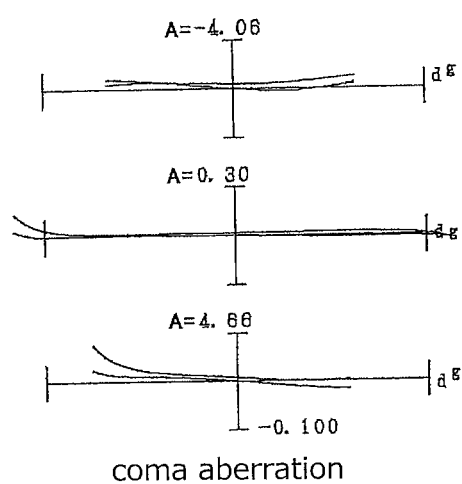

FIGS. 28A, 28B and 28C are graphs showing meridional transverse aberrations, upon conducting image blur correction at the time when an infinite distance object is focused by the variable magnification optical system according to the Seventh Example, FIG. 28A showing the wide angle end state, FIG. 28B showing the intermediate focal length state, and FIG. 28C showing the telephoto end state.

As is apparent from the above-mentioned graphs showing aberrations, the variable magnification optical system relating to the present Example can suppress superbly variations in aberrations upon varying the magnification, and correct superbly various aberrations from the state where an infinite distance object is focused to the state where a finite distance object is focused, and has high optical performance. Further, the variable magnification optical system relating to the present Example has an excellent imaging property even at the time when vibration reduction is conducted.

Eighth Example

Figure 29:
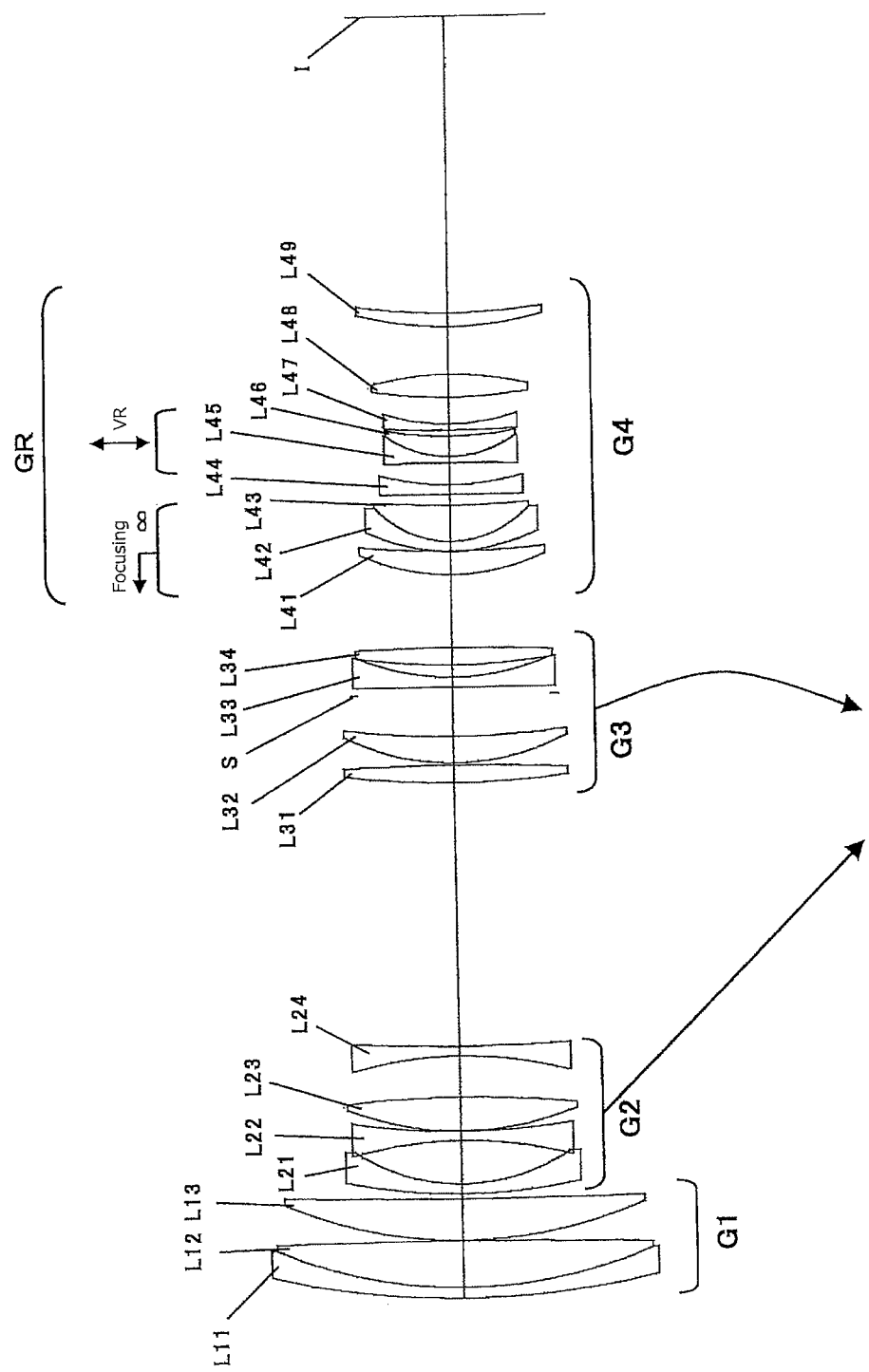
FIG. 29 is a cross sectional view in a wide angle end state of a variable magnification optical system according to an Eighth Example.

FIG. 29 is a sectional view of a variable magnification optical system in a wide angle end state according to an Eighth Example.

The variable magnification optical system according to the present Example is composed of, in order from an object side along the optical axis, a first lens group G1 having positive refractive power, a second lens group G2 having negative refractive power, a third lens group G3 having positive refractive power and a rear lens group GR.

The first lens group G1 consists of, in order from the object side along the optical axis, a cemented positive lens constructed by a negative meniscus lens L11 having a convex surface facing an object side cemented with a double convex positive lens L12, and a positive meniscus lens L13 having a convex surface facing the object side.

The second lens group G2 consists of, in order from the object side along the optical axis, a negative meniscus lens L21 having a convex surface facing the object, a double concave negative lens L22, a double convex positive lens L23 and a double concave negative lens L24.

The third lens group G3 consists of, in order from the object side along the optical axis, a double convex positive lens L31, a positive meniscus lens L32 having a convex surface facing the object side, an aperture stop S, a double concave negative lens L33 and a double convex positive lens L34.

The rear lens group GR is composed of a fourth lens group G4 having positive refractive power.

The fourth lens group G4 consists of, in order from the object side along the optical axis, a positive meniscus lens L41 having a convex surface facing the object side, a cemented positive lens constructed by a negative meniscus lens L42 having a convex surface facing the object side cemented with a positive meniscus lens L43 having a convex surface facing the object side, a negative meniscus lens L44 having a convex surface facing the object side, a cemented negative lens constructed by a double concave negative lens L45 cemented with a positive meniscus lens L46 having a convex surface facing the object side, a negative meniscus lens L47 having a convex surface facing the object side, a double convex positive lens L48, and a positive meniscus lens L49 having a convex surface facing the object side.

On the image plane I, an imaging device (not shown) composed of CCD, CMOS or the like, is disposed.

In the variable magnification optical system according to the present Example, composed as described above, upon varying magnification from the wide angle end state to the telephoto end state, the second lens group G2 and the third lens group G3 are moved along the optical axis such that a distance between the first lens group G1 and the second lens group G2, a distance between the second lens group G2 and the third lens group G3, and a distance between the third lens group G3 and the fourth lens group G4, are varied respectively. In detail, the second lens group G2 is moved toward the image side, and the third lens group G3 is once moved toward the image side and then moved toward the object side. Meanwhile, upon varying the magnification, the first lens group G1 and the fourth lens group G4 are fixed with respect to the image plane I.

In the variable magnification optical system according to the present Example, focusing from an infinite distance object to a finite distance object is carried out by moving the positive meniscus lens L41 having a convex surface facing the object side and the cemented positive lens constructed by the negative meniscus lens L42 having a convex surface facing the object side cemented with the positive meniscus lens L43 having a convex surface facing the object side in the fourth lens group G4 toward the object side along the optical system, as focusing lens group.

In the variable magnification optical system according to the present Example, correction of image plane at the time when image blur occurs, that is, vibration reduction is conducted by moving the cemented negative lens constructed by the double concave negative lens L45 cemented with the positive meniscus lens L46 and the negative meniscus lens L47 in the fourth lens group G4, as vibration reduction lens group, to have a component in the direction perpendicular to the optical axis.

Table 8 below shows various values of the variable magnification optical system relating to the present Example.

TABLE 8

Eighth Example

[Surface Data]

| m | r | d | νd | nd |
|---|---|---|---|---|
| OP | ∞ | | | |
| 1 | 158.573 | 2.000 | 29.12 | 2.00100 |
| 2 | 91.948 | 8.573 | 82.57 | 1.49782 |
| 3 | −1585.732 | 0.100 | | |
| 4 | 84.937 | 7.813 | 67.90 | 1.59319 |
| 5 | 1191.702 | D1 | | |
| 6 | 108.791 | 1.800 | 47.35 | 1.78800 |
| 7 | 36.574 | 8.038 | | |
| 8 | −80.559 | 1.800 | 82.57 | 1.49782 |
| 9 | 130.715 | 0.100 | | |
| 10 | 58.230 | 6.323 | 23.80 | 1.84666 |
| 11 | −208.863 | 7.694 | | |
| 12 | −75.425 | 1.800 | 32.33 | 1.95375 |
| 13 | 360.429 | D2 | | |
| 14 | 169.455 | 3.226 | 42.73 | 1.83481 |
| 15 | −438.491 | 0.400 | | |
| 16 | 45.961 | 4.937 | 67.90 | 1.59319 |
| 17 | 157.123 | 7.817 | | |
| 18(S) | ∞ | 1.565 | | |
| 19 | −2437.915 | 1.800 | 29.57 | 1.71736 |
| 20 | 45.900 | 2.328 | | |
| 21 | 122.231 | 3.210 | 42.73 | 1.83481 |
| 22 | −457.596 | D3 | | |
| 23 | 40.380 | 4.365 | 42.73 | 1.83481 |
| 24 | 156.474 | 0.100 | | |
| 25 | 37.439 | 1.800 | 32.35 | 1.85026 |
| 26 | 19.610 | 6.721 | 82.57 | 1.49782 |
| 27 | 165.358 | D4 | | |
| 28 | 10194.939 | 1.800 | 42.73 | 1.83481 |
| 29 | 50.974 | 3.997 | | |
| 30 | −2289.058 | 1.200 | 31.16 | 1.68893 |
| 31 | 21.117 | 3.779 | 23.80 | 1.84666 |
| 32 | 62.561 | 1.098 | | |
| 33 | 181.371 | 1.200 | 46.48 | 1.58267 |
| 34 | 41.402 | 4.979 | | |
| 35 | 96.615 | 4.225 | 82.57 | 1.49782 |
| 36 | −61.209 | 8.922 | | |
| 37 | 66.412 | 2.594 | 23.80 | 1.84666 |
| 38 | 122.570 | BF | | |
| I | ∞ | | | |

[Various Data]
Variable magnification ratio 2.69

| | W | M | T |
|---|---|---|---|
| F | 72.0 | 135.0 | 194.0 |
| FNo | 2.9 | 2.9 | 2.9 |
| 2ω | 33.58 | 17.69 | 12.34 |
| Y | 21.6 | 21.6 | 21.6 |
| TL | 239.3 | 239.3 | 239.3 |
| BF | 55.2 | 55.2 | 55.2 |

[Variable Distance Data]

| | Infinite Distance | | | Finite Distance | | |
|---|---|---|---|---|---|---|
| | W | M | T | W | M | T |
| D1 | 1.000 | 33.870 | 43.739 | 1.000 | 33.870 | 43.739 |
| D2 | 49.267 | 23.339 | 1.000 | 49.267 | 23.339 | 1.000 |
| D3 | 13.750 | 6.808 | 19.278 | 12.186 | 1.642 | 8.413 |
| D4 | 2.209 | 2.209 | 2.209 | 3.593 | 7.195 | 12.894 |

TABLE 8-continued

Eighth Example

[Lens Group Data]

| Group | ST | f |
|---|---|---|
| f1 | 1 | 131.291 |
| f2 | 6 | -44.619 |
| f3 | 14 | 95.897 |
| f4 | 23 | 125.944 |

[Vibration Reduction Data]

| | f | K | θ | Z |
|---|---|---|---|---|
| W | 72.0 | -1.06 | 0.3 | -0.36 |
| M | 135.0 | -1.06 | 0.3 | -0.67 |
| T | 194.0 | -1.06 | 0.3 | -0.96 |

[Values for Conditional Expressions]

(1) f1/(-f2) = 2.9425
(2) f2/|fZ| = 0.3543
(3) f1/|ff| = 2.4000
(4) ΣG1/TL = 0.0772
(5) f3/(-f2) = 2.1492
(6) f1/fw = 1.8235
(7) nd1 = 2.0010
(8) ωw = 16.790

Figure 30A:
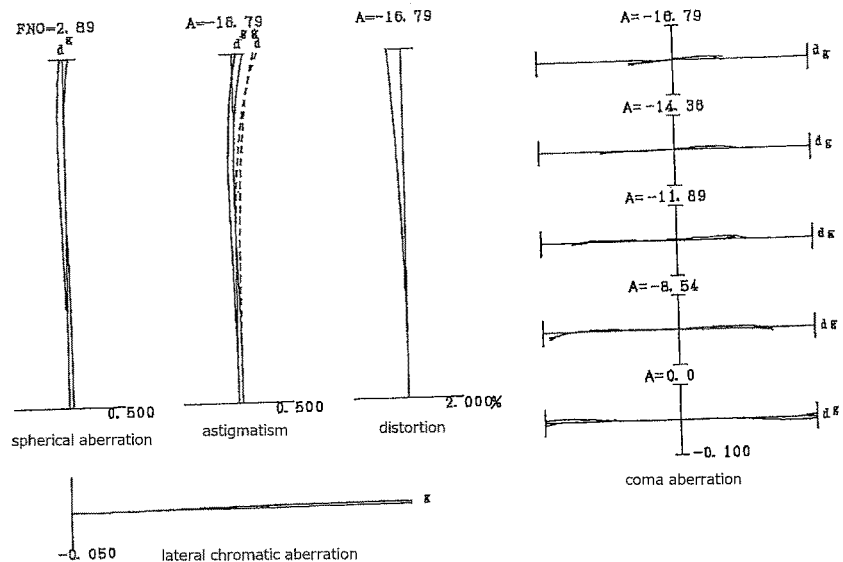
FIG. 30A, FIG. 30B and FIG. 30C are graphs showing various aberrations, upon focusing on an infinite distance object, of the variable magnification optical system according to the Eighth Example, FIG. 30A showing the wide angle end state, FIG. 30B showing the intermediate focal length state, and FIG. 30C showing the telephoto end state.
Figure 30B:
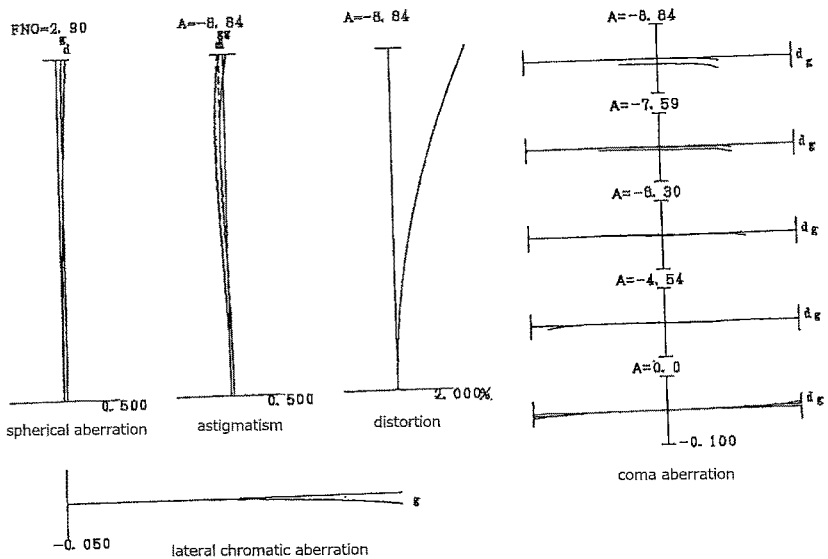
Figure 30C:
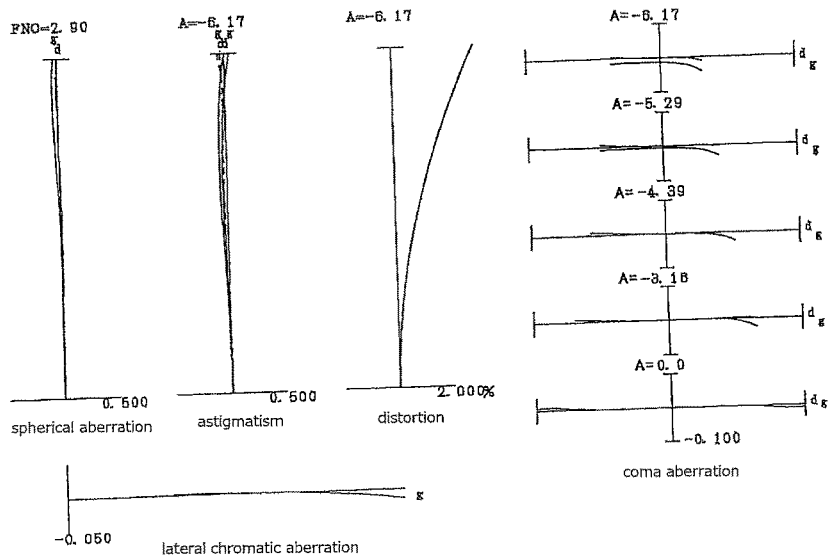

FIGS. 30A, 30B and 30C are graphs showing various aberrations upon focusing on an infinite distance object, respectively, of the variable magnification optical system according to the Eighth Example, FIG. 30A showing the wide angle end state, FIG. 30B showing the intermediate focal length state and FIG. 30C showing the telephoto end state.

Figure 31A:
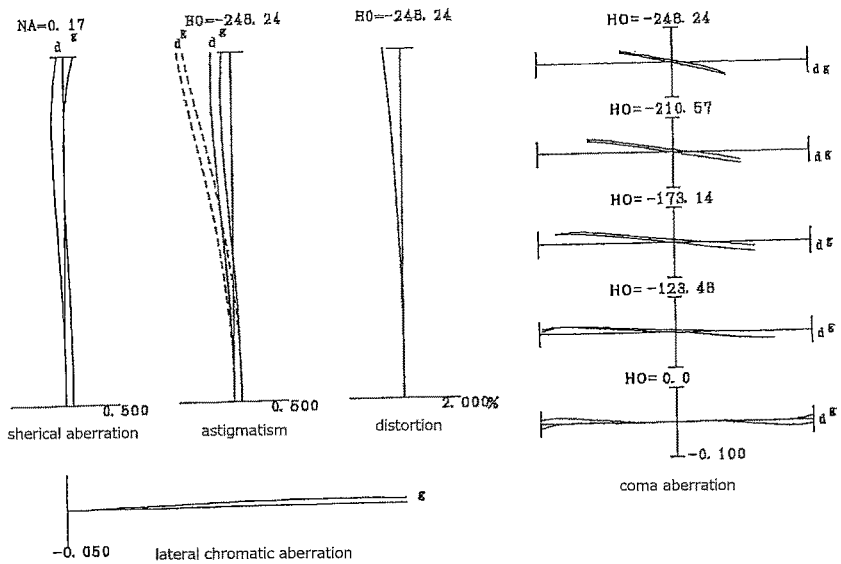
FIG. 31A, FIG. 31B and FIG. 31C are graphs showing various aberrations, upon focusing on a finite distance object, of the variable magnification optical system according to the Eighth Example, FIG. 31A showing the wide angle end state, FIG. 31B showing the intermediate focal length state, and FIG. 31C showing the telephoto end state.
Figure 31B:
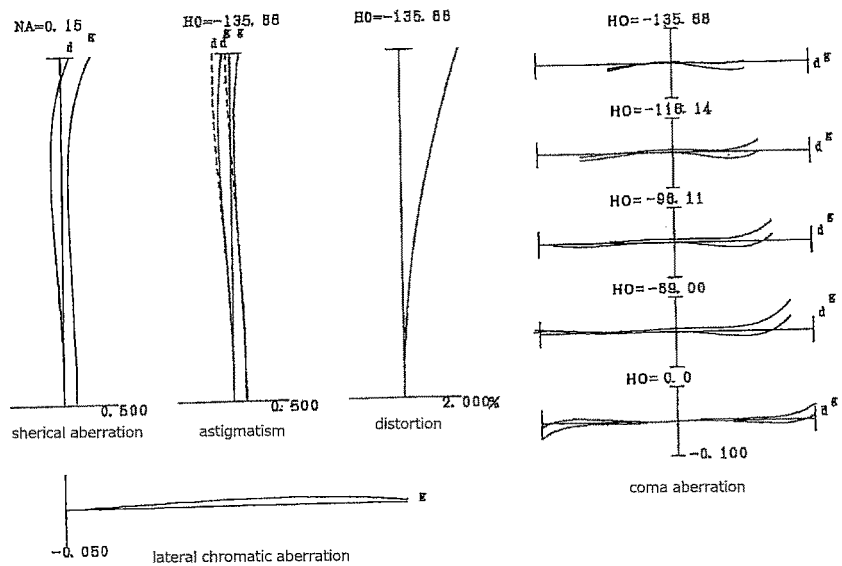
Figure 31C:
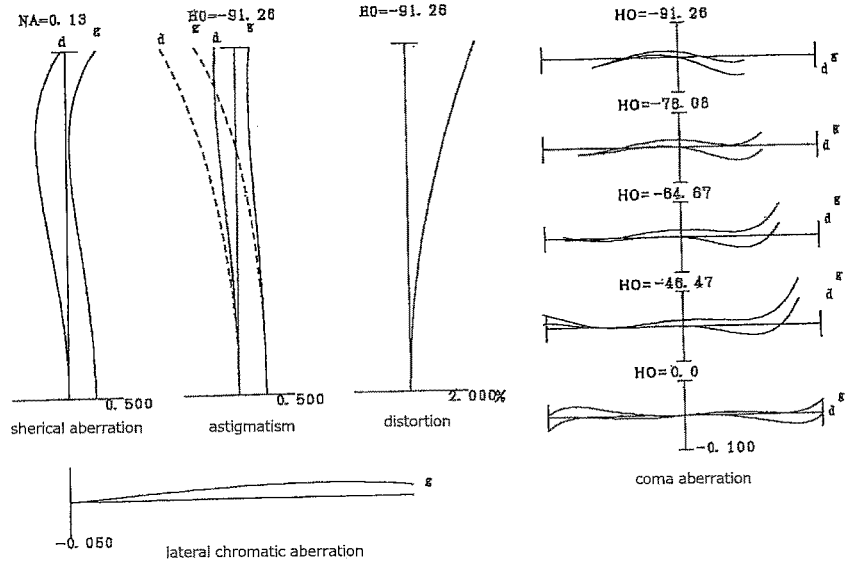

FIGS. 31A, 31B and 31C are graphs showing various aberrations, upon focusing on a finite distance object, of the variable magnification optical system according to the Eighth Example, FIG. 31A showing the wide angle end state, FIG. 31B showing the intermediate focal length state, and FIG. 31C showing the telephoto end state.

Figure 32A:
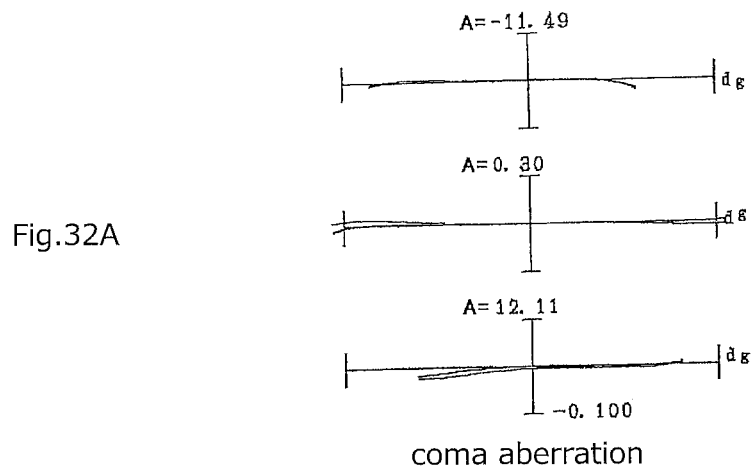
FIG. 32A, FIG. 32B and FIG. 32C are graphs showing meridional transverse aberrations, upon conducting image blur correction at the time when an infinite distance object is focused by the variable magnification optical system according to the Eighth Example, FIG. 32A showing the wide angle end state, FIG. 32B showing the intermediate focal length state, and FIG. 32C showing the telephoto end state.
Figure 32B:
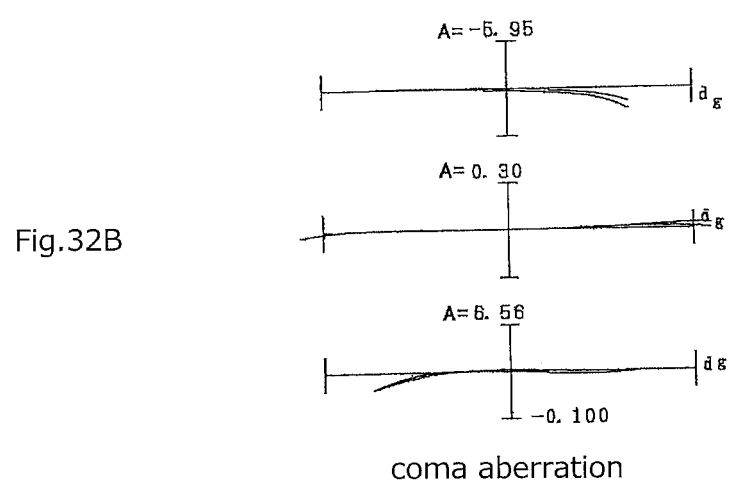
Figure 32C:
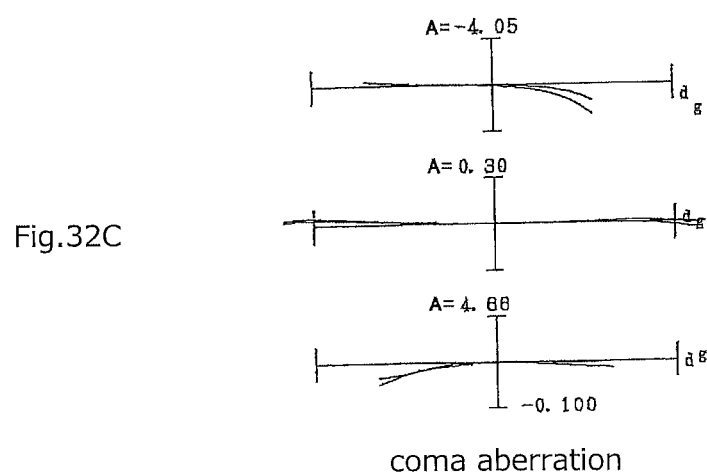

FIGS. 32A, 32B and 32C are graphs showing meridional transverse aberrations, upon conducting image blur correction at the time when an infinite distance object is focused by the variable magnification optical system according to the Eighth Example, FIG. 32A showing the wide angle end state, FIG. 32B showing the intermediate focal length state, and FIG. 32C showing the telephoto end state.

As is apparent from the above-mentioned graphs showing aberrations, the variable magnification optical system relating to the present Example can suppress superbly variations in aberrations upon varying the magnification, and correct superbly various aberrations from the state where an infinite distance object is focused to the state where an finite distance object is focused, and has high optical performance. Further, the variable magnification optical system relating to the present Example has an excellent imaging property even at the time when vibration reduction is conducted.

Ninth Example

Figure 33:
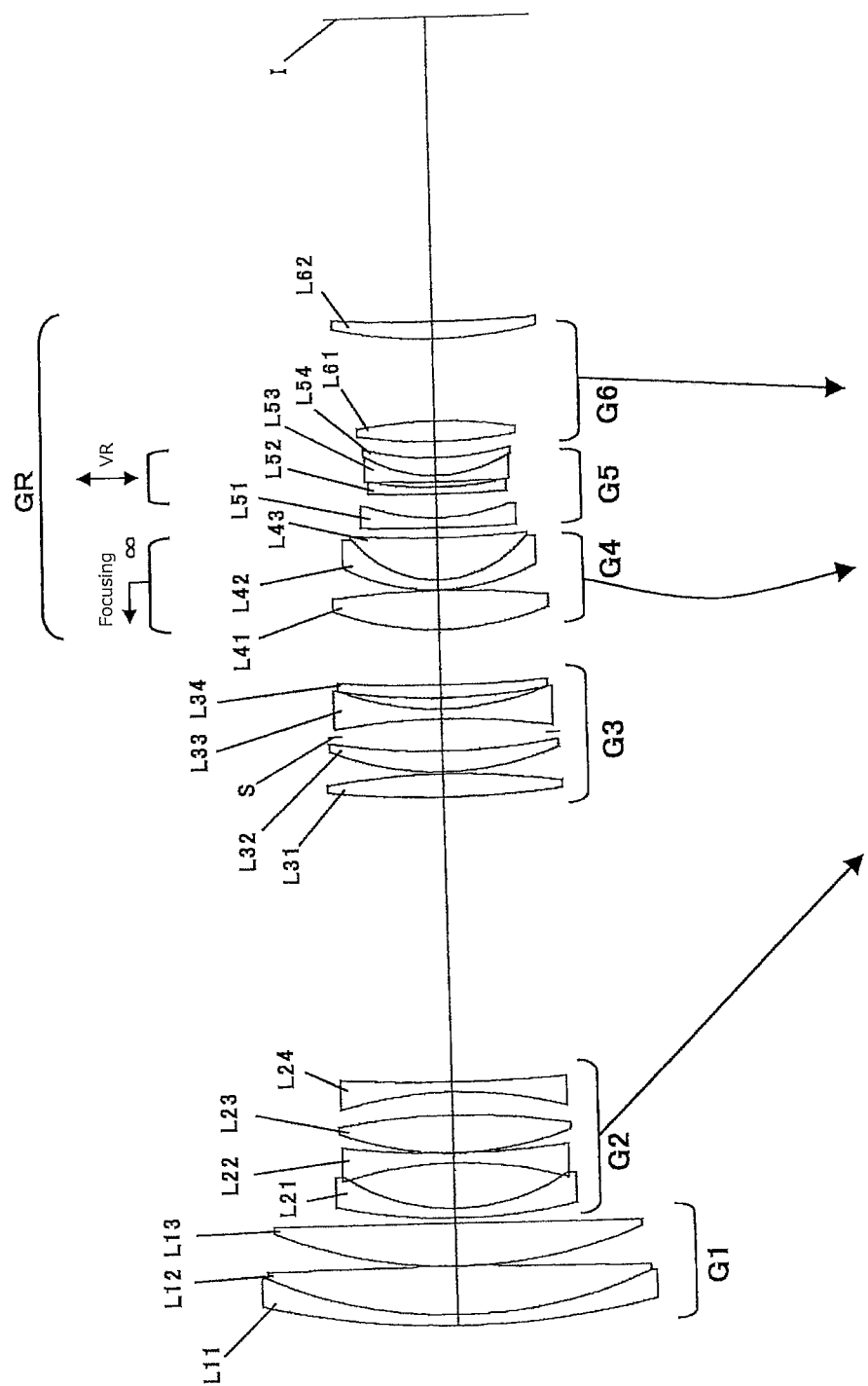
FIG. 33 is a cross sectional view in a wide angle end state of a variable magnification optical system according to a Ninth Example.

FIG. 33 is a sectional view of a variable magnification optical system in a wide angle end state according to a Ninth Example.

The variable magnification optical system according to the present Example is composed of, in order from an object side along the optical axis, a first lens group G1 having positive refractive power, a second lens group G2 having negative refractive power, a third lens group G3 having positive refractive power and a rear lens group GR.

The first lens group G1 consists of, in order from the object side along the optical axis, a cemented positive lens constructed by a negative meniscus lens L11 having a convex surface facing the object side cemented with a double convex positive lens L12, and a positive meniscus lens L13 having a convex surface facing the object side.

The second lens group G2 consists of, in order from the object side along the optical axis, a negative meniscus lens L21 having a convex surface facing the object side, a double concave negative lens L22, a double convex positive lens L23 and a double concave negative lens L24.

The third lens group G3 consists of, in order from the object side along the optical axis, a double convex positive lens L31, a positive meniscus lens L32 having a convex surface facing the object side, an aperture stop S, a double concave negative lens L33, and a positive meniscus lens L34 having a convex surface facing the object side.

The rear lens group GR is composed of, in order from the object side along the optical axis, a fourth lens group G4 having positive refractive power, a fifth lens group G5 having negative refractive power and a sixth lens group G6 having positive refractive power.

The fourth lens group G4 consists of, in order from the object side along the optical axis, a double convex positive lens L41 and a cemented positive lens constructed by a negative meniscus lens L42 having a convex surface facing the object side cemented with a positive meniscus lens L43 having a convex surface facing the object side.

The fifth lens group G5 consists of, in order from the object side along the optical axis, a negative meniscus lens L51 having a convex surface facing the object side, a negative meniscus lens L52 having a convex surface facing the object side, and a cemented negative lens constructed by a negative meniscus lens L53 having a convex surface facing the object side cemented with a positive meniscus lens L54 having a convex surface facing the object side.

The sixth lens group G6 consists of, in order from the object side along the optical axis, a double convex positive lens L61 and a positive meniscus lens L62 having a convex surface facing the object side.

On the image plane I, an imaging device (not shown) composed of CCD, CMOS or the like, is disposed.

In the variable magnification optical system according to the present Example, composed as described above, upon varying magnification from the wide angle end state to the telephoto end state, the second lens group G2, the fourth lens group G4 and the sixth lens group G6 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5 and a distance between the fifth lens group G5 and the sixth lens group G6 are varied respectively. In detail, the second lens group G2 is moved toward the image side, the fourth lens group G4 is once moved toward the object side and then moved toward the image side, and the sixth lens group G6 is moved toward the object side. Meanwhile, upon varying the magnification, the first lens group G1, the third lens group G3 and the fifth lens group G5 are fixed with respect to the image plane I.

In the variable magnification optical system according to the present Example, focusing from an infinite distance object to a finite distance object is carried out by moving the fourth lens group G4 toward the object side along the optical axis as focusing lens group.

In the variable magnification optical system according to the present Example, correction of image plane at the time when image blur occurs, that is, vibration reduction is conducted by moving the negative meniscus lens L52 and the cemented negative lens constructed by the negative meniscus lens L53 having a convex surface facing the object side cemented with the positive meniscus lens L54 having a convex surface facing the object side in the fifth lens group G5, as vibration reduction lens group, to have a component in the direction perpendicular to the optical axis.

Table 9 below shows various values of the variable magnification optical system relating to the present Example.

TABLE 9

Ninth Example

[Surface Data]

| m | r | d | vd | nd |
|---|---|---|---|---|
| OP | ∞ | | | |
| 1 | 155.850 | 2.000 | 32.33 | 1.95375 |
| 2 | 89.920 | 8.727 | 82.57 | 1.49782 |
| 3 | −1558.500 | 0.100 | | |
| 4 | 89.949 | 7.821 | 70.32 | 1.48749 |
| 5 | 72460.848 | D1 | | |
| 6 | 98.702 | 1.800 | 43.79 | 1.84850 |
| 7 | 36.872 | 8.296 | | |
| 8 | −73.510 | 1.800 | 82.57 | 1.49782 |
| 9 | 155.478 | 0.100 | | |
| 10 | 59.278 | 6.930 | 23.80 | 1.84666 |
| 11 | −120.924 | 4.232 | | |
| 12 | −75.160 | 1.800 | 29.12 | 2.00100 |
| 13 | 343.766 | D2 | | |
| 14 | 185.675 | 4.222 | 43.79 | 1.84850 |
| 15 | −140.064 | 0.400 | | |
| 16 | 55.130 | 3.823 | 35.72 | 1.90265 |
| 17 | 125.480 | 3.009 | | |
| 18(S) | ∞ | 2.882 | | |
| 19 | −125.430 | 1.800 | 32.18 | 1.67270 |
| 20 | 51.413 | 2.056 | | |
| 21 | 118.685 | 2.347 | 47.35 | 1.78800 |
| 22 | 247.284 | D3 | | |
| 23 | 53.923 | 7.185 | 53.96 | 1.71300 |
| 24 | −166.523 | 0.100 | | |
| 25 | 38.822 | 1.800 | 27.74 | 1.74077 |
| 26 | 20.340 | 7.703 | 82.57 | 1.49782 |
| 27 | 194.476 | D4 | | |
| 28 | 504.170 | 1.800 | 35.25 | 1.74950 |
| 29 | 37.089 | 4.363 | | |
| 30 | 246.883 | 1.200 | 37.18 | 1.83400 |
| 31 | 59.359 | 1.026 | | |
| 32 | 246.628 | 1.200 | 41.87 | 1.66755 |
| 33 | 25.982 | 3.158 | 23.80 | 1.84666 |
| 34 | 52.993 | D5 | | |
| 35 | 90.879 | 3.667 | 82.57 | 1.49782 |
| 36 | −86.341 | 14.995 | | |
| 37 | 80.158 | 3.147 | 23.80 | 1.84666 |
| 38 | 359.653 | BF | | |
| I | ∞ | | | |

[Various Data]
Variable magnification ratio 2.69

| | W | M | T |
|---|---|---|---|
| F | 72.0 | 135.0 | 194.0 |
| FNo | 2.9 | 2.9 | 2.9 |
| 2ω | 33.49 | 17.74 | 12.34 |
| Y | 21.6 | 21.6 | 21.6 |
| TL | 239.3 | 239.3 | 239.3 |
| BF | 55.6 | 55.9 | 56.5 |

TABLE 9-continued

Ninth Example

[Variable Distance Data]

| | Infinite Distance | | | Finite Distance | | |
|---|---|---|---|---|---|---|
| | W | M | T | W | M | T |
| D1 | 1.000 | 33.957 | 52.118 | 1.000 | 33.957 | 52.118 |
| D2 | 52.118 | 19.160 | 1.000 | 52.118 | 19.160 | 1.000 |
| D3 | 10.299 | 8.535 | 10.299 | 9.030 | 4.181 | 1.146 |
| D4 | 1.828 | 3.592 | 1.828 | 3.097 | 7.946 | 10.981 |
| D5 | 3.007 | 2.692 | 2.045 | 3.007 | 2.692 | 2.045 |

[Lens Group Data]

| Group | ST | f |
|---|---|---|
| f1 | 1 | 148.350 |
| f2 | 6 | −49.895 |
| f3 | 14 | 125.621 |
| f4 | 23 | 44.579 |
| f5 | 28 | −26.169 |
| f6 | 35 | 55.650 |

[Vibration Reduction Data]

| | f | K | θ | Z |
|---|---|---|---|---|
| W | 72.0 | −1.11 | 0.3 | −0.34 |
| M | 135.0 | −1.12 | 0.3 | −0.63 |
| T | 194.0 | −1.13 | 0.3 | −0.90 |

[Values for Conditional Expressions]

(1) f1/(−f2) = 2.9732
(2) f2/|fZ| = 0.8966
(3) f1/|ff| = 3.3278
(4) ΣG1/TL = 0.0779
(5) f3/(−f2) = 2.5177
(6) f1/fw = 2.0604
(7) nd1 = 1.9538
(8) ωw = 16.745

Figure 34A:
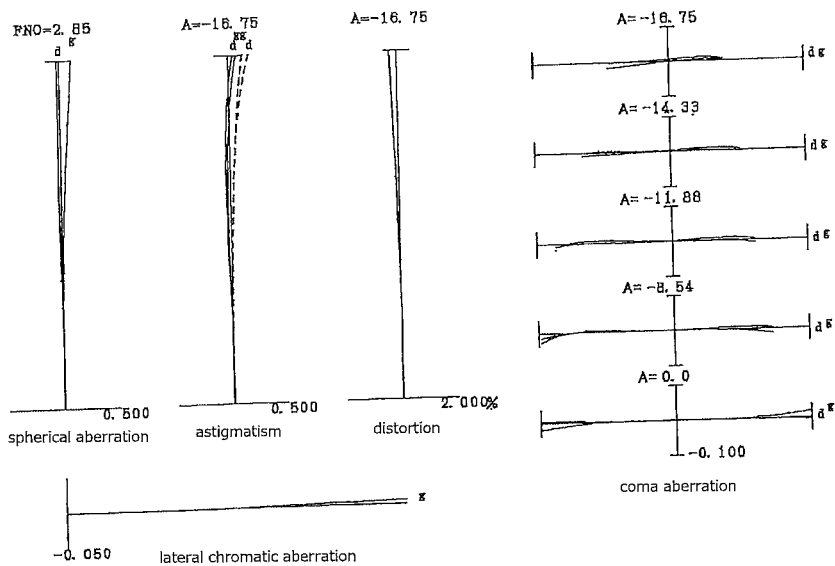
FIG. 34A, FIG. 34B and FIG. 34C are graphs showing various aberrations, upon focusing on an infinite distance object, of the variable magnification optical system according to the Ninth Example, FIG. 34A showing the wide angle end state, FIG. 34B showing the intermediate focal length state, and FIG. 34C showing the telephoto end state.
Figure 34B:
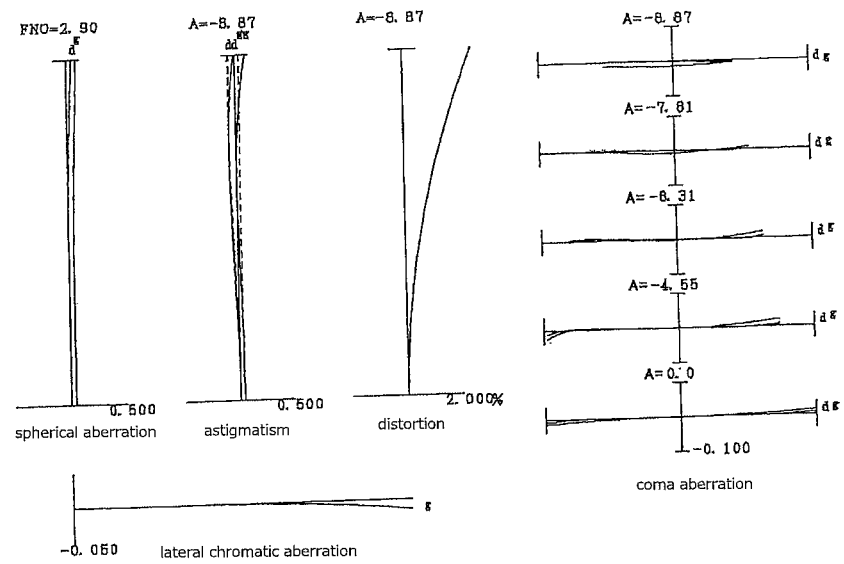
Figure 34C:
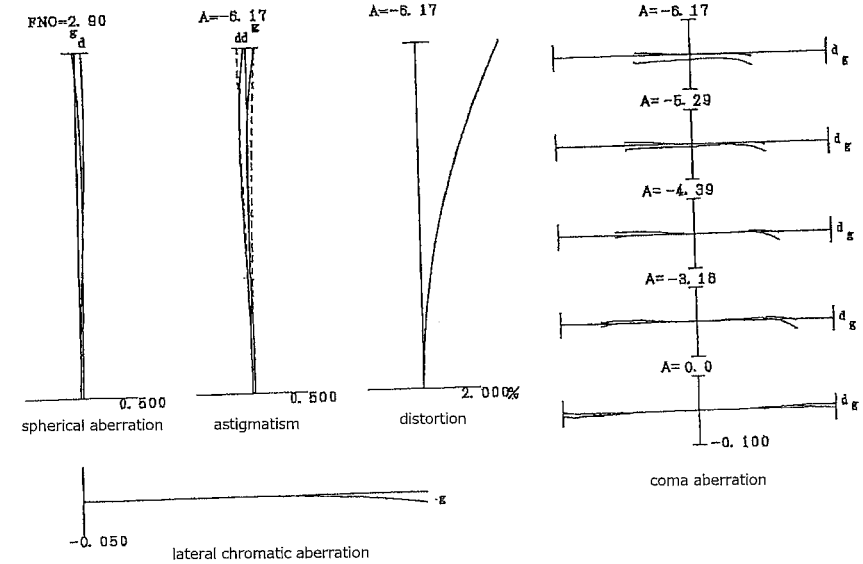

FIGS. 34A, 34B and 34C are graphs showing various aberrations upon focusing on an infinite distance object, respectively, of the variable magnification optical system according to the Ninth Example, FIG. 34A showing the wide angle end state, FIG. 34B showing the intermediate focal length state and FIG. 34C showing the telephoto end state.

Figure 35A:
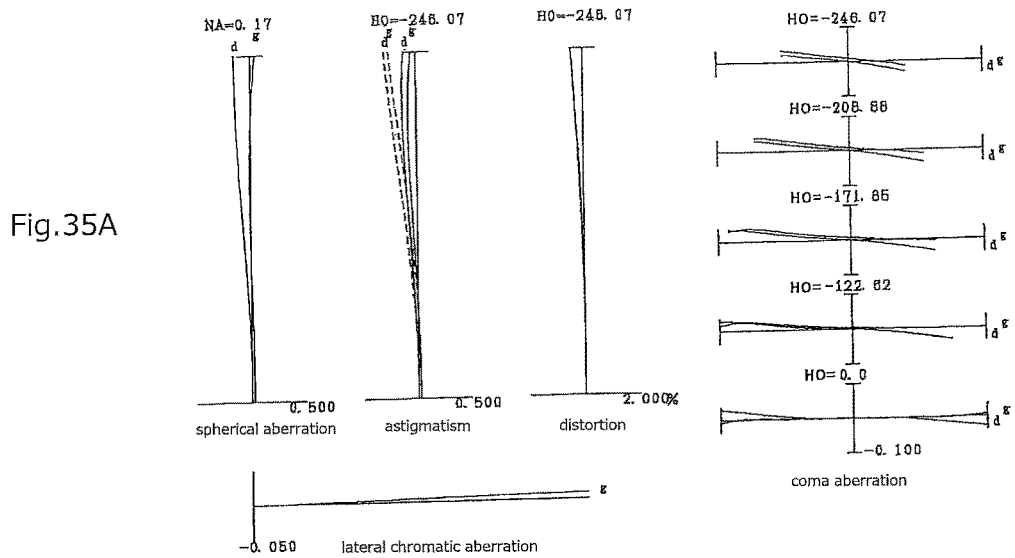
FIG. 35A, FIG. 35B and FIG. 35C are graphs showing various aberrations, upon focusing on a finite distance object, of the variable magnification optical system according to the Ninth Example, FIG. 35A showing the wide angle end state, FIG. 35B showing the intermediate focal length state, and FIG. 35C showing the telephoto end state.
Figure 35B:
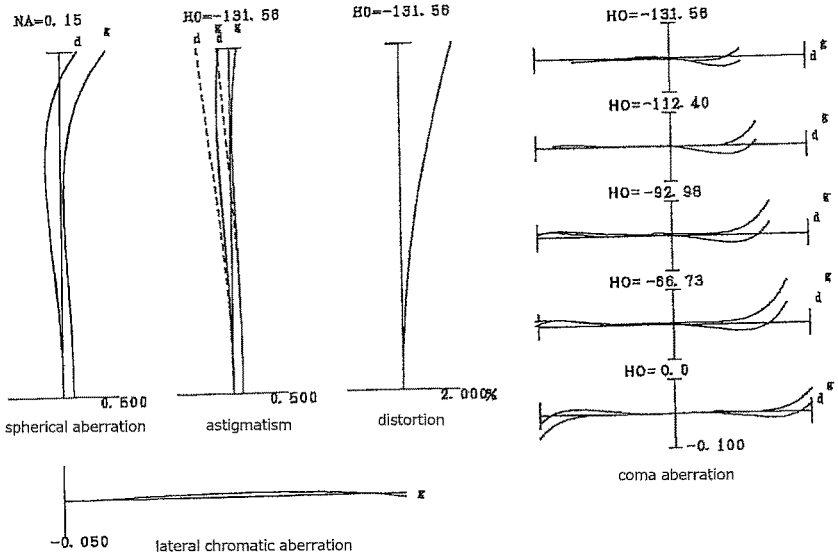
Figure 35C:
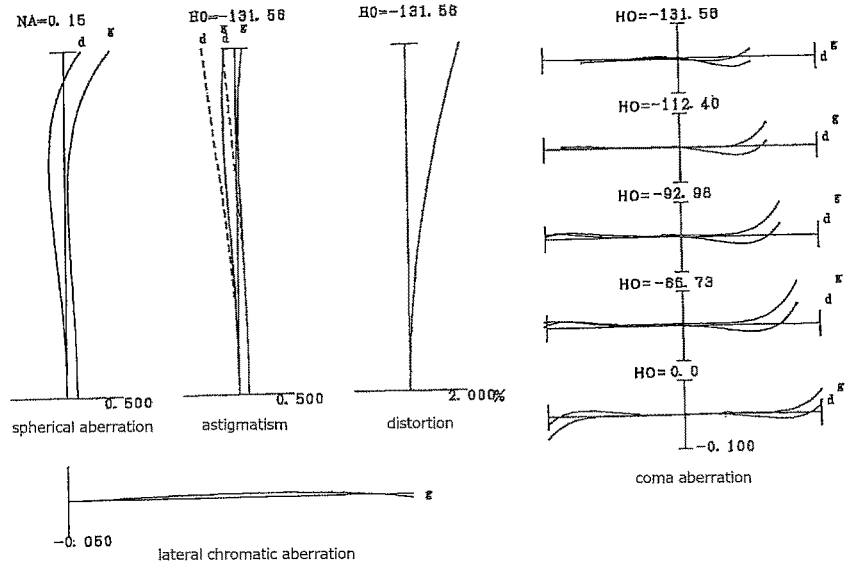

FIGS. 35A, 35B and 35C are graphs showing various aberrations, upon focusing on a finite distance object, of the variable magnification optical system according to the Ninth Example, FIG. 35A showing the wide angle end state, FIG. 35B showing the intermediate focal length state, and FIG. 35C showing the telephoto end state.

Figure 36A:
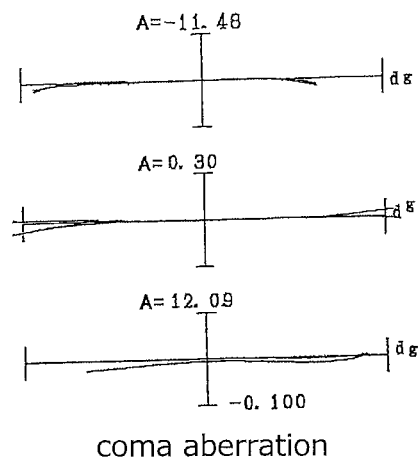
FIG. 36A, FIG. 36B and FIG. 36C are graphs showing meridional transverse aberrations, upon conducting image blur correction at the time when an infinite distance object is focused by the variable magnification optical system according to the Ninth Example, FIG. 36A showing the wide angle end state, FIG. 36B showing the intermediate focal length state, and FIG. 36C showing the telephoto end state.
Figure 36B:
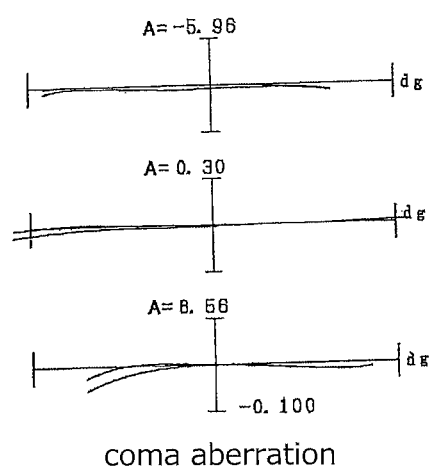
Figure 36C:
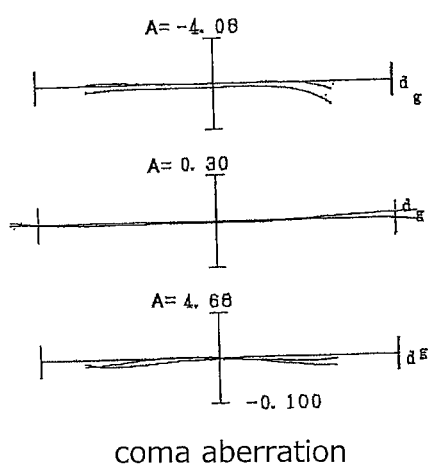

FIGS. 36A, 36B and 36C are graphs showing meridional transverse aberrations, upon conducting image blur correction at the time when an infinite distance object is focused by the variable magnification optical system according to the Ninth Example, FIG. 36A showing the wide angle end state, FIG. 36B showing the intermediate focal length state, and FIG. 36C showing the telephoto end state.

As is apparent from the above-mentioned graphs showing aberrations, the variable magnification optical system relating to the present Example can suppress superbly variations in aberrations upon varying the magnification, and correct superbly various aberrations from the state where an infinite distance object is focused to the state where an finite distance object is focused, and has high optical performance. Further, the variable magnification optical system relating to the present Example has an excellent imaging property even at the time when vibration reduction is conducted.

According to each of the above described Examples, it is possible to realize a variable magnification optical system which can suppress superbly variations in aberrations upon varying magnification and high optical performance.

By the way, in the variable magnification optical system according to the present embodiment, variable magnification ratio is in the range of 2.0 to 5.0; 35 mm equivalent focal length in the wide angle end state is in the range of 50 mm to 100 mm. Further, in the variable magnification optical system according to the present embodiment, F-number is in the range of f/2.0 to f/4.5 in the wide angle end state and in the range of f/2.0 to f/4.5 in the telephoto end state.

Further, it is noted that each of the above described Examples is a concrete example of the present embodiment, and the present embodiment is not limited to them. The contents described below can be adopted without deteriorating optical performance of the variable magnification optical systems according to the present embodiment.

Although the variable magnification optical systems having a four group configuration, a five group configuration, or a six group configuration, were illustrated above as numerical examples of the variable magnification optical systems according to the present embodiment, the present embodiment is not limited to them and variable magnification optical systems having other configurations, such as seven group configuration, or the like, can be configured. Concretely, a configuration that a lens or a lens group is added to the most object side or the most image side of the variable magnification optical system according to the each of the above described Examples is possible. Alternatively, a lens or a lens group may be added between the first lens group G1 and the second lens group G2. Alternatively, a lens or a lens group may be added between the second lens group G2 and the third lens group G3. Alternatively, a lens or a lens group may be added between the third lens group G3 and the rear lens group GR.

Further, in each of the above described Examples, configurations that the rear lens group GR is composed of the fourth lens group G4, or of the fourth lens group G4 and the fifth lens group G5, or of the fourth lens group G4, the fifth lens group G5 and the sixth lens group G6, were illustrated, but configurations are not limited to them.

Further, in each of the above described Examples, focusing lens group is composed of one lens group, or of a part in a lens group, but focusing lens group may be composed of two or more lens groups. Auto focusing can be applied for such focusing group(s), and drive by motor for auto focusing, such as, ultrasonic motor, stepping motor VCM motor may be suitably adopted.

Further, in the variable magnification optical systems according to each of the above described Examples, a lens surface of a lens may be a spherical surface, a plane surface, or an aspherical surface. When a lens surface is a spherical surface or a plane surface, lens processing, assembling and adjustment become easy, and it is possible to prevent deterioration in optical performance caused by lens processing, assembling and adjustment errors, so that it is preferable. Moreover, even if an image plane is shifted, deterioration in depiction performance is little, so that it is preferable. When a lens surface is an aspherical surface, the aspherical surface may be fabricated by a grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

Further, in the variable magnification optical systems according to each of the above described Examples, it is preferable that the aperture stop S is disposed between the second lens group and the rear lens group. But, the function may be substituted by a lens frame without disposing a member as an aperture stop.

Moreover, the lens surface(s) of the lenses configuring the variable magnification optical systems according to each of the above described Examples, may be coated with anti-reflection coating(s) having a high transmittance in a wide wavelength region. With this contrivance, it is feasible to reduce a flare as well as ghost and attain excellent optical performance with high contrast.

Next, a camera equipped with the variable magnification optical system according to the present embodiment, will be explained with referring to FIG. 37.

Figure 37:
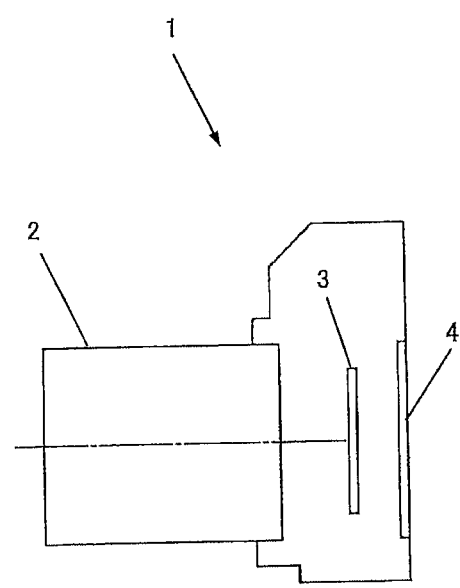
FIG. 37 is a cross sectional view schematically showing an optical apparatus equipped with the variable magnification optical system.

FIG. 37 is a view showing a configuration of the camera equipped with the variable magnification optical system according to the present application. The camera 1 as shown in FIG. 37, is a camera of a lens interchangeable type equipped with the variable magnification optical system according to the above described first Example as an imaging lens 2.

In the present camera 1, a light emitted from an unillustrated object (an object to be photo-taken) is converged by the imaging lens 2, through an unillustrated OLPF (Optical low pass filter), and forms an image of the object on an imaging plane of an image pick-up portion 3. The light from the object is photo-electrically converted through a photo-electric conversion element provided on the image pick-up portion 3 to form a picture image of the object. This picture image is displayed on an EVF (electric view finder) 4 provided on the camera 1. Accordingly, a photographer can observe the object to be photo-taken through the EVF.

Further, upon unillustrated release button being depressed by the photographer, the picture image of the object formed by the image pick-up portion 3 is stored in an unillustrated memory. Thus, the photographer can take a photo of the object.

It is noted here that the variable magnification optical system relating to the First Example mounted on the camera 1 as the imaging lens 2, is a variable magnification optical system which can suppress superbly variations in aberrations upon varying magnification and attain high optical performance. Accordingly, the present camera 1 can suppress superbly variations in aberrations upon varying magnification and attain high optical performance. Incidentally, when there is configured a camera in which the variable magnification optical system according to any of the before-mentioned Second to Ninth Examples is installed as the imaging lens 2, the camera also can attain the same effects as those of the above-mentioned camera 1. Further, even when the variable magnification optical system according to any of the above Examples is installed in a camera of a single lens reflex type equipped with a quick return mirror in which the object image is observed through a finder optical system, the camera also can attain the same effects as those of the above-mentioned camera 1.

Figure 38:
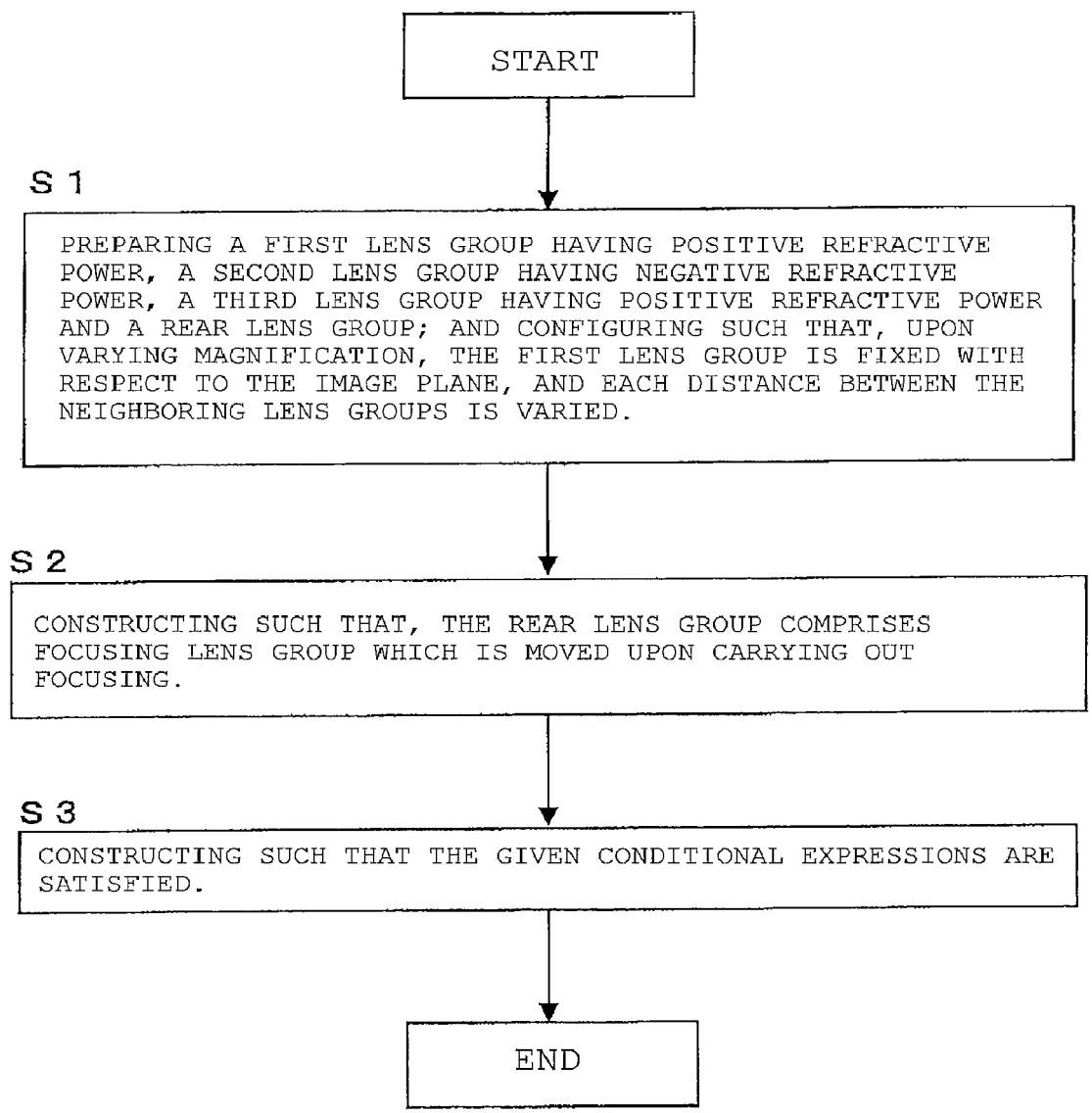
FIG. 38 is a flowchart schematically showing a method for manufacturing the variable magnification optical system.

Next, an outline of a method for manufacturing the variable magnification optical system according to the present embodiment, is described with referring to FIG. 38. FIG. 38 is a flowchart schematically showing a method for manufacturing the variable magnification optical system according to the present embodiment.

The method for manufacturing the variable magnification optical system according to the present embodiment shown in FIG. 38, is a method for manufacturing a variable magnification optical system which comprises, in order from an object side, a first lens group having positive refractive power, a second lens group having negative refractive power, a third lens group having positive refractive power and a rear lens group; the method comprising the following steps S1 to S3.

Step S1: preparing a first lens group having positive refractive power, a second lens group having negative refractive power, a third lens group having positive refractive power and a rear lens group; and configuring such that, upon varying magnification, the first lens group is fixed with respect to the image plane, and each distance between the neighboring lens groups is varied.

Step S2: constructing such that, the rear lens group comprises focusing lens group which is moved upon carrying out focusing.

Step S3: constructing such that the following conditional expressions (1) and (2) are satisfied:

$$1.00 < f1/(-f2) < 5.00 \quad (1)$$

$$0.15 < (-f2)/|fZ| < 2.00 \quad (2)$$

where f1 denotes a focal length of said first lens group, f2 denotes a focal length of said second lens group, and fZ denotes a focal length of the lens group located in a most image side in said rear lens group.

According to the above-stated method for manufacturing the variable magnification optical system according to the present embodiment, it is possible to realize a variable magnification optical system which can superbly suppress variations in aberrations upon varying magnification and which has high optical performance.

What is claimed is:

1. A variable magnification optical system comprising, in order from an object side, a first lens group having positive refractive power, a second lens group having negative refractive power, a third lens group having positive refractive power, and a rear lens group;
   upon varying a magnification, the first lens group being fixed with respect to an image plane, and each distance between the neighboring lens groups being varied;
   the rear lens group comprising a focusing lens group which is moved upon carrying out focusing;
   the third lens group comprising, at a most object side, a single lens having positive refractive power; and
   the following conditional expressions being satisfied:

$$2.00 < f1/(-f2) < 3.80$$

$$0.15 < (-f2)/|fZ| < 2.00$$

$$1.00 < f1/fw < 3.00$$

where f1 denotes a focal length of the first lens group, f2 denotes a focal length of second lens group, fz denotes a focal length of a lens group located at a most image side in the rear lens group, and fw denotes a focal length of the variable magnification optical system in a wide angle end state.

2. A variable magnification optical system according to claim 1, wherein
   the following conditional expression is satisfied:

$$1.50 < f1/|ff| < 5.00$$

where ff denotes a focal length of the focusing lens group.

3. A variable magnification optical system according to claim 1, wherein at least a part of lens groups in the rear lens group is fixed with respect to the image plane, upon varying magnification.

4. A variable magnification optical system according to claim 1, wherein
   the following conditional expression is satisfied:

$$0.050 < \Sigma G1/TL < 0.150$$

where ΣG1 denotes a total thickness of the first lens group, and TL denotes a total optical length of the variable magnification optical system.

5. A variable magnification optical system according to claim 1, wherein
   the following conditional expression is satisfied:

$$0.50 < f3/(-f2) < 4.50$$

where f3 denotes a focal length of the third lens group.

6. A variable magnification optical system according to claim 1, wherein
   the first lens group comprises one negative lens, and the following conditional expression is satisfied:

$$nd1 > 1.700$$

where nd1 denotes refractive index of the negative lens.

7. A variable magnification optical system according to claim 1, wherein
   the following conditional expression is satisfied:

$$8.00 < \omega w < 25.00$$

where ωw denotes a half angle of view of the variable magnification optical system in the wide angle end state.

8. A variable magnification optical system according to claim 1, wherein
   the rear lens group comprises, in order from the object side, the focusing lens group and a fixed lens group fixed with respect to the image plane upon varying magnification.

9. A variable magnification optical system according to claim 1, comprising an aperture stop between the second lens group and the rear lens group.

10. A variable magnification optical system according to claim 1, wherein at least a part of the rear lens group is movable so as to have a movement component perpendicular to an optical axis.

11. A variable magnification optical system according to claim 1, wherein the focusing lens group consists of one lens group.

12. An optical apparatus equipped with a variable magnification optical system according to claim 1.

13. A variable magnification optical system comprising, in order from an object side, a first lens group having positive refractive power, a second lens group having negative refractive power, a third lens group having positive refractive power, and a rear lens group;
    upon varying a magnification, each distance between the neighboring lens groups being varied;
    the rear lens group comprising a focusing lens group which is moved upon carrying out focusing;
    the third lens group comprising, at a most object side, a single lens having positive refractive power; and
    the following conditional expressions being satisfied:

$$2.00 < f1/(-f2) < 3.80$$

$$0.15 < (-f2)/|fZ| < 1.00$$

$$0.50 < f3/(-f2) < 3.00 \quad (5)$$

where f1 denotes a focal length of the first lens group, f2 denotes a focal length of the second lens group, fZ denotes a focal length of a lens group located at a most image side in the rear lens group, and f3 denotes a focal length of the third lens group.

14. A variable magnification optical system according to claim 13, wherein
the following conditional expression is satisfied:

$$1.50 < f1/|ff| < 5.00$$

where ff denotes a focal length of the focusing lens group.

15. A variable magnification optical system according to claim 13, wherein
the following conditional expression is satisfied:

$$0.050 < \Sigma G1/TL < 0.150$$

where ΣG1 denotes a total thickness of the first lens group, and TL denotes a total optical length of the variable magnification optical system.

16. A variable magnification optical system according to claim 13, wherein
the following conditional expression is satisfied:

$$1.00 < f1/fw < 3.00$$

where fw denotes a focal length of the variable magnification optical system in a wide angle end state.

17. A variable magnification optical system according to claim 13, wherein
the first lens group comprises one negative lens, and
the following conditional expression is satisfied:

$$nd1 > 1.700$$

where nd1 denotes refractive index of the negative lens.

18. A variable magnification optical system according to claim 13, wherein
the following conditional expression is satisfied:

$$8.00 < \omega w < 25.00$$

where ωw denotes a half angle of view of the variable magnification optical system in a wide angle end state.

19. An optical apparatus equipped with a variable magnification optical system according to claim 13.

20. A method for manufacturing a variable magnification optical system which comprises, in order from an object side, a first lens group having positive refractive power, a second lens group having negative refractive power, a third lens group having positive refractive power, and a rear lens group;
the method comprising one of the following Steps A and B:

the Step A including:
constructing such that, upon varying a magnification, the first lens group is fixed with respect to an image plane, and each distance between the neighboring lens groups is varied;
constructing such that the rear lens group comprises a focusing lens group which is moved upon carrying out focusing;
constructing such that the third lens group comprises, at a most object side, a single lens having positive refractive power; and
constructing such that the following conditional expressions are satisfied:

$$2.00 < f1/(-f2) < 3.80$$

$$0.15 < (-f2)/|fZ| < 2.00$$

$$1.00 < f1/fw < 3.00$$

where f1 denotes a focal length of the first lens group, f2 denotes a focal length of the second lens group, fZ denotes a focal length of a lens group located at a most image side in the rear lens group, and fw denotes a focal length of the variable magnification optical system in a wide angle end state;

the Step B including:
constructing such that, upon varying a magnification, each distance between the neighboring lens groups is varied;
constructing such that the rear lens group comprises a focusing lens group which is moved upon carrying out focusing;
constructing such that the third lens group comprises, at a most object side, a single lens having positive refractive power; and
constructing such that the following conditional expressions are satisfied:

$$2.00 < f1/(-f2) < 3.80$$

$$0.15 < (-f2)/|fZ| < 1.00$$

$$0.50 < f3/(-f2) < 3.00$$

where f1 denotes a focal length of the first lens group, f2 denotes a focal length of the second lens group, fZ denotes a focal length of a lens group located at a most image side in the rear lens group, and f3 denotes a focal length of the third lens group.

* * * * *